United States Patent
Ito et al.

(10) Patent No.: US 10,510,147 B2
(45) Date of Patent: *Dec. 17, 2019

(54) IMAGE PROCESSING DEVICE

(71) Applicant: OLYMPUS CORPORATION, Hachioji-shi, Tokyo (JP)

(72) Inventors: Dai Ito, Tokyo (JP); Tatsuki Tadenuma, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 15/808,186

(22) Filed: Nov. 9, 2017

(65) Prior Publication Data

US 2018/0068452 A1    Mar. 8, 2018

Related U.S. Application Data

(63) Continuation of application No. PCT/JP2015/063902, filed on May 14, 2015.

(51) Int. Cl.
    *G06T 7/11*      (2017.01)
    *G06T 7/187*    (2017.01)

(52) U.S. Cl.
    CPC ............... *G06T 7/11* (2017.01); *G06T 7/187* (2017.01); *G06T 2207/20021* (2013.01)

(58) Field of Classification Search
    CPC . G06T 2207/20016; G06T 2207/20021; G06T 2207/20072; G06T 7/11;
    (Continued)

(56) References Cited

U.S. PATENT DOCUMENTS

| 4,972,495 A | 11/1990 | Blike et al. |
| 5,590,063 A | 12/1996 | Golio et al. |

(Continued)

FOREIGN PATENT DOCUMENTS

| JP | H09-16805 A | 1/1997 |
| JP | 2002-251610 A | 9/2002 |

(Continued)

OTHER PUBLICATIONS

International Search Report dated Jul. 14, 2015, issued in counterpart International Application No. PCT/JP2015/063902, w/English translation (2 pages).

(Continued)

*Primary Examiner* — Aklilu K Woldemariam
(74) *Attorney, Agent, or Firm* — Westerman, Hattori, Daniels & Adrian, LLP

(57) ABSTRACT

An image processing device includes: a plurality of label data generation units which generate label data in which a predetermined label is assigned to each of a plurality of pixels in each of a plurality of divided images; a plurality of label integration information generation units which correspond to the respective label data generation units and generate label integration information representing association of labels included in the label data in order to integrate label data generated by a corresponding label data generation unit and label data generated by another label data generation unit; a plurality of label integration units which generate integrated label data in which respective pieces of label data corresponding to neighboring divided images are integrated; and a label integration processing control unit which distributes the label data to the respective label integration units such that computational loads to integrate the label data are equalized.

14 Claims, 31 Drawing Sheets

(58) Field of Classification Search
CPC ..... G06T 7/162; G06T 7/187; G06T 2200/28; G06T 7/73; G06T 5/006; G06T 7/12; G06T 1/0007; G06T 1/60; G06T 2207/10056; G06T 2207/20152; G06T 2207/30024; G06T 2207/20156; G06T 2207/20192; G06T 5/002; G06T 5/003; G06T 7/13; G06T 7/60; G06T 9/50; G06K 9/00228; G06K 9/00201; G06K 9/00771; G06K 9/52; G06K 9/0014; H04N 1/387; H04N 5/23248; G02B 21/008; G02B 21/365; G01C 21/367; G01C 21/3673; G01C 21/3682; G06F 3/04817; G09B 29/007; G09B 29/10
USPC ....... 382/173, 175, 180, 203, 204, 181, 260, 382/286
See application file for complete search history.

(56) References Cited

U.S. PATENT DOCUMENTS

| | | | | |
|---|---|---|---|---|
| 5,602,940 | A * | 2/1997 | Inoue | G06T 7/11 382/180 |
| 5,717,784 | A * | 2/1998 | Yanagishita | G06K 9/4638 382/180 |
| 8,040,351 | B1 | 10/2011 | Diard | |
| 8,121,407 | B1 * | 2/2012 | K | G06T 7/187 382/173 |
| 9,626,576 | B2 | 4/2017 | Grujic et al. | |
| 2003/0156757 | A1 * | 8/2003 | Murakawa | G06K 9/4609 382/195 |
| 2004/0146193 | A1 * | 7/2004 | Imamura | G06T 7/0012 382/132 |
| 2006/0274940 | A1 * | 12/2006 | Ozaki | G06K 9/4638 382/180 |
| 2007/0253623 | A1 * | 11/2007 | Ohira | G06K 9/4638 382/218 |
| 2008/0056610 | A1 | 3/2008 | Kanda | |
| 2010/0169576 | A1 | 7/2010 | Chen | |
| 2010/0192148 | A1 | 7/2010 | Chen et al. | |
| 2012/0201460 | A1 * | 8/2012 | Seo | G06T 7/11 382/180 |
| 2013/0156314 | A1 | 6/2013 | Pham | |
| 2015/0187118 | A1 * | 7/2015 | Masumoto | A61B 6/468 345/419 |
| 2015/0279049 | A1 * | 10/2015 | Tojo | G06K 9/4609 382/164 |
| 2016/0239956 | A1 | 8/2016 | Kang et al. | |

FOREIGN PATENT DOCUMENTS

| | | |
|---|---|---|
| JP | 2008-234349 A | 10/2008 |
| JP | 2011-8382 A | 1/2011 |
| JP | 2014-203134 A | 10/2014 |
| WO | 2006/080239 A1 | 8/2006 |

OTHER PUBLICATIONS

Notice of Allowance dated Feb. 5, 2019, issued in U.S. Appl. No. 15/689,150 (16 pages).

Hai-fang Zhou et al, "An Improved Parallel Watershed Algorithm for Distributed Memory System", 2007, IEEE Transaction on Parallel and Distributed Systems, vol. 18, No. 1, pp. 44-56 (Year: 2007), in Notice of Allowance dated Feb. 5, 2019. (4 pages).

Lindner et al, "Optimal Parallel watershed algorithm based on image integration and sequential scannings", 1997, Proc. SPIE 3166, Parallel and Distributed Methods for Image Processing, 13 pages (Year: 1997), in Notice of Allowance dated Feb. 5, 2019. (13 pages).

Galilee et al, "Parallel Asynchronous Watershed Algorithm-Architecture", 2002, Proceedings of the Fifth International Conference on Algorithms and Architectures for Parallel Processing (ICA3PP'02), 4 pages (Year: 2002), in Notice of Allowance dated Feb. 5, 2019. (13 pages).

International Search Report dated May 19, 2015, issued in counterpart application No. PCT/JP2015/056322. (1 pages).

* cited by examiner

FIG. 5A

| 99 | 81 | 63 |
|---|---|---|
| 72 | (54) | 36 |
| 44 | 28 | 18 |

GRADIENT DIRECTION : ↖
GRADIENT LABEL : 0

FIG. 5B

| 81 | 99 | 63 |
|---|---|---|
| 72 | (54) | 36 |
| 44 | 28 | 18 |

GRADIENT DIRECTION : ↑
GRADIENT LABEL : 1

FIG. 5C

| 63 | 81 | 99 |
|---|---|---|
| 72 | (54) | 36 |
| 44 | 28 | 18 |

GRADIENT DIRECTION : ↗
GRADIENT LABEL : 2

FIG. 5D

| 72 | 81 | 63 |
|----|----|----|
| 99 | (54) | 36 |
| 44 | 28 | 18 |

GRADIENT DIRECTION : ←
GRADIENT LABEL : 3

FIG. 5E

| 63 | 81 | 72 |
|----|----|----|
| 36 | (54) | 99 |
| 18 | 28 | 44 |

GRADIENT DIRECTION : →
GRADIENT LABEL : 4

FIG. 5F

| 44 | 28 | 18 |
|----|----|----|
| 72 | (54) | 36 |
| 99 | 81 | 63 |

GRADIENT DIRECTION : ↙
GRADIENT LABEL : 5

FIG. 5G

| 44 | 28 | 18 |
|----|----|----|
| 72 | (54) | 36 |
| 81 | 99 | 63 |

GRADIENT DIRECTION : ↓
GRADIENT LABEL : 6

FIG. 5H

| 44 | 28 | 18 |
|----|----|----|
| 72 | (54) | 36 |
| 63 | 81 | 99 |

GRADIENT DIRECTION : ↘
GRADIENT LABEL : 7

FIG. 5I

| 63 | 81 | 72 |
|----|----|----|
| 36 | (99) | 54 |
| 18 | 28 | 44 |

GRADIENT DIRECTION : •
PEAK LABEL : 8~

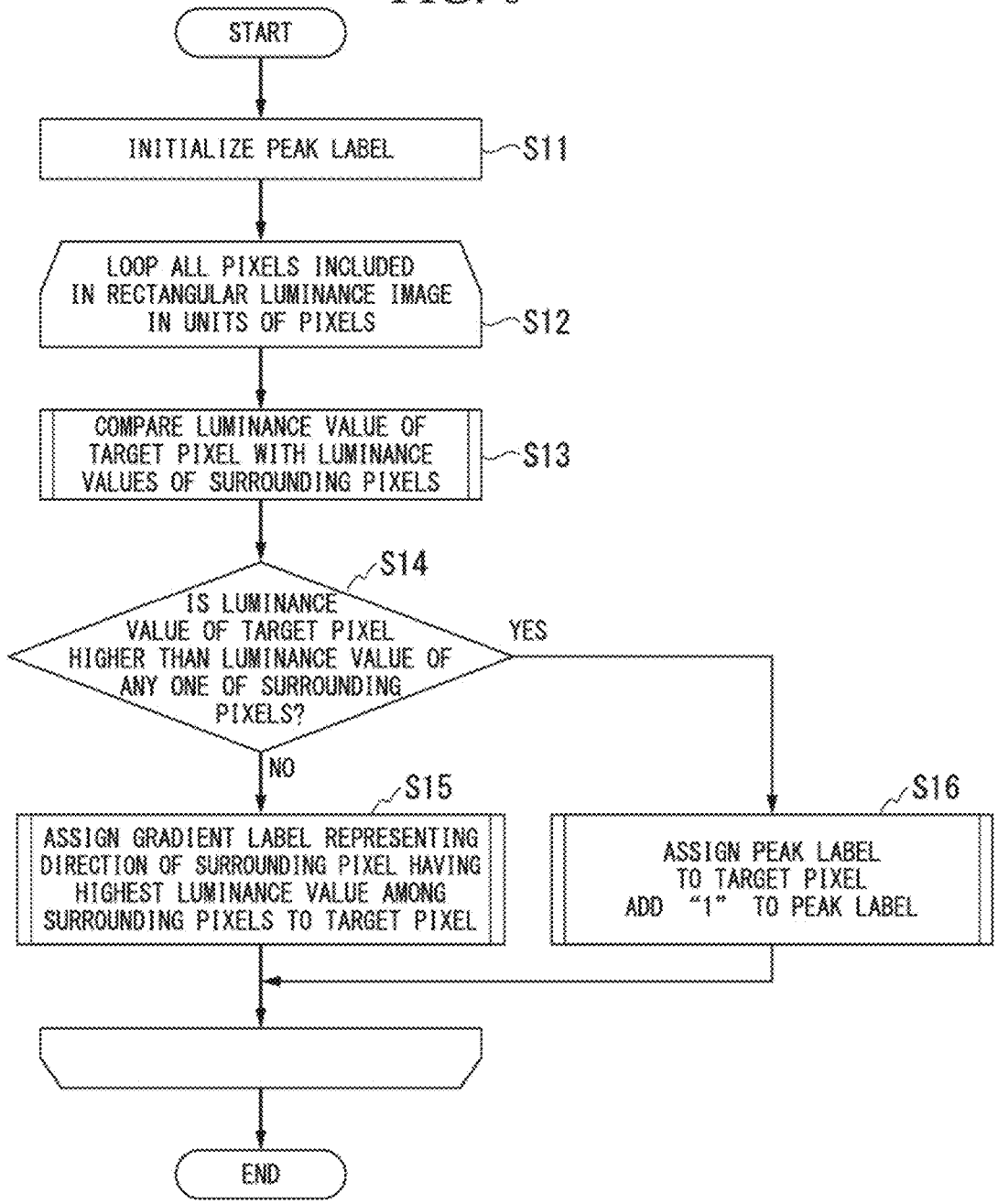

FIG. 14

| ADDRESS | DATA |
|---------|------|
| 0 | 0 |
| 1 | 1 |
| 2 | 2 |
| ⋮ | ⋮ |
| i−1 | i−1 |
| i | i |
| i+1 | i+1 |
| ⋮ | ⋮ |
| i+j−2 | i+j−2 |
| m | m |
| m+1 | m+1 |
| m+2 | m+2 |
| ⋮ | ⋮ |

PIXELS OF OVERLAP REGION (PROVISIONAL PEAK PIXEL)

TRUE PEAK PIXEL

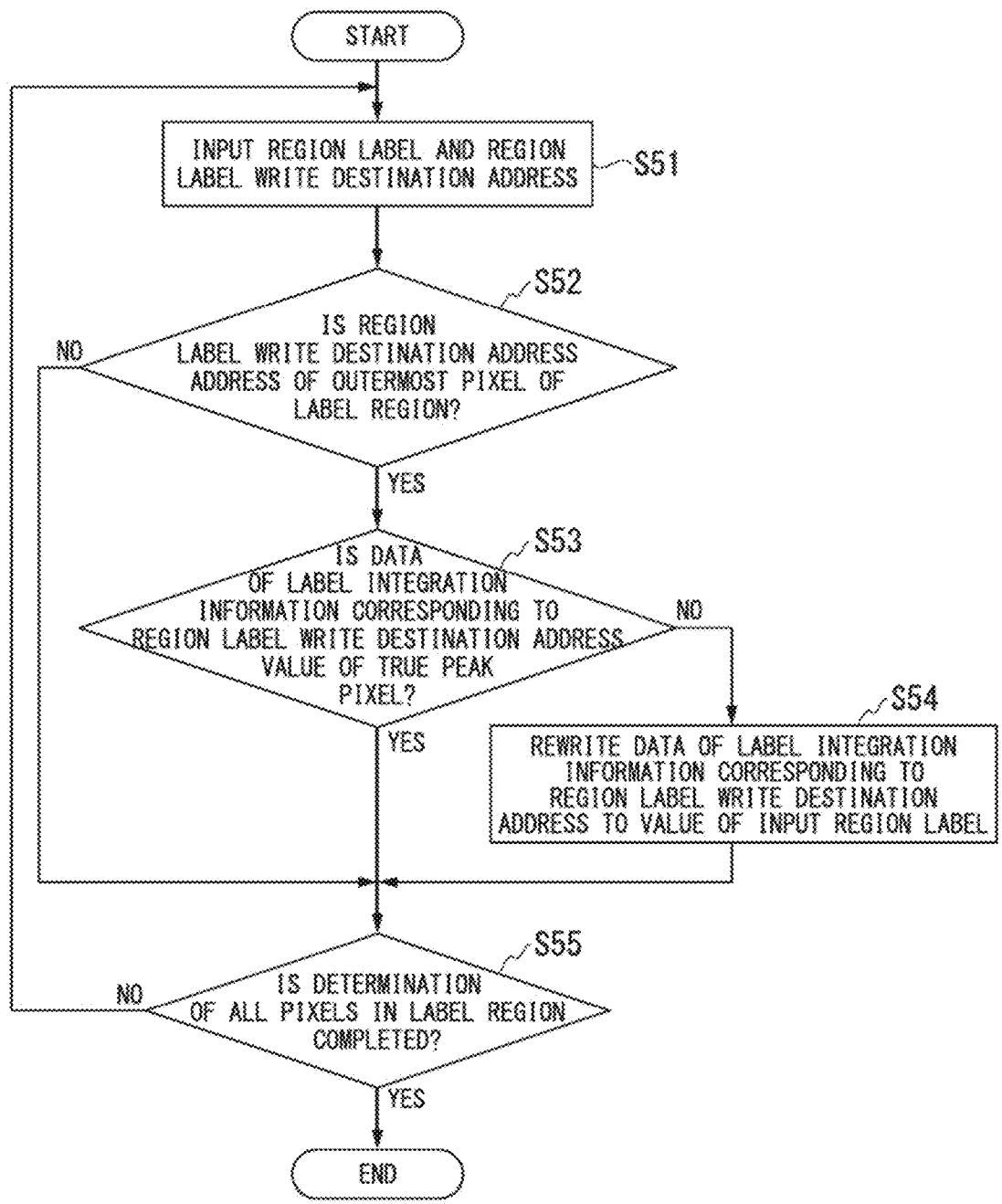

FIG. 16A
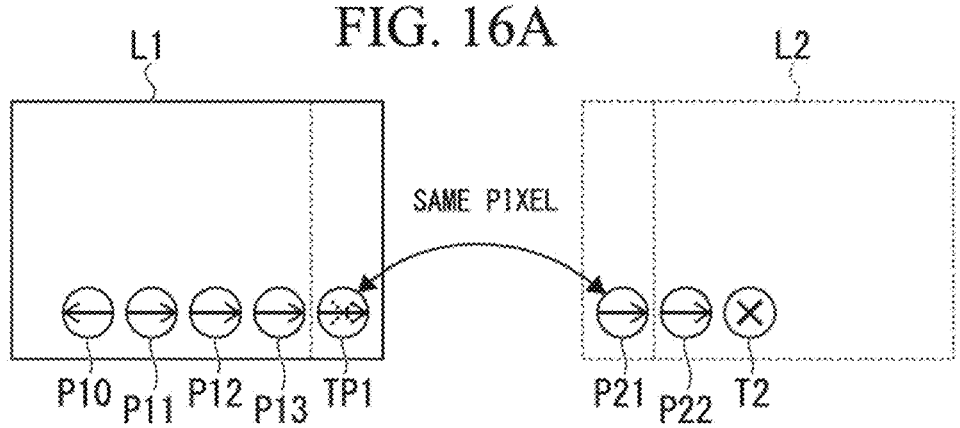
FIG. 16B
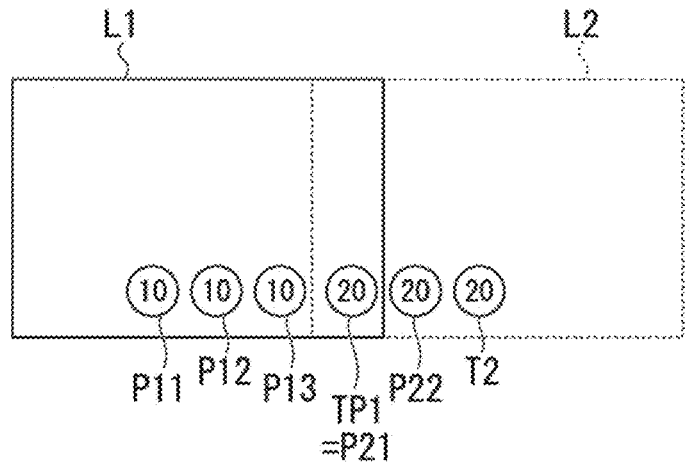
FIG. 16C

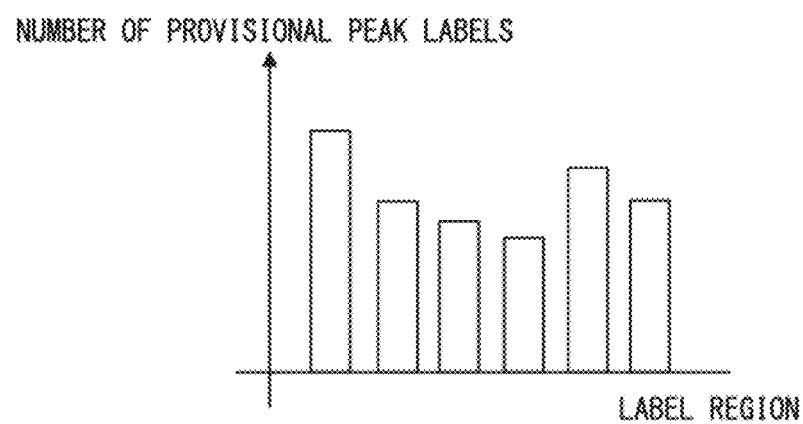

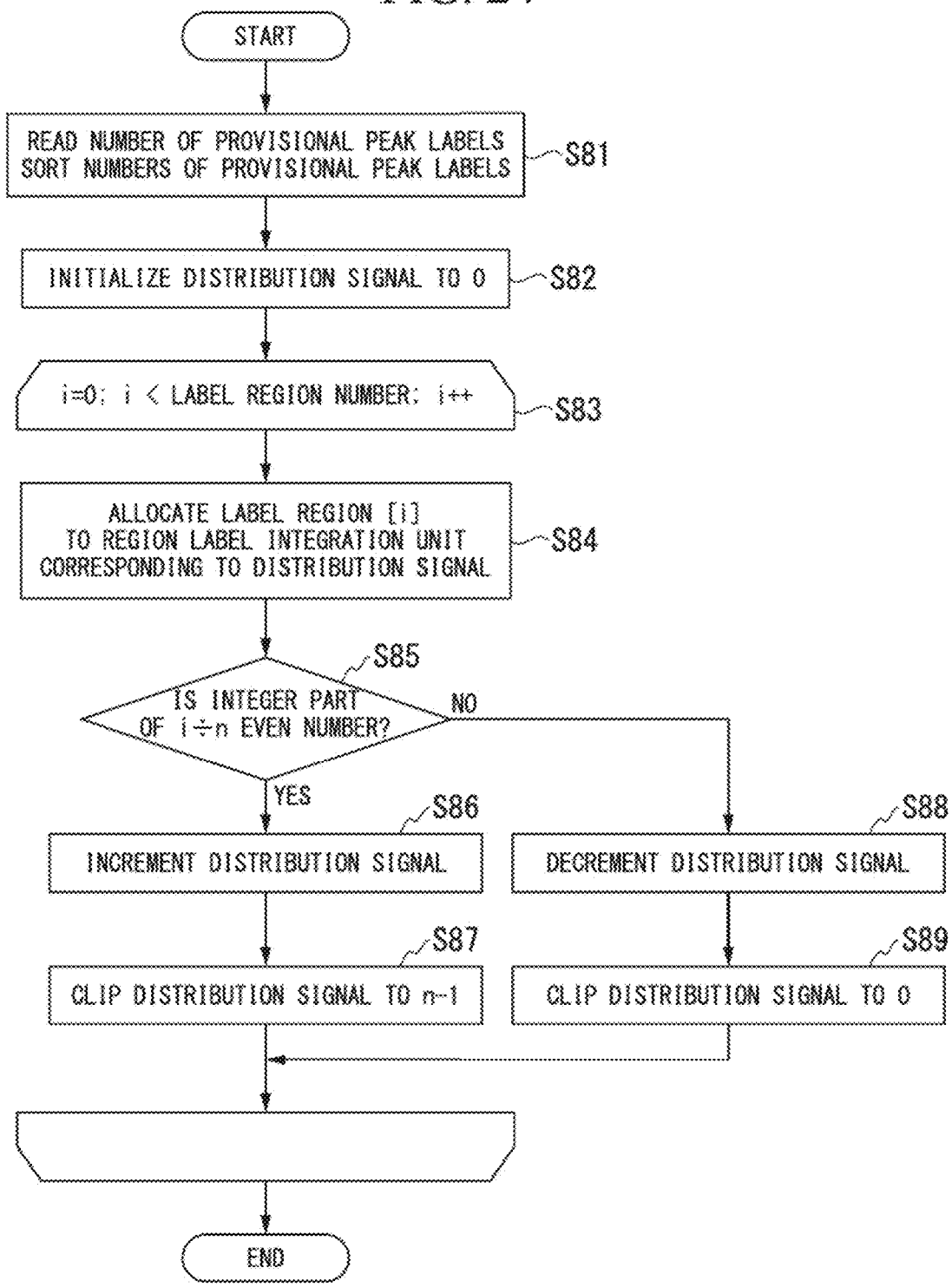

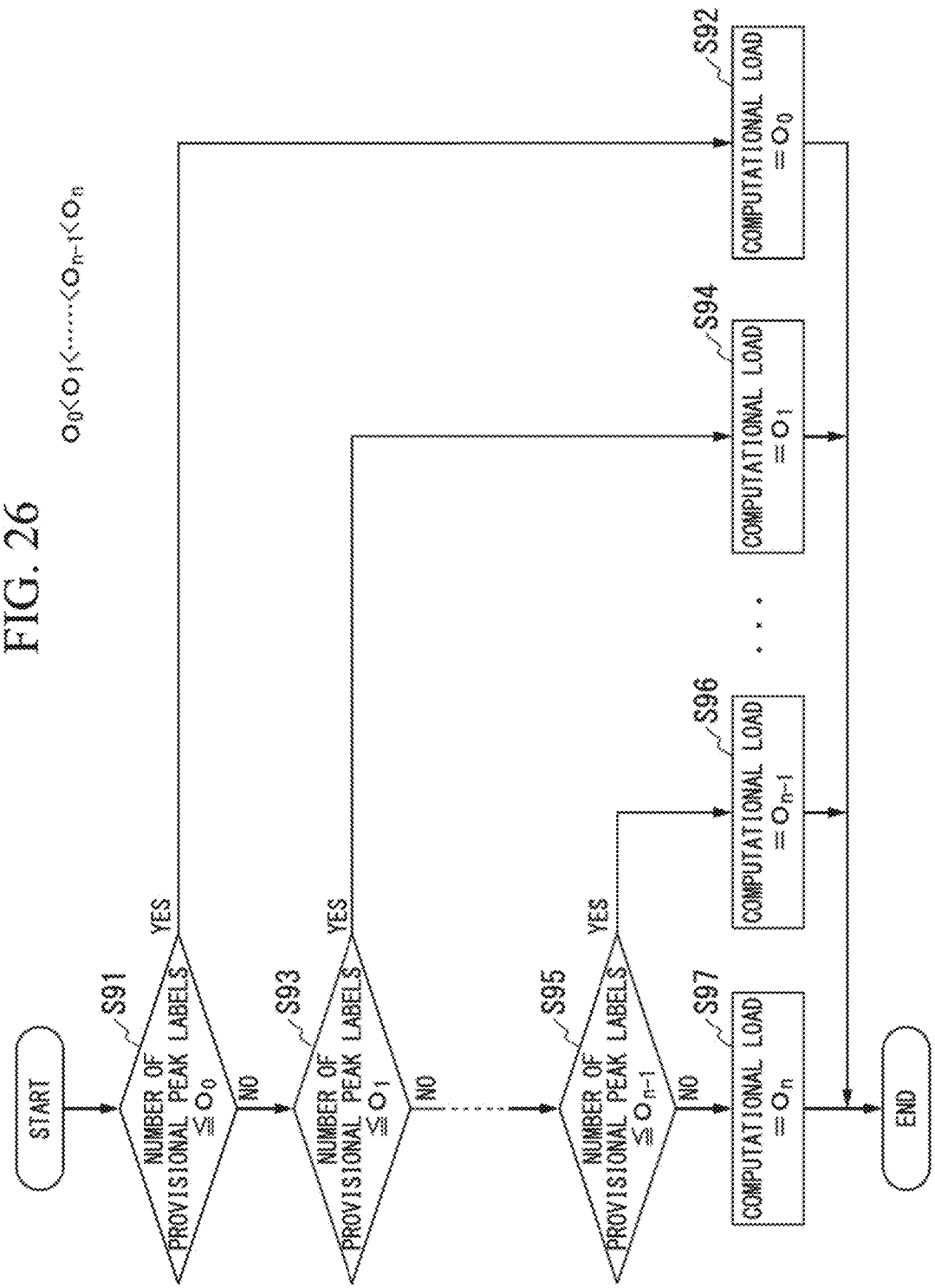

IMAGE PROCESSING DEVICE

The present invention relates to an image processing device. This application is a continuation application based on a PCT International Application No. PCT/JP2015/063902, filed on May 14, 2015. The content of the PCT International Application is incorporated herein by reference.

FIELD OF THE INVENTION

Description of Related Art

In the image processing field, there is conventional image processing in which the processing time depends on the amount of data. As an example of such processing, there is a process called a region division process which divides image data into a plurality of regions on the basis of data such as luminance values. This region division process is applied in various fields, such as cell analysis.

When the region division process is performed on the entire image, the storage capacity (buffer capacity) for temporarily retaining data which is being processed needs to be increased as the resolution of the image increases.

Accordingly, for example, Japanese Unexamined Patent Application, First Publication No. 2014-203134 discloses a technology of an image processing device which performs the region division process on an entire image by dividing a region of an image to be processed into a plurality of blocks, assigning a label to pixels of each of the divided blocks and then integrating the blocks. The technology disclosed in Japanese Unexamined Patent Application, First Publication No. 2014-203134 can decrease the necessary buffer capacity to a degree corresponding to a divided block by dividing and processing a region of an image. Meanwhile, in the technology disclosed in Japanese Unexamined Patent Application, First Publication No. 2014-203134, the structures of pixels positioned at the boundary of two neighboring blocks are analyzed and labels assigned to pixels belonging to each block are updated on the basis of the analysis result in the integration process.

In addition, a conventional method for performing computations in parallel using a plurality of computation resources included in an image processing device to reduce a total processing time has been proposed. An image processing device including a plurality of computation resources can perform image processing more efficiently by distributing data such that the loads of computations performed by the computation resources are equalized to operate each computation resource without making each computation resource idle, that is, to improve the operation rate of each computation resource.

Accordingly, execution of the process disclosed in Japanese Unexamined Patent Application, First Publication No. 2014-203134 through this image processing device including a plurality of computation resources may be considered. That is, performing processes of assigning a label to each of divided blocks in parallel using the computation resources included in the image processing device and then performing processes of integrating neighboring blocks in parallel using the computation resources may be considered.

SUMMARY OF THE INVENTION

An image processing device of a first aspect of the present invention includes: a plurality of label data generation units which generate label data in which a predetermined label is assigned to each of a plurality of pixels in each of a plurality of divided images into which an input image is divided as a plurality of regions; a plurality of label integration information generation units which correspond to the respective label data generation units and generate label integration information representing connection of labels included in the label data in order to integrate label data generated by a corresponding label data generation unit and label data generated by another label data generation unit; a plurality of label integration units which generate integrated label data in which respective pieces of label data corresponding to neighboring divided images are integrated on the basis of the label integration information; and a label integration processing control unit which distributes the label data to the respective label integration units such that computational loads to integrate the label data are equalized, wherein the label integration information generation units generate the label integration information for all the label data before the label integration units perform computations for integrating the label data.

According to a second aspect of the present invention, in the image processing device of the first aspect, each of the label data generation units may generate label data in which overlap pixels which are pixels overlapping with a peripheral portion of another one of the divided images which are positioned in a peripheral portion of the corresponding divided image are assigned with a first label having a value uniquely determined depending on the positions of the overlap pixels or a second label which is determined to be an exclusive value for pixels located at positions other than the peripheral portion included in the divided image and is different from the first label, the label integration information may be information in which the value of the first label is stored as an initial value in a first storage region corresponding to each of the overlap pixels included in each of the divided images, and the value of the second label assigned to any one pixel located at a position other than the peripheral portion included in each of the divided images is stored in a second storage region other than the first storage region, each of the label integration information generation units may update, when the corresponding label data generation unit assigns the second label to any one of the overlap pixels, the value of the first label stored in the first storage region corresponding to the overlap pixel assigned with the second label to the value of the assigned second label in the label integration information, and each of the label integration units may change the value of the first label assigned to pixels assigned with the first label having the same value as a value which has uniquely determined for the overlap pixel corresponding to the first storage region whose value is updated from the initial value to the updated value stored in the first storage region.

According to a third aspect of the present invention, in the image processing device of the second aspect, each of the label data generation units may include: a plurality of gradient data generation units which each sequentially target pixels included in the corresponding divided image and generate gradient data in which each of the pixels included in the divided image is represented using a third label having a value indicating a direction toward a pixel having a higher luminance value or a fourth label having a value indicating a higher luminance value than all pixels located on the periphery on the basis of the luminance value of a targeted pixel and luminance values of other pixels located around the targeted pixel; and a plurality of region label generation units which each set each of a plurality of pixels represented using the fourth label as a peak pixel, divide a region within the divided image into regions including pixels belonging to the same peak pixel on the basis of peak coordinates indicating the position of the peak pixel, and generate, as label data, region label data in which each of the pixels included in the divided regions is represented using a fifth label having a value which is uniquely determined and indicates a pixel belonging to the same peak pixel, wherein each of the region label generation units sets the first label to the fifth label when the peak pixel is the overlap pixel and sets the second label to the fifth label when the peak pixel is a pixel located at a position other than the peripheral portion.

According to a fourth aspect of the present invention, in the image processing device of the third aspect, the label integration processing control unit may include: a label counting unit which counts the number of pixels assigned with the first label included in the label data for each piece of the label data and outputs each of the counted numbers of pixels as a number of labels of each piece of the label data; and a label region allocation unit which allocates the label data which is a target of computation for integration to each of the label integration units on the basis of the numbers of labels, and notifies each of the label integration units of the allocated label data.

According to a fifth aspect of the present invention, in the image processing device of the fourth aspect, the label region allocation unit may sequentially allocate the label data to a label integration unit to which the label data has not been allocated, and when there is no label integration unit to which the label data has not been allocated, sequentially allocate the label data to a label integration unit having the smallest accumulation of the numbers of labels of the allocated label data.

According to a sixth aspect of the present invention, in the image processing device of the fourth aspect, the label region allocation unit may allocate the label data to the respective label integration units in a predetermined order.

According to a seventh aspect of the present invention, in the image processing device of the sixth aspect, the label region allocation unit may sort the respective pieces of label data into a predetermined order on the basis of the numbers of labels and sequentially allocate the sorted label data to the respective label integration units.

According to man eighth aspect of the present invention, in the image processing device of the sixth aspect or the seventh aspect, the label region allocation unit may allocate the label data to the respective label integration units such that ascending order and descending order are alternately repeated as the order of the label integration units to which the respective pieces of label data are allocated.

According to a ninth aspect of the present invention, in the image processing device of the fourth aspect, the label region allocation unit may estimate a computational load of each of the label integration units on the basis of the numbers of labels of the label data and a plurality of predetermined threshold values of numbers of labels and allocate the label data to the respective label integration units on the basis of the estimation results.

According to a tenth aspect of the present invention, in the image processing device of any one of the third to ninth aspects, each of the region label generation units may include: a peak coordinates search unit which detects a peak pixel assigned with the fourth label included in the gradient data and outputs peak coordinates indicating the position of the detected peak pixel; a gradient data acquisition unit which acquires gradient data indicating the peak pixel corresponding to the peak coordinates and gradient data indicating each of a plurality of pixels located around the peak pixel and a gradient determination unit which represents the peak pixel included in the acquired gradient data using the fifth label and, simultaneously, determines whether the value of the third label indicating each of the pixels located around the peak pixel included in the acquired gradient data is a value indicating a direction toward the peak pixel and generates region label data in which a pixel indicated using the third label having a value indicating a direction toward the peak pixel is represented using the fifth label having the same value as that of the peak pixel.

According to an eleventh aspect of the present invention, in the image processing of the tenth aspect, the gradient data acquisition unit may sequentially set each of a plurality of pixels, which are determined to correspond to the third label having a value indicating a direction toward the peak pixel by the gradient determination unit, as a center, and further acquire gradient data indicating each of a plurality of pixels located around a pixel set as a center, and the gradient determination unit may sequentially determine whether the value of the third label indicating each of the pixels included in the further acquired gradient data is a value indicating a direction toward the pixel set as a center, and sequentially generate region label data in which a pixel indicated using the third label having a value indicating a direction toward the pixel set as a center is represented using the fifth label having the same value as that of the pixel set as a center.

According to a twelfth aspect of the present invention, in the image processing device of the eleventh aspect, the gradient data acquisition unit may acquire the gradient data indicating each of the pixels such that regions of the pixels sequentially set as a center are sequentially extended from the position of the peak coordinates corresponding to the peak pixel to the pixels on the periphery, and the gradient determination unit may generate region label data in which a region indicated using the fifth label having the same value of that of the peak pixel is sequentially extended from the position of the peak coordinates corresponding to the peak pixel to the pixels on the periphery.

According to a thirteenth aspect of the present invention, in the image processing device of any one of the first to twelfth aspects, the divided images may be images in which the region of the input image is divided into predetermined rectangular regions having the same size, wherein each of the rectangular regions may be a region in which pixels positioned in a peripheral portion overlap, by three pixels, with pixels positioned in a peripheral portion of a rectangular region of a neighboring divided image.

According to a fourteenth aspect of the present invention, in the image processing device of the thirteenth aspect, each of the label data generation units may generate label data of a region which overlaps, by one pixel, with pixels positioned in a peripheral portion of label data corresponding to the neighboring divided image except pixels positioned on the outermost periphery of the peripheral portion of the corresponding divided image.

According to a fifteenth aspect of the present invention, in the image processing device of any one of the first to fourteenth aspects, the respective label data generation units may sequentially initiate generation of label data for other divided images when generation of the label data for the corresponding divided image is completed.

BRIEF DESCRIPTION OF THE DRAWINGS

FIG. 5A is a diagram showing an example of a gradient label assigned to a pixel to be processed in the image processing device of embodiments of the present invention.

FIG. 5B is a diagram showing an example of a gradient label assigned to a pixel to be processed in the image processing device of embodiments of the present invention.

FIG. 5C is a diagram showing an example of a gradient label assigned to a pixel to be processed in the image processing device of embodiments of the present invention.

FIG. 5D is a diagram showing an example of a gradient label assigned to a pixel to be processed in the image processing device of embodiments of the present invention.

FIG. 5E is a diagram showing an example of a gradient label assigned to a pixel to be processed in the image processing device of embodiments of the present invention.

FIG. 5F is a diagram showing an example of a gradient label assigned to a pixel to be processed in the image processing device of embodiments of the present invention.

FIG. 5G is a diagram showing an example of a gradient label assigned to a pixel to be processed in the image processing device of embodiments of the present invention.

FIG. 5H is a diagram showing an example of a gradient label assigned to a pixel to be processed in the image processing device of embodiments of the present invention.

FIG. 5I is a diagram showing an example of a peak label assigned to a pixel to be processed in the image processing device of embodiments of the present invention.

FIG. 6 is a flowchart showing a processing procedure in the gradient data generation unit included in the image processing device of embodiments of the present invention.

FIG. 14 is a diagram showing an example of a configuration of label integration information stored in a label integration information storage unit included in the image processing device of embodiments of the present invention.

FIG. 15 is a flowchart showing a processing procedure in a label integration information generation unit included in the image processing device of embodiments of the present invention.

FIG. 16A is a diagram schematically showing an example of a label integration information generation process in the label integration information generation unit included in the image processing device of embodiments of the present invention.

FIG. 16B is a diagram schematically showing an example of the label integration information generation process in the label integration information generation unit included in the image processing device of embodiments of the present invention.

FIG. 16C is a diagram schematically showing an example of the label integration information generation process in the label integration information generation unit included in the image processing device of embodiments of the present invention.

FIG. 23A is a diagram showing another method of the label region distribution process performed by the region label integration processing control unit included in the image processing device of embodiments of the present invention.

FIG. 23B is a diagram showing another method of the label region distribution process performed by the region label integration processing control unit included in the image processing device of embodiments of the present invention.

FIG. 24 is a flowchart showing another processing procedure in the region label integration processing control unit included in the image processing device of embodiments of the present invention.

FIG. 26 is a flowchart showing another processing procedure in the region label integration processing control unit included in the image processing device of embodiments of the present invention.

DETAILED DESCRIPTION OF THE INVENTION

Hereinafter, embodiments of the present invention will be described with reference to figures. An image processing device (referred to as "image processing device 1" hereinafter) of embodiments of the present invention divides a region of an image (referred to as "luminance image" hereinafter) which includes only the luminance value as a value of each pixel, such as a grayscale image, into a plurality of regions and performs computations of a region division process in parallel using a plurality of computation resources.

Figure 1A:
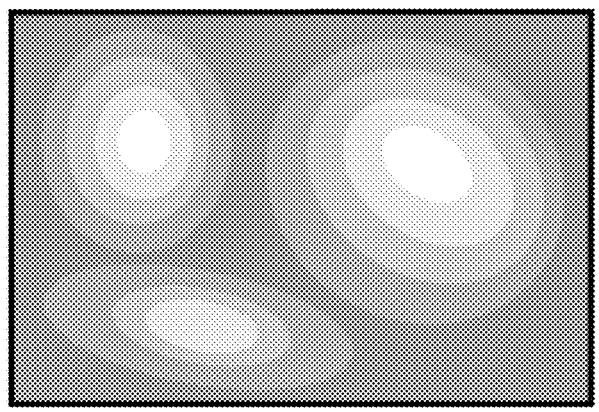
FIG. 1A is a diagram showing the concept of a region division process in an image processing device of embodiments of the present invention.
Figure 1B:
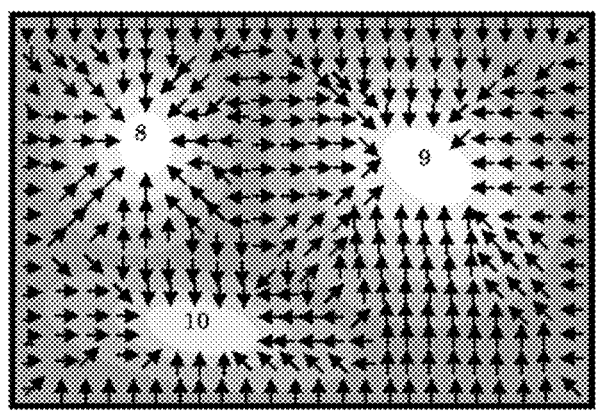
FIG. 1B is a diagram showing the concept of the region division process in the image processing device of embodiments of the present invention.
Figure 1C:
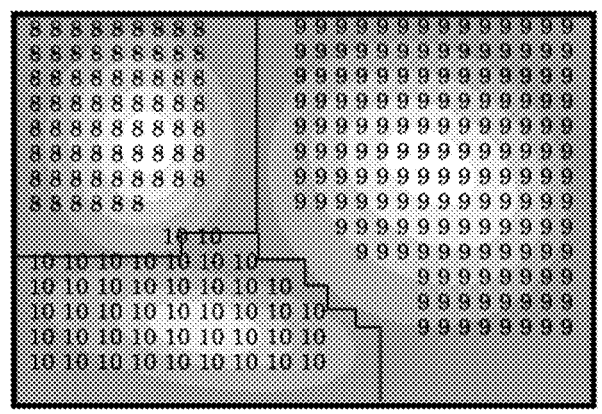
FIG. 1C is a diagram showing the concept of the region division process in the image processing device of embodiments of the present invention.

Initially, the concept of the region division process performed by the image processing device 1 of embodiments of the present invention will be described. FIGS. 1A to 1C are diagrams showing the concept of the region division process performed by the image processing device 1 of embodiments of the present invention. FIG. 1A shows an example of a luminance image which is a region division process target in the image processing device 1. The luminance image shown in FIG. 1A is a grayscale image having three pixels (referred to as "peak pixels" hereinafter) having the highest luminance value among surrounding pixels.

When the luminance image as shown in FIG. 1A is input, first, the image processing device 1 generates gradient data in which each pixel included in the luminance image is represented using a value (referred to as "gradient label" hereinafter) indicating a gradient toward a peak pixel. Here, "gradient" indicates a direction toward a pixel having a higher luminance value among pixels located in the surroundings of a certain pixel when the certain pixel is targeted. FIG. 1B shows an example of gradient data generated by the image processing device 1. As shown in FIG. 1B, the gradient data is data in which a gradient label directed toward a peak pixel is assigned to each of a plurality of pixels (referred to as "surrounding pixels" hereinafter) located in the surroundings of each peak pixel. Meanwhile, although gradient data is data in which each pixel is represented using a value which is a gradient label, the gradient data is shown, in FIG. 1B, in such a manner that gradient labels schematically indicating gradients using arrows are superposed on the luminance image shown in FIG. 1A for easy understanding. Further, pixels located at positions indicated by "8," "9" and "10" in FIG. 1B are peak pixels. In this manner, with respect to peak pixels, values (referred to as "peak labels" hereinafter) indicating peaks are represented in gradient data, instead of gradient labels. In the gradient data shown in FIG. 1B, each of "8," "9" and "10" is a peak label. The image processing device 1 divides a region of the luminance image into a plurality of predetermined rectangular regions and generates gradient data corresponding to luminance images of the divided rectangular regions in parallel using a plurality of computation resources.

Subsequently, the image processing device 1 performs a region division process for dividing the region within the luminance image into regions each including pixels belonging to the same peak pixel on the basis of gradient labels and peak labels included in the gradient data. In the region division process, the image processing device 1 performs computations for assigning, to each of surrounding pixels belonging to the same peak pixel, a value (referred to as "region label" hereinafter) indicating that the corresponding pixels are pixels belonging to the same region in parallel using a plurality of computation resources. That is, in the image processing device 1, the plurality of computation resources perform region division processes on luminance images of the divided rectangular regions in parallel FIG. 1C shows an example of region label data which, is a result of computations for assigning region labels performed by the image processing device 1. As shown in FIG. 1C, the region label data is data in which each of surrounding pixels belonging to the same peak pixel has been assigned with the same value as the peak label as a region label. Meanwhile, FIG. 1C shows the region label data in such a manner that region labels are superposed on the luminance image shown in FIG. 1A for easy understanding.

Finally, the image processing device 1 connects (integrates) the respective rectangular regions on which the region division process has been performed. Accordingly, the image processing device 1 obtains a final result in which the region division process has been performed on the luminance image.

In this manner, the image processing device 1 performs the region division process for assigning the same region label to surrounding pixels belonging to the same peak pixel in parallel through the plurality of computation resources.

Figure 2:
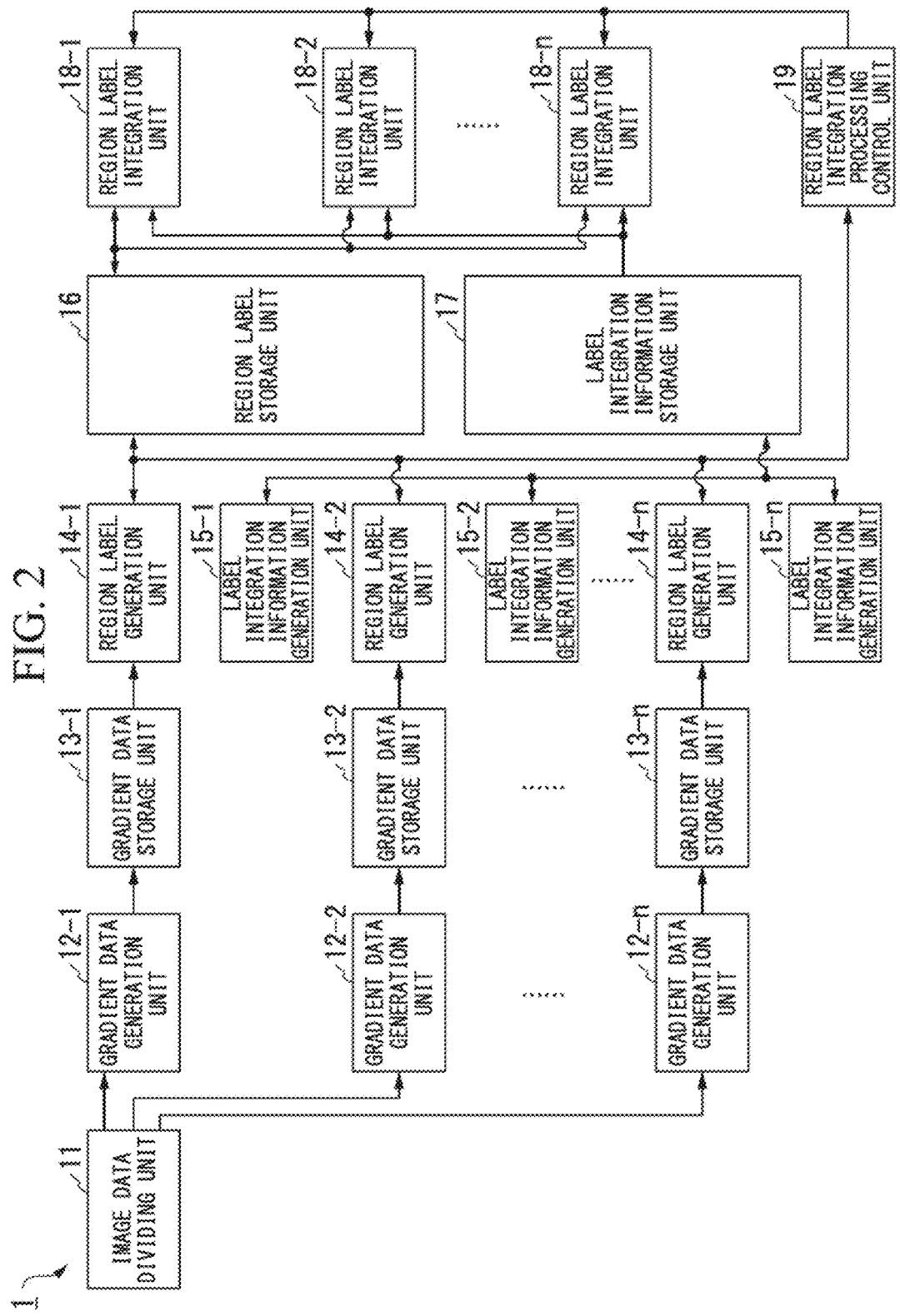
FIG. 2 is a block diagram showing an example of a rough configuration of the image processing device in embodiments of the present invention.

Next, the configuration of the image processing device 1 will be described. FIG. 2 is a block diagram showing an example of a rough configuration of the image processing device 1 in embodiments of the present invention. The image processing device 1 shown in FIG. 2 includes an image data dividing unit 11, n gradient data generation units 12-1 to 12-n, n gradient data storage units 13-1 to 13-n, n region label generation units 14-1 to 14-n, n label integration information generation units 15-1 to 15-n, a region label storage unit 16, a label integration information storage unit 17, n region label integration units 18-1 to 18-n, and a region label integration processing control unit 19.

In the following description, when the gradient data generation units 12-1 to 12-n are represented without being distinguished, the gradient data generation units 12-1 to 12-n are referred to as a "gradient data generation unit 12." In addition, when the gradient data storage units 13-1 to 13-n are represented without being distinguished, the gradient data storage units 13-1 to 13-n are referred to as a "gradient data storage unit 13." Furthermore, when the region label generation units 14-1 to 14-n are represented without being distinguished, the region label generation units 14-1 to 14-n are referred to as a "region label generation unit 14." In addition, when the label integration information generation units 15-1 to 15-n are represented without being distinguished, the label integration information generation units 15-1 to 15-n are referred to as a "label integration information generation unit 15." Furthermore, when the region label integration units 18-1 to 18-u are represented without being distinguished, the region label integration units 18-1 to 18-n are referred to as a "region label integration unit 18."

The image data dividing unit 11 divides a region of an input luminance image into a plurality of predetermined rectangular regions and distributes a luminance image of each divided rectangular region to each gradient data generation unit 12. More specifically, the image data dividing unit 11 regards a divided rectangular region (referred to as "rectangular region" hereinafter) as one unit and sequentially outputs luminance values of pixels included in a luminance image of each rectangular region to allocated gradient data generation units 12.

Figure 3:
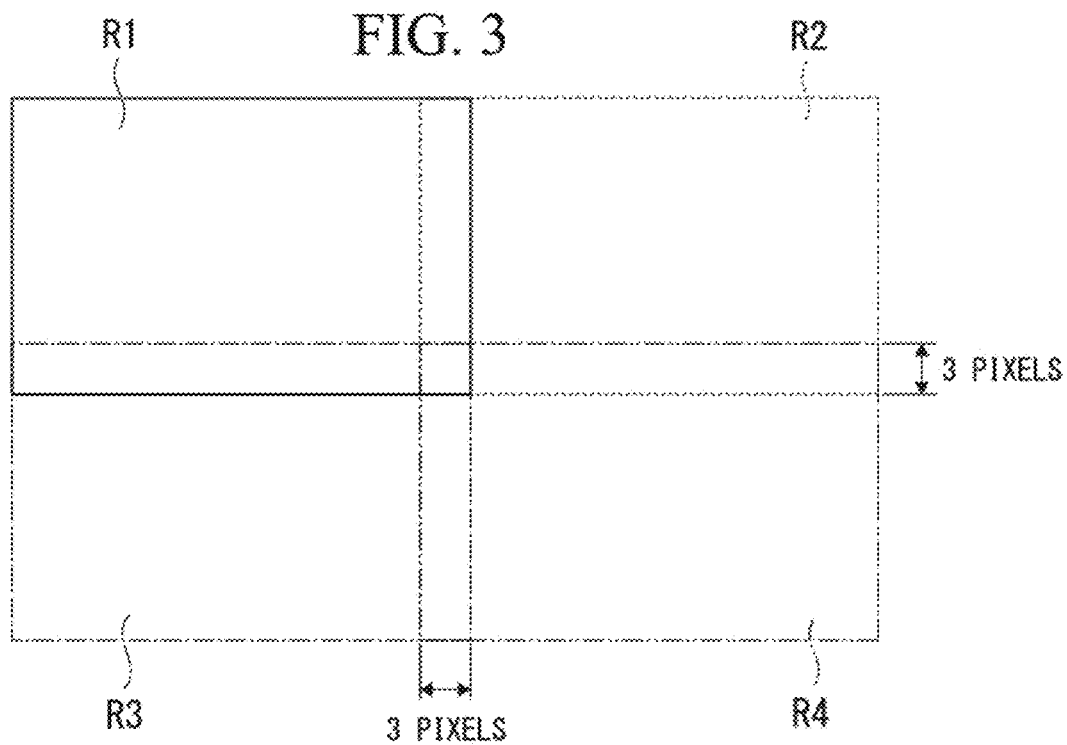
FIG. 3 is a diagram showing an example of a division method in an image data dividing unit included in the image processing device in embodiments of the present invention.

Further, when the image data dividing unit 11 divides a region of the luminance image, the image data dividing unit 11 divides the region of the luminance image such that boundary portions of neighboring rectangular regions overlap by three pixels. FIG. 3 is a diagram showing an example of a method of dividing a luminance image in the image data dividing unit 11 included in the image processing device 1 in embodiments of the present invention. FIG. 3 shows an example of a case in which a region of a luminance image input to the image data dividing unit 11 is divided into four rectangular regions.

More specifically, for example, a rectangular region R1 indicated by a solid line in the region of the luminance image shown in FIG. 3 includes an overlap region corresponding to three pixels at the boundary between the rectangular region R1 and a horizontally neighboring rectangular region R2 indicated by a dotted line and includes an overlap region corresponding to three pixels at the boundary between the rectangular region R1 and a vertically neighboring rectangular region R3 indicated by an alternate long and short dash line. Similarly, the rectangular region R2, the rectangular region R3 and a rectangular region R4 indicated by an alternate long and two short dashes line in FIG. 3 include overlap regions corresponding to three pixels at the boundaries between the corresponding rectangular region and horizontally and vertically neighboring rectangular regions.

As shown in FIG. 3, when the image data dividing unit 11 divides the region of the input luminance image into a plurality of rectangular regions, the image data dividing unit 11 divides the region of the input luminance image while providing regions overlapping by three pixels (referred to as "overlap region" hereinafter) at the boundary between neighboring rectangular regions. Accordingly, in the image processing device 1, a seam portion in the luminance image of each divided rectangular region can be correctly processed in processing of the gradient data generation unit 12 which will be described below.

The number of divisions of a region of the luminance image performed by the image data dividing unit 11, that is, the number of rectangular regions is not limited by the number of gradient data generation units 12 included in the image processing device 1. That is, the image data dividing unit 11 may divide a region of the input luminance image into a number of rectangular regions, which is greater than the number of gradient data generation units 12 included in the image processing device 1. In this case, the image data dividing unit 11 sequentially allocates luminance images of rectangular regions which are not allocated to gradient data generation units 12 which have finished processing for luminance images of already allocated rectangular regions.

Each of the gradient data generation units 12-1 to 12-n is a computation resource which is included in the image processing device 1 and generates gradient data corresponding to a luminance image of a rectangular region allocated by the image data dividing unit 11. More specifically, each of the gradient data generation units 12 determines whether each of a plurality of pixels included in a luminance image of an allocated rectangular region is a peak pixel or a surrounding pixel and generates gradient data in which a peak label has been assigned to a peak pixel and gradient labels have been assigned to surrounding pixels. Then, each of the gradient data generation units 12 outputs the generated gradient data to a corresponding gradient data storage unit 13.

The image data dividing unit 11 divides the region of the input luminance image into a plurality of rectangular regions having the same size, and thus the region of a luminance image of a rectangular region allocated to each of the gradient data generation units 12 has an identical size. Accordingly, gradient data generation processes in the gradient data generation units 12 have the same computational load.

The gradient data generation process performed by the gradient data generation unit 12 sequentially determines whether each of a plurality of pixels included in a luminance image (referred to as "rectangular luminance image" hereinafter) of a rectangular region allocated thereto is a peak pixel or a surrounding pixel. Here, the gradient data generation unit 12 regards a current pixel to be determined as a "target pixel" and determines whether the target pixel is a peak pixel or a surrounding pixel on the basis of the luminance value of the target pixel and luminance values of eight pixels located in the surroundings of the target pixel to generate gradient data. Accordingly, in the gradient data generation process performed by the gradient data generation unit 12, when a pixel (referred to as "outermost pixel" hereinafter) located at the outermost part (outermost periphery) in each rectangular luminance image is set as a target pixel, there being any one of eight pixels located in the surroundings of the target pixel does not exist and thus whether the target pixel is a peak pixel or a surrounding pixel cannot be determined. That is, the gradient data generation unit 12 cannot generate gradient data for the outermost pixel. Accordingly, the region of the gradient data generated by the gradient data generation unit 12 corresponds to a rectangular region from which the outermost pixels have been excluded. That is, the region of the gradient data (referred to as "gradient data region" hereinafter) generated by the gradient data generation unit 12 corresponds to a region which is smaller than the region of an allocated rectangular luminance region by one peripheral pixel.

Figure 4:
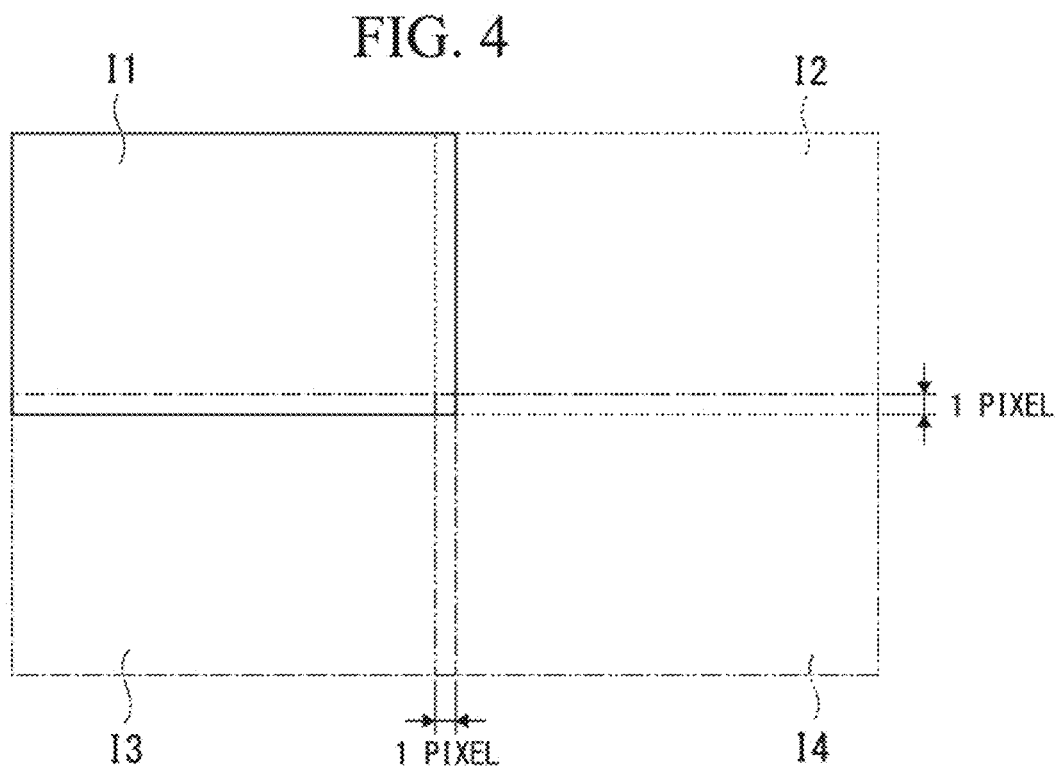
FIG. 4 is a diagram showing an example of a region of gradient data generated by a gradient data generation unit included in the image processing device in embodiments of the present invention.

However, the image data dividing unit 11 overlaps a boundary region of a rectangular luminance image allocated to each gradient data generation unit 12 with a region of a neighboring rectangular luminance image by three pixels, as described above. Accordingly, even when the gradient data generation unit 12 cannot generate gradient data of the outermost pixel in each rectangular luminance image, each of generated gradient data regions can secure an overlap region corresponding to one pixel at a boundary between the corresponding gradient data region and a neighboring gradient data region. FIG. 4 is a diagram showing an example of regions of gradient data (gradient data regions) generated by the gradient data generation unit 12 included in the image processing device 1 in embodiments of the present invention. FIG. 4 shows an example of gradient data regions generated by the gradient data generation unit 12 for four rectangular luminance images divided by the image data dividing unit 11 as shown in FIG. 3. For example, a gradient data region I1 indicated by a solid line in gradient data shown in FIG. 4 shows a gradient data region generated by the gradient data generation unit 12 for the rectangular luminance image of the rectangular region R1 shown in FIG. 3. As shown in FIG. 4, each gradient data region secures an overlap region corresponding to one pixel at a boundary between the corresponding gradient data region and each of neighboring gradient data regions.

More specifically, for example, the gradient data region I1 shown in FIG. 4 secures an overlap region corresponding to one pixel at a boundary between the gradient data region I1 and a horizontally neighboring gradient data region I2 indicated by a dotted line and secures an overlap region corresponding to one pixel at a boundary between the gradient data region I1 and a vertically neighboring gradient data region I3 indicated by an alternate long and short dash line. Similarly, the gradient data region I2, the gradient data region I3 and a gradient data region I4 indicated by an alternate long and two short dashes line in FIG. 4 also secure overlap regions each corresponding to one pixel at boundaries between the corresponding gradient data regions I2, I3 and I4 and horizontally and vertically neighboring gradient data regions.

As shown in FIG. 4, each gradient data region generated by the gradient data generation unit 12 secures an overlap region corresponding to one pixel at a boundary between the corresponding gradient data region and a neighboring gradient data region. Accordingly, in the image processing device 1, integration of divided rectangular regions can be correctly performed by the label integration information generation unit 15 which will be described below.

In the above description, gradient data cannot be generated when an outermost pixel in each rectangular luminance image is set to a target pixel because there being any one of eight pixels located in the surroundings of the target pixel does not exist in the gradient data generation process performed by the gradient data generation unit 12. Accordingly, the image data dividing unit 11 provides an overlap region to each of divided rectangular regions such that the gradient data generation unit 12 can correctly perform the gradient data generation process on a seam part of each rectangular region. However, an overlap region for generating gradient data cannot be provided to pixels located on the outermost periphery in a luminance image input to the image processing device 1, that is, a luminance image before being divided by the image data dividing unit 11, as shown in FIG. 3. Therefore, when the gradient data generation unit 12 sets a pixel (outermost pixel) corresponding to a pixel on the outermost periphery in a luminance image before division as a target pixel and performs the gradient data generation process, the gradient data generation unit 12 determines whether the target pixel is a peak pixel or a surrounding pixel on the basis of only luminance values of valid pixels among eight pixels located in the surroundings of the target pixel to generate gradient data.

Each of the gradient data storage units 13-1 to 13-n stores gradient data output from each of the corresponding gradient data generation units 12-1 to 12-n.

Each of the region label generation units 14-1 to 14-n is a computation resource which is included in the image processing device 1 and performs computation for assigning a region label to surrounding pixels belonging to the same peak pixel on the basis of gradient data of a gradient data region generated by the corresponding gradient data generation unit 12. That is, each of the region label generation units 14-1 to 14-n is a computation resource which performs computation for assigning a region label indicating surrounding pixels belonging to the same peak pixel for a rectangular luminance image allocated to the corresponding gradient data generation unit 12. More specifically, each region label generation unit 14 searches for a peak label included in gradient data stored in the corresponding gradient data storage unit 13 and assigns, to each of surrounding pixels belonging to a peak pixel assigned with the searched peak label, a region label having the same value as the peak label assigned to the peak pixel. In addition, each region label generation unit 14 generates information indicating the position of each pixel assigned with the region label. Then, each region label generation unit 14 outputs the region label assigned to each pixel and the information indicating the position of each pixel assigned with the region label to each of the region label storage unit 16, the corresponding label integration information generation unit 15, and the region label integration processing control unit 19.

Further, in the image processing device 1, the plurality of region label generation units 14 perform computations for assigning region labels on rectangular luminance images allocated to the corresponding gradient data generation units 12 in parallel. Accordingly, the image processing device 1 manages values of region labels assigned by the respective region label generation units 14 such that the values become exclusive values and thus different region label generation units 14 do not assign region labels having the same value to pixels, that is, region labels do not overlap in surrounding pixels belonging to different peak pixels included in a luminance image. For example, such management of region labels may be performed by the region label generation units 14 by referring to label integration information stored in the label integration information storage unit 17 when the region label generation units 14 assign region labels to pixels, for example. Further the management of values of region labels may be performed, for example, by a region label management unit which is not shown.

The image data dividing unit 11 divides a region of an input luminance image into a plurality of rectangular regions having the same size, and the gradient data generation units 12 generate gradient data of rectangular luminance images having the same size. Accordingly, the region label generation units 14 have the same computational load in the region label data generation process.

Each of the label integration information generation units 15-1 to 15-n generates label integration information for integrating a region (referred to as "label region" hereinafter) to which the corresponding region label generation unit 14 has assigned a region label and a label region to which another region label generation unit 14 has assigned a region label on the basis of a region label input from the corresponding region label generation unit 14 and information indicating the position of each pixel assigned with this region label. The label integration information represents association of region labels in each of divided label regions and is configured in the form of a lookup table (LUT), for example. Then, each label integration information generation unit 15 outputs the generated label integration information to the label integration information storage unit 17. Meanwhile, when the label integration information generation unit 15 generates the label integration information, the label integration information generation unit 15 refers to the label integration information which is stored in the label integration information storage unit 17 and generated by other label integration information generation units 15.

The region label storage unit 16 stores a region label output from each of the region label generation units 14-1 to 14-n. In addition, the region label storage unit 16 stores final region label data.

The label integration information storage unit 17 stores label integration information output from each of the label integration information generation units 15-1 to 15-n. Further, the label integration information storage unit 17 integrates label integration information generated by each label integration information generation unit 15 and stores the integrated information as one piece of label integration information. Accordingly, each label integration information generation unit 15 updates the label integration information stored in the label integration information storage unit 17 with generated label integration information.

Each of the region label integration units 18-1 to 18-n is a computation resource which is included in the image processing device 1 and performs computation for updating region labels stored in the region label storage unit 16 with region labels obtained by integrating respective rectangular luminance images with reference to the label integration information stored in the label integration information storage unit 17. More specifically, region labels initially stored in the region label storage unit 16 are region labels for a rectangular luminance image allocated to each gradient data generation unit 12, that is, region labels of divided label regions in which association with other label regions has not been applied. Accordingly, in the case of the region labels stored in the region label storage unit 16, different values may be assigned to surrounding pixels belonging to the same peak pixel. Therefore, the region label integration unit 18 performs a label integration process for updating region labels of surrounding pixels belonging to the same peak pixel with the same value to generate region labels in which association with label regions has been applied, that is, region labels for the luminance image input to the image processing device 1. Then, the region label integration unit 18 outputs the region labels on which the label integration process has been performed to the region label storage unit 16 as final region label data. Accordingly, region label data as shown in FIG. 1C is stored in the region label storage unit 16.

The region label integration processing control unit 19 distributes (allocates) label regions which are targets of label integration processes performed by the respective region label integration units 18 such that the label integration processes performed by the region label integration units 18 have almost uniform computational loads on the basis of a region label assigned to each pixel input from each region label generation unit 14 and information indicating the position of the pixel assigned with the region label.

Each region label integration unit 18 may perform the label integration process on any label region because the label integration information indicating association of region labels in each of divided label regions is stored in advance in the label integration information storage unit 17. That is, the region label integration units 18 can perform the label integration process without correlation therebetween and restrictions on label regions on which the label integration process is performed and a label integration processing order. Accordingly, in the image processing device 1, the same region label data can be finally obtained irrespective of label regions on which the region label integration units 18 performs label integration processes and the order of the label integration processes.

According to the aforementioned configuration, the image processing device 1 performs the region division process for generating region label data in which the same region label as a peak label has been assigned to surrounding pixels belonging to the same peak pixel in the luminance image input thereto in parallel using a plurality of computation resources.

Next, each component included in the image processing device 1 will be described. First, the gradient data generation units 12 will be described. For example, each gradient data generation unit 12 sets target pixels from the pixel located at the top left of a rectangular luminance image allocated by the image data dividing unit 11 in the raster order. Then, each gradient data generation unit 12 determines whether a target pixel is a peak pixel or a surrounding pixel on the basis of the luminance value of the target pixel and luminance values of eight pixels (referred to as "surrounding pixels" hereinafter) located in the surroundings of the target pixel and generates gradient data in which a peak label or a gradient label has been assigned to each target pixel depending on the determination result, as described above. Here, values of the peak label and the gradient label assigned by each gradient data generation unit 12 to each target pixel are predetermined on the basis of a relationship between the luminance value of the target pixel and luminance values of surrounding pixels.

FIGS. 5A to 5I are diagrams showing examples of peak labels or gradient labels provided to pixels (target pixels) on which a process is performed in the image processing device 1 of embodiments of the present invention. Each of FIGS. 5A to 5I shows an example of a value of a peak label or a gradient label assigned to a target pixel by the gradient data generation unit 12 on the basis of a relationship between the luminance value of the target pixel encircled by a circle and luminance values of eight surrounding pixels located around the target pixel. FIGS. 5A to 5H show examples of values of gradient labels assigned by the gradient data generation unit 12 when target pixels are surrounding pixels, and FIG. 5I shows an example of a value of a peak label assigned by the gradient data generation unit 12 when a target pixel is a peak pixel.

As described above, a gradient label indicates a direction toward a pixel having a higher luminance value among pixels located around a target pixel. Accordingly, the gradient data generation unit 12 assigns, to a target pixel, a gradient label having any one of eight values as shown in FIGS. 5A to 5H depending on the direction in which a pixel having a higher luminance value than the target pixel is located. For example, in the example shown in FIG. 5A, there are four surrounding pixels having higher luminance values than the luminance value (="54") of a target pixel in eight surrounding pixels located around the target pixel. In addition, a surrounding pixel located in the left obliquely upward direction has a highest luminance value (="99") in the four surrounding pixels. In this case, the gradient data generation unit 12 determines that the gradient direction viewed from the target pixel is the left obliquely upward direction, that is, the target pixel is a surrounding pixel, and a peak pixel to which the target pixel belongs is located in the left obliquely upward direction. When the luminance value of the target pixel and the luminance values of the surrounding pixels have a relationship therebetween as shown in FIG. 5A, the gradient data generation unit 12 assigns a gradient label having a value "0" for the target pixel.

Similarly, the gradient data generation unit 12 assigns, to respective target pixels, gradient labels having values ("1" to "7") corresponding to directions in which surrounding pixels having higher luminance values are located, viewed from the target pixels. FIG. 5B shows an example in which the gradient data generation unit 12 determines that a peak pixel to which a target pixel belongs is located in the upward direction and assigns a gradient label having a value "1" to the target pixel. In addition, FIG. 5C shows an example in which the gradient data generation unit 12 determines that a peak pixel to which a target pixel belongs is located in the right obliquely upward direction and assigns a gradient label having a value "2" to the target pixel. Furthermore, FIG. 5D shows an example in which the gradient data generation unit 12 determines that a peak pixel to which a target pixel belongs is located in the left direction and provides a gradient label having a value "3" to the target pixel. In addition, FIG. 5E shows an example in which the gradient data generation unit 12 determines that a peak pixel to which a target pixel belongs is located in the right direction and assigns a gradient label having a value "4" to the target pixel. Further, FIG. 5F shows an example in which the gradient data generation unit 12 determines that a peak pixel to which a target pixel belongs is located in the left obliquely downward direction and assigns a gradient label having a value "5" to the target pixel. Further, FIG. 5G shows an example in which the gradient data generation unit 12 determines that a peak pixel to which a target pixel belongs is located in the downward direction and assigns a gradient label having a value "6" to the target pixel. Further, FIG. 5H shows an example in which the gradient data generation unit 12 determines that a peak pixel to which a target pixel belongs is located in the right obliquely downward direction and assigns a gradient label having a value "7" to the target pixel.

Furthermore, as described above, the peak label indicates that a target pixel is a pixel having a highest luminance value among pixels located around the target pixel. Accordingly, when a target pixel is a peak pixel, the gradient data generation unit 12 assigns a peak label having a different value from a gradient label to the target pixel, as shown in FIG. 5I. For example, in the example of FIG. 5I, the target pixel has a higher pixel value than pixel values of eight surrounding pixels located around the target pixel. In this case, the gradient data generation unit 12 determines that the target pixel is a peak pixel having a higher luminance value than the pixels located therearound. When the luminance value of the target pixel and the luminance values of the surrounding pixels have a relationship therebetween as shown in FIG. 5I, the gradient data generation unit 12 assigns a peak label having a value equal to or greater than "8" to the target pixel. Meanwhile, the gradient data generation unit 12 provides peak labels which are different values to respective peak pixels. For example, a peak label having a value "9" is provided to a target pixel determined next to be a peak pixel.

Next, the gradient data generation process in the gradient data generation unit 12 included in the image processing device 1 will be described. FIG. 6 is a flowchart showing a processing procedure in the gradient data generation unit 12 included in the image processing device 1 of embodiments of the present invention. The gradient data generation unit 12 initiates the gradient data generation process when the image data dividing unit 11 allocates a rectangular luminance image.

When generation of gradient data is initiated, first, the gradient data generation unit 12 initializes a peak label value (step S11). Here, the gradient data generation unit 12 sets the initial value of a peak label to "8" shown in FIG. 5I.

Subsequently, the gradient data generation unit 12 sets target pixels from the pixel located at the top left of the allocated rectangular luminance image in the raster order and performs a process of determining whether each target pixel is a peak pixel or a surrounding pixel for all pixels included in the rectangular luminance image in the loop of step S12.

In the target pixel determination process in the gradient data generation unit 12, first, the luminance value of a target pixel and the luminance value of each of surrounding pixels located in the surroundings of the target pixel are acquired from the rectangular luminance image, and the luminance value of the current target pixel is compared with the luminance value of each surrounding pixel (step S13).

Subsequently, the gradient data generation unit 12 determines whether the luminance value of the current target pixel is higher than the luminance value of any one of surrounding pixels (step S14). That is, the gradient data generation unit 12 determines whether the current target pixel is a peak pixel in step S14.

When it is determined that the luminance value of the current target pixel is not higher than the luminance value of any one of the surrounding pixels, that is, the current target pixel is a surrounding pixel in step S14 ("NO" in step S14), the gradient data generation unit 12 generates gradient data to which a gradient label of a value corresponding to a direction in which a surrounding pixel having a highest luminance value among surrounding pixels having higher luminance values than the current target pixel is located has been assigned, and outputs the gradient data to the gradient data storage unit 13 in step S15. Then, the gradient data generation unit 12 returns to step S12 and performs the determination process on the next target pixel.

On the other hand, when it is determined that the luminance value of the current target pixel is higher than the luminance value of any one of the surrounding pixels, that is, the current target pixel is a peak pixel in step S14 ("YES" in step S14), the gradient data generation unit 12 generates gradient data in which a peak label of a current value (initially the initial value (="8")) has been assigned for the current target pixel and outputs the gradient data to the gradient data storage unit 13 in step S16. For example, in the example shown in FIG. 5I, the gradient data generation unit 12 generates gradient data in which a peak label having a value of "8" has been assigned and outputs the gradient data to the gradient data storage unit 13. Further, the gradient data generation unit 12 adds "1" to the value of the current peak label to change the value of the next peak label to a different value (initially "9" obtained by adding "1" to the initial value (="8")). Then, the gradient data generation unit 12 returns to step S12 and performs the determination process on the next target pixel.

In this manner, each of the plurality of gradient data generation units 12 included in the image processing device 1 performs the target pixel determination process represented by the loop of step S12 on all pixels included in the rectangular luminance image to generate gradient data of the allocated rectangular luminance image. Accordingly, gradient data of one rectangular luminance image in which a gradient label or a peak label has been assigned to each pixel, that is, gradient data of one gradient data region is stored in the gradient data storage unit 13 corresponding to each of the gradient data generation units 12.

Then, each region label generation unit 14 performs a region label generation process for assigning a region label to surrounding pixels belonging to the same peak pixel in gradient data (gradient data of one gradient data region) of a rectangular luminance image stored in the corresponding gradient data storage unit 13.

Figure 7:
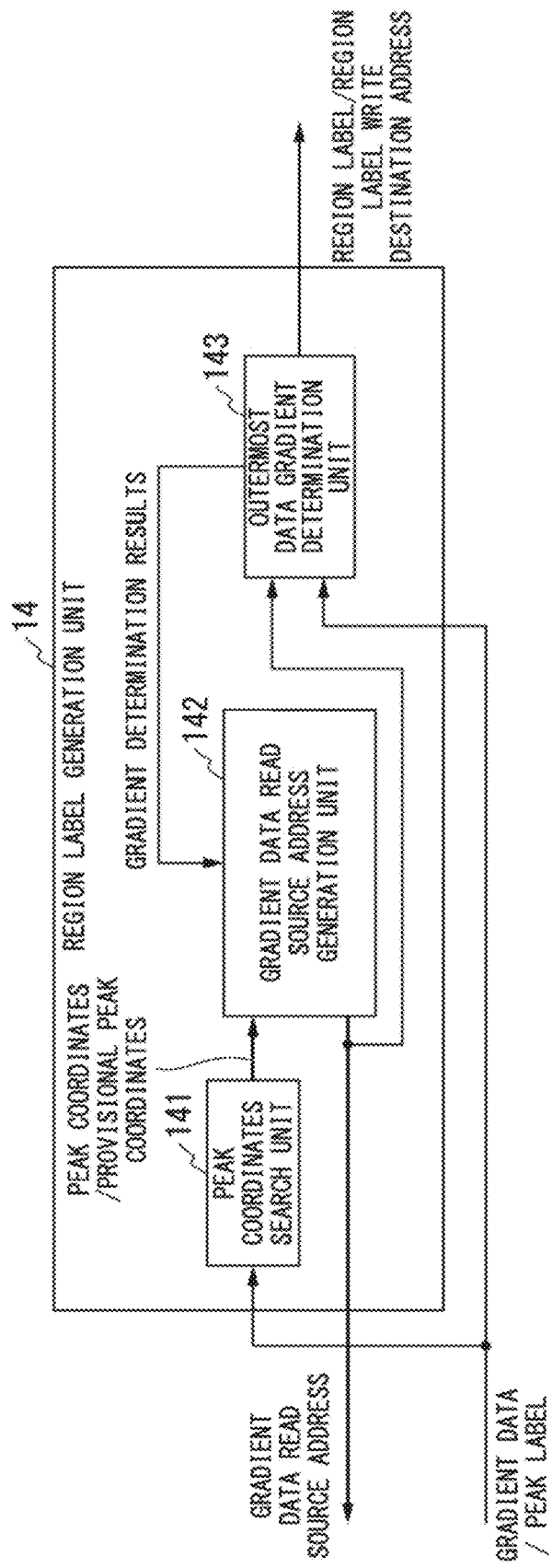
FIG. 7 is a block diagram showing a configuration of a region label generation unit included in the image processing device of embodiments of the present invention.

Next, a configuration and operation of the region label-generation unit 14 included in the image processing device 1 will be described. FIG. 7 is a block diagram showing a configuration of the region label generation unit 14 included in the image processing device 1 of embodiments of the present invention. The region label generation unit 14 shown in FIG. 7 includes a peak coordinates search unit 141, a gradient data read source address generation unit 142, and an outermost data gradient determination unit 143.

The peak coordinates search unit 141 sequentially reads gradient data of one gradient data region stored in the corresponding gradient data storage unit 13 for respective pixels and searches the read gradient data for a peak label. That is, the peak coordinates search unit 141 detects a peak pixel assigned with a peak label in the gradient data. Then, when the peak pixel is detected, the peak coordinates search unit 141 outputs coordinates indicating the position of the detected peak pixel (referred to as "peak coordinates" hereinafter) to the gradient data read source address generation unit 142.

In the image processing device 1, computation for assigning a region label to each divided rectangular luminance image is performed. Accordingly, all pixels included in one gradient data region do not necessarily belong to any one of peak pixels included in the same gradient data region. For example, there may be a pixel belonging to a peak pixel included in a neighboring gradient data region. Accordingly, the peak coordinates search unit 141 detects a pixel belonging to a neighboring gradient data region among outermost pixels located on the outermost periphery in the gradient data region simultaneously with detection of a peak pixel included in the gradient data region. That is, the peak coordinates search unit 141 detects a surrounding pixel assigned with a gradient label indicating a direction from the surrounding pixel to outside of the gradient data region in outermost pixels. Then, the peak coordinates search unit 141 regards a detected outermost pixel belonging to the neighboring gradient data region as a provisional peak pixel (referred to as "provisional peak pixel" hereinafter) and also outputs coordinates (referred to as "provisional peak coordinates" hereinafter) indicating the position of the provisional peak pixel together with the peak coordinates to the gradient data read source address generation unit 142.

In addition, in the image processing device 1, a peak pixel is not necessarily located at a position other than the outermost periphery of a gradient data region. That is, a peak pixel may be an outermost pixel. Accordingly, when the peak coordinates search unit 141 detects a peak pixel located on the outermost periphery of a gradient data region, the peak coordinates search unit 141 treats the peak pixel corresponding to an outermost pixel as a provisional peak pixel and outputs the peak coordinates corresponding to the peak pixel to the gradient data read source address generation unit 142 as provisional peak coordinates.

That is, coordinates output by the peak coordinates search unit 141 to the gradient data read source address generation unit 142 include peak coordinates indicating the position of a peak pixel, provisional peak coordinates indicating the position of a provisional peak pixel, and provisional peak coordinates indicating the position of a peak pixel treated as a provisional peak pixel.

In the following description, a provisional peak pixel and a peak pixel which is not treated as a provisional peak pixel are referred to as "true peak pixel" and peak coordinates indicating the position of the true peak pixel is referred to as "true peak coordinates." In addition, when a true peak pixel and a provisional peak pixel are represented without being distinguished from each other, they are called "peak pixels," and when true peak coordinates and provisional peak coordinates are represented without being distinguished from each other, they are called "peak coordinates" in the following description.

Further, the peak coordinates search unit 141 continues to search for peak labels and gradient labels until searching for all peak pixels included in gradient data stored in the gradient data storage unit 13 is complete. Accordingly, for example, a configuration in which peak coordinates indicating the position of each of detected peak pixels are temporarily stored in a first-input first-out (FIFO) type storage region, and when processes performed by the gradient data read source address generation unit 142 and the outermost data gradient determination unit 143 are finished, the following peak coordinates are sequentially output from the FIFO type storage region to the gradient data read source address generation unit 142 may be used as a configuration of the peak coordinates search unit 141. In the case of such a configuration, the peak coordinates search unit 141 can notify the gradient data read source address generation unit 142 of completion of detection of all peak pixels by outputting a completion signal indicating completion of detection of all peak pixels to the gradient data read source address generation unit 142 when detection of all peak pixels included in corresponding gradient data is completed.

In addition, for example, a configuration in which the peak coordinates are temporarily stored after a peak pixel detection for outputting the peak coordinates to the gradient data read source address generation unit 142 is performed, the processes of the gradient data read source address generation unit 142 and the outermost data gradient determination unit 143 are terminated, and detection of the following peak pixels is waited until the temporarily stored peak coordinates are output to the gradient data read source address generation unit 142 may be used as another configuration of the peak coordinates search unit 141. The peak coordinates search unit 141 having such a configuration can also notify the gradient data read source address generation unit 142 of completion of detection of all peak pixels included in corresponding gradient data by outputting the completion signal to the gradient data read source address generation unit 142.

Furthermore, for example, a configuration in which a notification signal indicating that the next peak pixel has been detected, that is, there are peak coordinates to be output, is output to the gradient data read source address generation unit 142, and when a request signal for requesting output of the next peak coordinates is input from the gradient data read source address generation unit 142, peak coordinates corresponding to the next peak pixel are output may be used as another configuration of the peak coordinates search unit 141. In the case of such a configuration, the peak coordinates search unit 141 can indicate completion of detection of all peak pixels included in corresponding gradient data by outputting no notification signal.

The configuration of the peak coordinates search unit 141 is not limited to the above-described configurations and may be any configuration which can realize the same functions.

The gradient data read source address generation unit 142 generates a gradient data read source address for reading a gradient label or a peak label from the gradient data storage unit 13 in order to assign a region label to each surrounding pixel belonging to a peak pixel corresponding to peak coordinates input from the peak coordinates search unit 141. Meanwhile, the gradient data read source address generated by the gradient data read source address generation unit 142 is an address of the gradient data storage unit 13 which indicates a storage region corresponding to a currently processed, gradient data region. In addition the gradient data read source address generation unit 142 outputs the generated gradient data read source address to the gradient data storage unit 13 and causes a gradient label or a peak label stored in the storage region corresponding to the gradient data read source address to be output to the outermost data gradient determination unit 143. Further, the gradient data read source address generation unit 142 outputs the generated gradient data read source address to the outermost data gradient determination unit 143. In addition, the gradient data read source address generation unit 142 generates another gradient data read source address on the basis of a gradient determination result input from the outermost data gradient determination unit 143 and outputs the generated gradient data read source address to the gradient data storage unit 13 and the outermost data gradient determination unit 143.

The outermost data gradient determination unit 143 determines each surrounding pixel belonging to the same peak pixel on the basis of gradient data read source addresses input from the gradient data read source address generation unit 142 and gradient labels and peak labels input from the gradient data storage unit 13. In addition, the outermost data gradient determination unit 143 outputs a gradient data read source address of a surrounding pixel determined to belong to the same peak pixel to the gradient data read source address generation unit 142 as a gradient determination result which represents coordinates indicating the position of the surrounding pixel determined to belong to the same peak pixel. Accordingly, the gradient data read source address generation unit 142 reads another gradient label.

In addition, the outermost data gradient determination unit 143 generates a region label corresponding to a peak pixel and a region label write destination address indicating the position of the peak pixel and outputs the generated region label a d region label write destination address to the region label storage unit 16, the corresponding label integration information generation unit 15 and the region label integration processing control unit 19. The outermost data gradient determination unit 143 generates a region label having different values depending on whether a currently processed peak pixel is a true peak pixel or a provisional peak pixel. In addition, the region label write destination address generated by the outermost data gradient determination unit 143 is an address of the region label storage unit 16 which indicates a storage region corresponding to a currently processed gradient data region.

Furthermore, the outermost data gradient determination unit 143 generates a region label write destination address indicating the position of each surrounding pixel belonging to the same peak pixel and outputs the generated region label write destination address and a region label generated corresponding to a peak pixel to which each surrounding pixel belongs to the region label storage unit 16, the corresponding label integration information generation unit 15, and the region label integration processing control unit 19. Accordingly, a region label corresponding to the currently processed gradient data region is stored in the storage region corresponding to the region label write destination address of the region label storage unit 16. In addition, the label integration information generation unit 15 generates label integration information. Furthermore, the region label integration processing control unit 19 controls allocation of the region label integration units 18 which perform the label integration process.

The image processing device 1 performs computations for assigning region labels to divided rectangular luminance images in parallel using the plurality of region label generation units 14, as described above, and this a plurality of pieces of region label data corresponding to respective divided rectangular luminance images are stored in the region label storage unit 16. Here, each piece of region label data stored in the region label storage unit 16 is in a state in which association with neighboring label regions has not been applied. Accordingly, the image processing device 1 manages values of region labels assigned by the respective region label generation units 14 such that the values become exclusive values and thus region labels are not duplicated in surrounding pixels belonging to different peak pixels, as described above.

Figure 8:
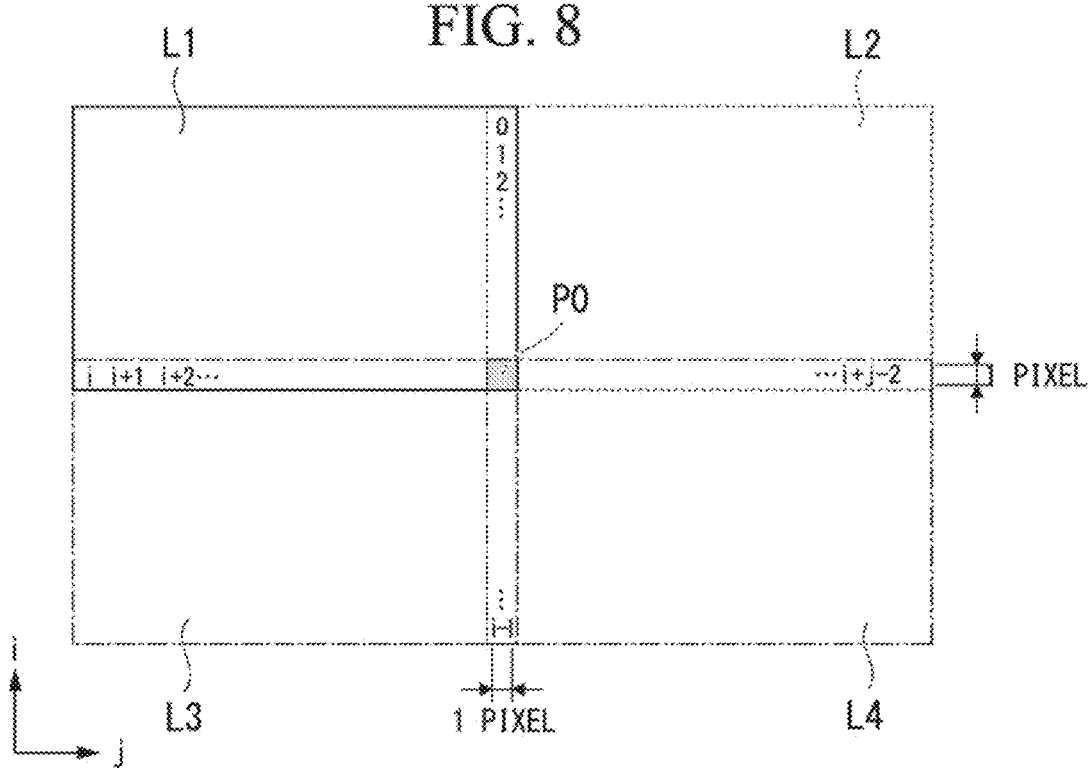
FIG. 8 is a diagram showing a relationship between a label region and a region label in the image processing device of embodiments of the present invention.

FIG. 8 is a diagram showing a relationship between a label region and a region label in the image processing device 1 of embodiments of the present invention. In the image processing device 1, a value of a region label assigned to each peak pixel in the region label generation unit 14 is predetermined on the basis of the number of divisions when a luminance image input to the image processing device 1 is divided into rectangular luminance images.

More specifically, in the image processing device 1, each gradient data generation unit 12 generates gradient data in a state in which an overlap region corresponding to one pixel is secured at the boundary between neighboring gradient data regions. Accordingly, region label data generated by the region label generation unit 14 which corresponds to each piece of gradient data also includes an overlap region corresponding to one pixel at the boundary between neighboring label regions, as shown in FIG. 8. Coordinates of pixels located in the overlap region can be uniquely mapped to the pixels depending on the number of divisions of a luminance image input to the image processing device 1. Accordingly, in the image processing device 1, the value of a region label assigned to a true peak pixel or a provisional peak pixel located in the overlap region and a value of a region label assigned to a true peak pixel located in a region other than the overlap region are separately considered.

FIG. 8 shows an example of a region label allocated to each pixel located in an overlap region which is secured when a luminance image is divided into four rectangular region and region labels are generated. More specifically, FIG. 8 shows an example of region labels assigned to pixels located in the overlap region when the pixels are true peak pixels or provisional peak pixels in a case in which the number of pixels in the vertical direction (longitudinal direction) in the luminance image is regarded as "i" and the number of pixels in the horizontal direction (lateral direction) in the luminance image is regarded as "j."

The example shown in FIG. 8 shows a case in which values of "0" to "i−1" are allocated as values of region labels assigned when each of a plurality of pixels located in horizontal boundary portions between the label region L1 and the label region L2 and between the label region L3 and the label region L4 is a true peak pixel or a provisional peak pixel. In addition, the example shown in FIG. 8 shows a case in which values of "i" to "i+j−2" are allocated as values of region labels assigned when each of a plurality of pixels located in vertical boundary portions between a label region L1 and a label region L3 and between a label region L2 and a label region L4 is a true peak pixel or a provisional peak pixel. That is, the example shown in FIG. 8 shows a state in which values of region labels corresponding to the sum of the number of pixels located in the vertical direction and the number of pixels located in the horizontal direction in the overlap regions have been uniquely predetermined.

A pixel P0 located at the position which overlaps with all label regions L1 to L4 shown in FIG. 8 is a pixel which is present in the vertical boundary portion and present in the horizontal boundary portion. Accordingly, the image processing device 1 performs processing such that two region label values are not allocated to one pixel, that is, region labels are not duplicated at one pixel. To this end, in the example shown in FIG. 8, a region label value, which is assigned to a pixel located at a position following the pixel P0 in the horizontal boundary portion when the pixel is a true peak pixel or a provisional peak pixel, is set to "−2". For example, in the example shown in FIG. 8, a region label value, which is assigned to the last pixel present in the horizontal boundary portion, that is, the right-edge pixel in the horizontal boundary portion between the label region L2 and the label region LA when the last pixel is a true peak pixel or a provisional peak pixel, is "i+j−2."

In addition, in the image processing device 1, a minimum value of a region label value assigned to a true peak pixel located in a region other than the overlap regions is predetermined as a value corresponding to a region label value allocated to a pixel in the overlap regions plus 1.

Further, in the image processing device 1, predetermined region label values are mapped to addresses in label integration information which will be described below. In addition, in the image processing device 1, each region label integration unit 18 performs the label integration process for integrating region labels stored in the region label storage unit 16 on the basis of the label integration information to generate final region label data.

Figure 9A:
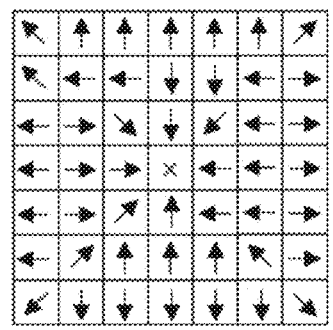
FIG. 9A is a diagram schematically showing an example of a region label generation process performed by the region label generation unit included in the image processing device of embodiments of the present invention.

Here, the operation of the region label generation unit 14 included in the image processing device 1 will be described. FIGS. 9A to 9O are diagrams schematically showing an example of a region label generation process performed by the region label generation unit 14 included in the image processing device 1 of embodiments of the present invention. FIGS. 9A to 9G show a process of assigning a region label to surrounding pixels belonging to the same peak pixel by the region label generation unit 14 in stages. Further, FIGS. 9A to 9G show processes performed by the gradient data read source address generation unit 142 and the outermost data gradient determination unit 143 after a true peak pixel is detected by the peak coordinates search unit 141 and true peak coordinates corresponding to the detected true peak pixel are input. Further, similar processes of the gradient data read source address generation unit 142 and the outermost data gradient determination unit 143 can be used when the peak coordinates search unit 141 detects a provisional peak pixel. In the following description, a region label assigned to a true peak pixel detected by the peak coordinates search unit 141 is set to a peak label value of "8" for facilitation of description.

FIG. 9A shows an example of gradient data stored in the gradient data storage unit 13. In the gradient data shown in FIG. 9A, a true peak pixel detected by the peak coordinates search unit 141 is located at the center and a gradient label is assigned to each of surrounding pixels located around the true peak pixel. Meanwhile, in the gradient data shown in FIG. 9A, the true peak pixel is indicated by a sign "×" and the gradient label is schematically indicated by an arrow like the gradient data shown in FIG. 1B.

Figure 9B:
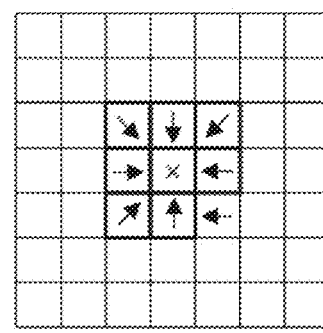
FIG. 9B is a diagram schematically showing an example of the region label generation process performed by the region label generation unit included in the image processing device of embodiments of the present invention.

When true peak coordinates of the true peak pixel (sign "×") which is a computation target are input, the gradient data read source address generation unit. 142 reads a peak label of the true peak pixel at the position indicated by the input true peak coordinates and gradient data of surrounding pixels corresponding to eight pixels around the true peak pixel from the gradient data storage unit 13. Accordingly, the peak label of the true peak pixel and the gradient data of the surrounding pixels corresponding to the eight pixels around the true peak pixel are input to the outermost data gradient determination unit 143. Then, the outermost data gradient determination unit 143 determines whether gradient labels assigned to the gradient data of the input eight surrounding pixels represent gradient directions toward the input true peak pixel. The example shown in FIG. 9B shows a state in which gradient data other than the gradient data of the right bottom surrounding pixel of the true peak pixel in the gradient data of the eight surrounding pixels represents gradient directions toward the true peak pixel.

Figure 9C:
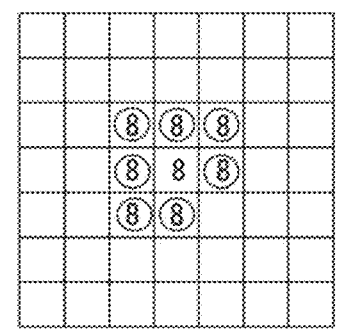
FIG. 9C is a diagram schematically showing an example of the region label generation process performed by the region label generation unit included in the image processing device of embodiments of the present invention.

The outermost data gradient determination unit 143 assigns a region label having the same value as the peak label of the true peak pixel to each of the surrounding pixels corresponding to the gradient data which represents the gradient directions toward the true peak pixel. The example shown in FIG. 9C shows a state in which a region label having the same value (here, "8" encircled by a circle) as the peak label of the me peak pixel is assigned to the surrounding pixels representing the gradient directions toward the true peak pixel, that is, the surrounding pixels other than the right bottom surrounding pixel of the true peak pixel.

Figure 9D:
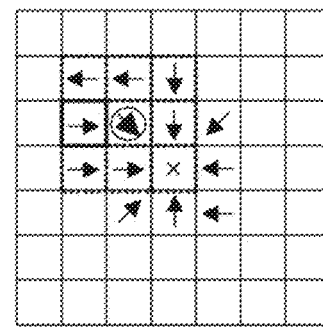
FIG. 9D is a diagram schematically showing an example of the region label generation process performed by the region label generation unit included in the image processing device of embodiments of the present invention.

Then, the outermost data gradient determination unit 143 outputs gradient determination results indicating the position of each surrounding pixel assigned with the same region label to the gradient data lead source address generation unit 142. Accordingly, the gradient data read source address generation unit 142 sequentially sets each of the surrounding pixels included in the input gradient determination results as a center and reads gradient data of eight surrounding pixels around each of the surrounding pixels which is set to a center from the gradient data storage unit 13. Accordingly, the outermost data gradient determination unit 143 determines whether gradient labels assigned to the read gradient data of the eight surrounding pixels represent gradient directions toward the surrounding pixel set to a center. The example shown in FIG. 9D shows a case in which a surrounding pixel which is located at the right top of the true peak pixel and encircled by a circle is set to a center and gradient data of eight surrounding pixels around the surrounding pixel is read from the gradient data storage unit 13. In addition, the example shown in FIG. 9D shows a state in which only gradient data of a left central surrounding pixel represents a gradient direction toward the surrounding pixel set to the center in the read gradient data of the eight surrounding pixels.

Figure 9E:
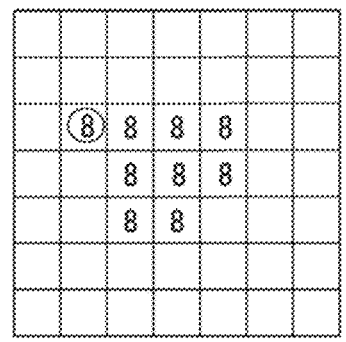
FIG. 9E is a diagram schematically showing an example of the region label generation process performed by the region label generation unit included in the image processing device of embodiments of the present invention.

The outermost data gradient determination unit 143 assigns a region label having the same value as the region label assigned to the surrounding pixel set to the center to each surrounding pixel corresponding to gradient data representing a gradient direction toward the surrounding pixel set to the center. The example shown in FIG. 9E shows a state in which a region label having the same value (here, "8" encircled by a circle) is assigned only to the left central surrounding pixel which represents a gradient direction toward the surrounding pixel set to the center.

Figure 9F:
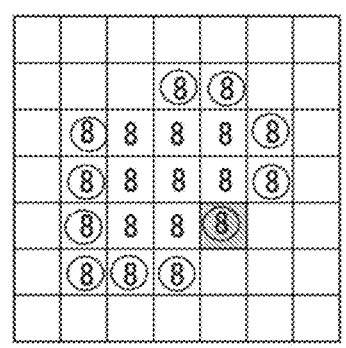
FIG. 9F is a diagram schematically showing an example of the region label generation process performed by the region label generation unit included in the image processing device of embodiments of the present invention.

In the same manner, the outermost data gradient determination unit 143 assigns the region label having the same value (here, "8" encircled by a circle) as the peak label of the true peak pixel to surrounding pixels of a region as shown in FIG. 9F by sequentially setting each of surrounding pixels assigned with the same region label ("8" encircled by a circle in FIG. 9C) to a center and determining whether gradient data of surrounding pixels around the surrounding pixel set to the center represents gradient directions toward the surrounding pixels set to the center.

In FIG. 9F, the region label having the same value is also assigned to the right bottom surrounding pixel (surrounding pixel represented as a halftone portion) of the true peak pixel, which is determined to be a surrounding pixel which does not represent a gradient direction toward the true peak pixel in FIG. 9B. This is because the right bottom surrounding pixel of the true peak pixel is determined to represent a gradient direction toward a bottom central surrounding pixel of the true peak pixel on the basis of the result of determination of whether the right bottom surrounding pixel of the true peak pixel represents the gradient direction toward the bottom central surrounding pixel of the true peak pixel which is set as a center.

Thereafter, in the same manner, the outermost data gradient determination unit 143 newly outputs gradient determination results indicating the position of each surrounding pixel assigned with the same region label to the gradient data read source address generation unit 142, and the gradient data read source address generation unit 142 sequentially sets each of the surrounding pixels included in the input gradient determination results as a center and reads gradient data of eight surrounding pixels around each of the surrounding pixels which is set to a center from the gradient data storage unit 13. Then, in the same manner, the outermost data gradient determination unit 143 sequentially sets each of the newly input, surrounding pixels assigned with the same region label to a center, determines whether surrounding pixels represent gradient directions toward a surrounding pixel set to the center, and assigns the region label having the same value to surrounding pixels determined to represent gradient directions toward the surrounding pixel set to the center.

Figure 9G:
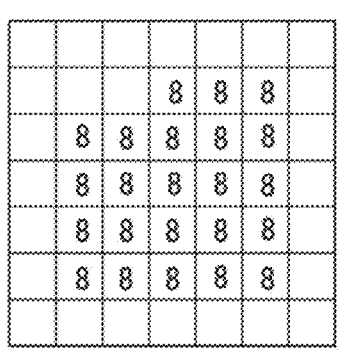
FIG. 9G is a diagram schematically showing an example of the region label generation process performed by the region label generation unit included in the image processing device of embodiments of the present invention.

In this manner, the gradient data read source address generation unit 142 and the outermost data gradient determination unit 143 sequentially extend a region for which gradient directions are determined from the true peak pixel located at the center, and when it is determined that all surrounding pixels included in gradient data of one gradient data region which is currently being processed do not represent gradient directions toward a surrounding pixel as a center, end the process of assigning a region label to surrounding pixels belonging to the same true peak pixel, that is, the region label generation process. FIG. 9G shows an example of region label data which corresponds to a currently processed gradient data region and is obtained by assigning the region label depending on results of determination of gradient directions when sequentially setting surrounding pixels encircled by a circle in FIG. 9F as centers, and then ending the region label generation process for the true peak pixel (true peak pixel indicated by the sign "×" in FIGS. 9A, 9B and 9D) which is a computation target.

Figure 10:
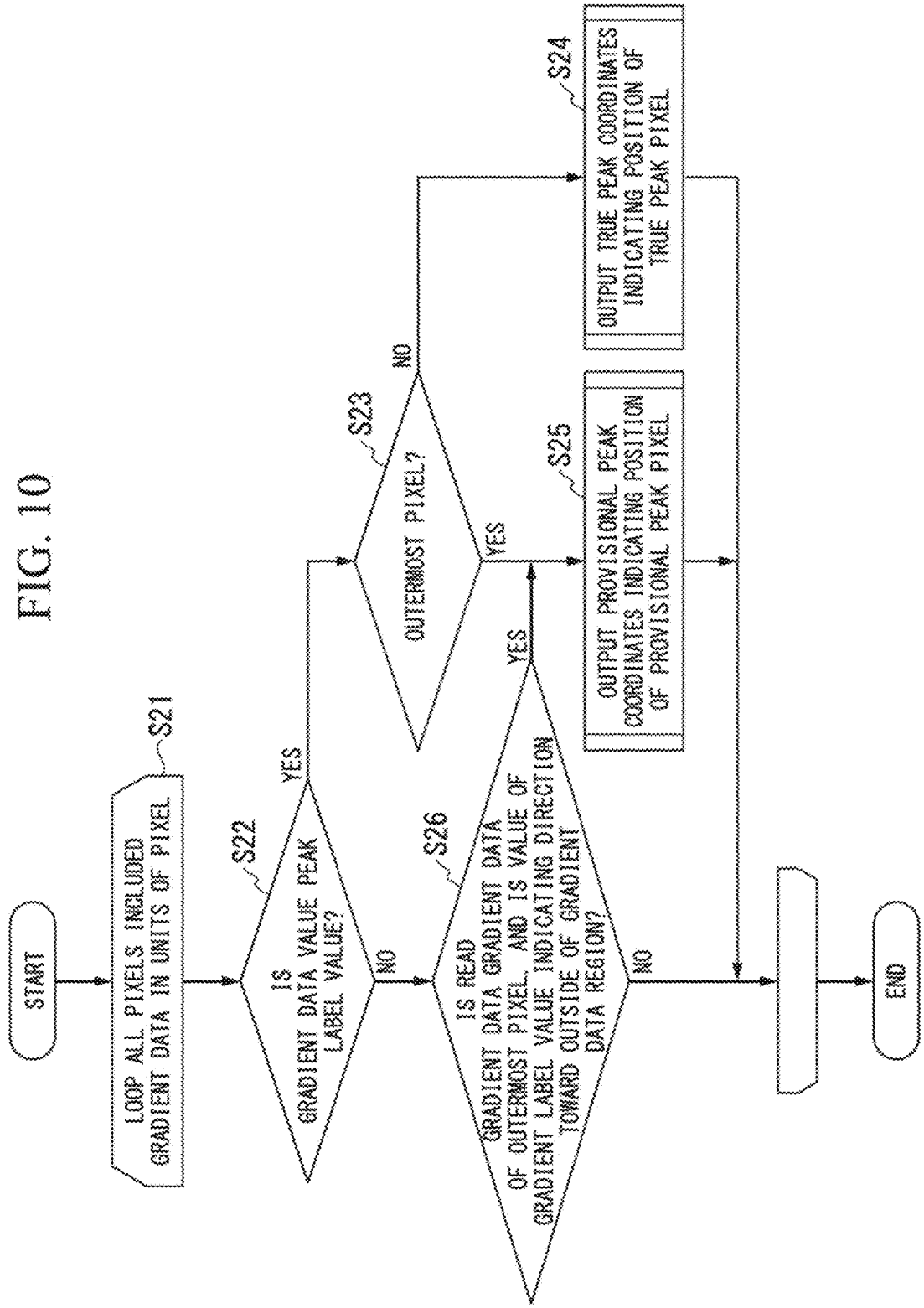
FIG. 10 is a flowchart showing a processing procedure in a peak coordinates search unit included in the image processing device of embodiments of the present invention.

Next, the operation of each component included in the region label generation unit 14 will be described. First, a peak coordinates searching process in the peak coordinates search unit 141 will be described. FIG. 10 is a flowchart showing a processing procedure in the peak coordinates search unit 141 included in the image processing device of embodiments of the present invention. The peak coordinates search unit 141 initiates searching for peak coordinates when the gradient data generation unit 12 finishes generation of gradient data and the generated gradient data is stored in the gradient data storage unit 13.

When searching for peak coordinates is initiated, the peak coordinates search unit 141 reads gradient data stored in the gradient data storage unit 13, for example, from the top left pixel in the raster order and performs the process of determining whether the read gradient data is gradient data corresponding to a true peak pixel or a provisional peak pixel, that is, a process of detecting a true peak pixel and a provisional peak pixel for all pixels included in the gradient data in the loop of step S21.

In the gradient data determination process in the peak coordinates search unit 141, first, whether the value of read gradient data is a peak label value indicating a peak pixel is determined (step S22). For example, the peak coordinates search unit 141 determines whether the value of the gradient data is a value equal to or greater than a peak label value of "8" in step S22.

When it is determined that the value of the gradient data is the peak label value, that is, the read gradient data is gradient data of a peak pixel in step S22 ("YES" in step S22), the peak coordinates search unit 141 determines whether the current peak pixel assigned with the peak label is an outermost pixel in step S23 (step S23).

When it is determined that the current peak pixel is not an outermost pixel, that is, the current peak pixel is a true peak pixel located at a position other than the outermost periphery of the corresponding gradient data region in step S23 ("NO" in step S23), the peak coordinates search unit 141 outputs true peak coordinate indicating the position of the current true peak pixel to the gradient data read source address generation unit 142 in step S24. For example, the peak coordinates search unit 141 outputs true peak coordinates indicating the position of the true peak pixel indicated by a sign "×" in FIGS. 9A to 9G to the gradient data read source address generation unit 142. Then, the peak coordinates search unit 141 returns to step S21 and performs the determination process on the next gradient data.

On the other hand, when it is determined that the current peak pixel is an outermost pixel, that is, the read gradient data is gradient data of a peak pixel but the peak pixel is a peak pixel treated as a provisional peak pixel located on the outermost periphery of the gradient data region in step S23 ("YES" in step S23), the peak coordinates search unit 141 treats the current peak pixel as a provisional peak pixel and outputs provisional peak coordinates indicating the position of the current provisional peak pixel to the gradient data read source address generation unit 142 in step S25. Then, the peak coordinates search unit 141 returns to step S21 and performs the determination process on the next gradient data.

On the other hand, when it is determined that the value of the gradient data is not a peak label value, that is, the read gradient data is not gradient data of a peak pixel in step S22 ("NO" in step S22), the peak coordinates search unit 141 determines whether the read gradient data is gradient data of an outermost pixel and the value of the gradient data is a gradient label value indicating a direction to outside of the gradient data region (step S26). That is, the peak coordinates search unit 141 determines whether the read gradient data corresponds to an outermost pixel (provisional peak pixel) belonging to a neighboring gradient data region in step S26.

When it is determined that the read gradient data is gradient data of a provisional peak pixel in step S26 ("YES" in step S26), the peak coordinates search unit 141 outputs provisional peak coordinates indicating the position of the provisional peak pixel assigned with the current gradient label to the gradient data read source address generation unit 142 in step S25. Then, the peak coordinates search unit 141 returns to step S21 and performs the determination process on the next gradient data.

On the other hand, when it is determined that the read gradient data is not gradient data of a provisional peak pixel in step S26 ("NO" in step S26), the peak coordinates search unit 141 returns to step S21 and performs the determination process on the next gradient data.

In this manner, the peak coordinates search unit 141 performs the gradient data determination process represented through the loop of step S21 on all pixels included in gradient data to detect all true peak pixels and provisional peak pixels included in the gradient data stored in the gradient data storage unit 13 and outputs true peak coordinates and provisional peak coordinates corresponding to the detected true peak pixels and provisional peak pixels to the gradient data read source address generation unit 142. Accordingly, the peak coordinates searching process performed on gradient data of one gradient data region which is stored in the gradient data storage unit 13 is completed.

In addition, the gradient data read source address generation unit 142 and the outermost data gradient determination unit 143 perform the region label generation process for assigning a region label to surrounding pixels belonging to the same true peak pixel or provisional peak pixel in gradient data stored in the gradient data storage unit 13.

Figure 11:
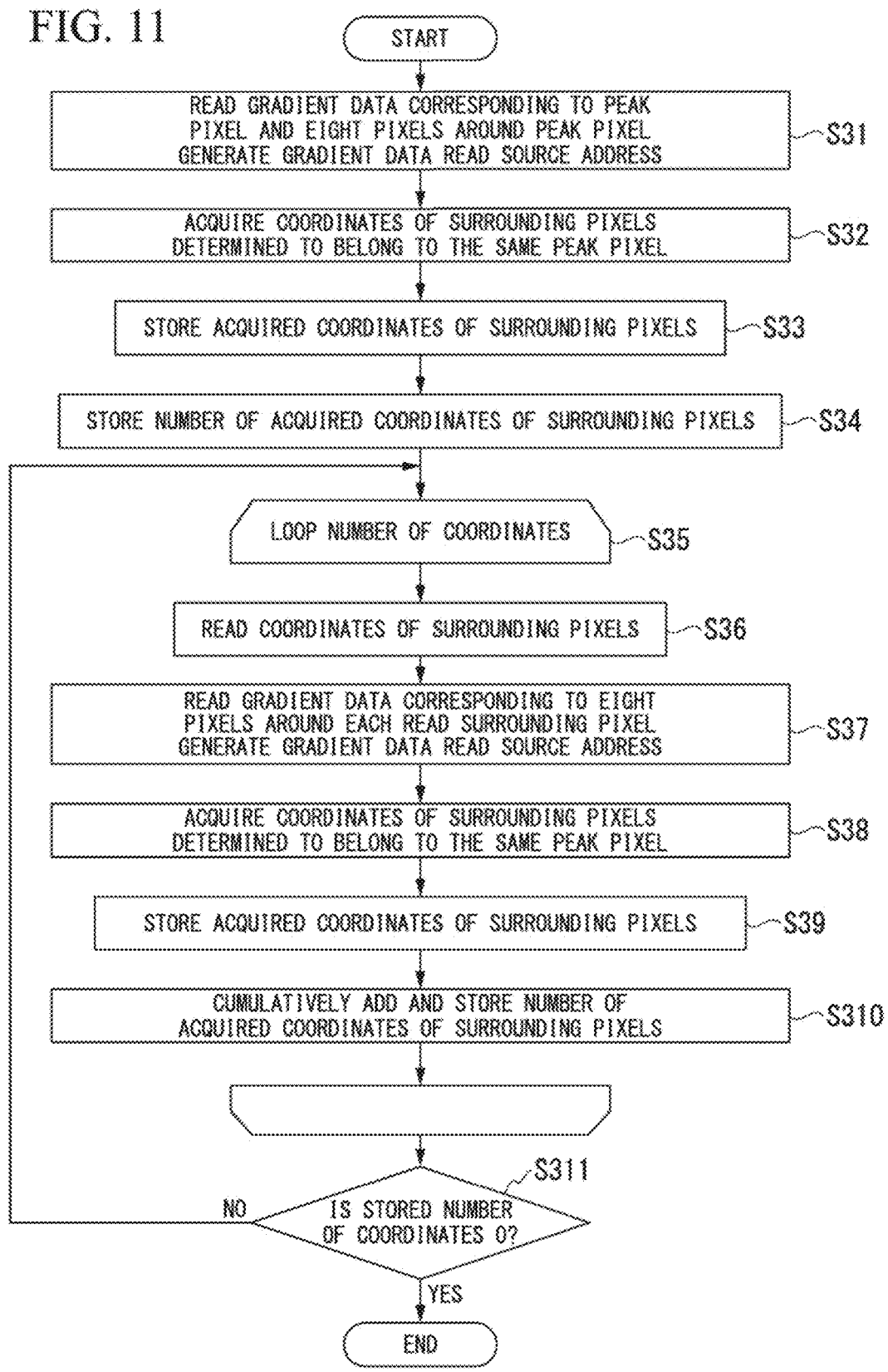
FIG. 11 is a flowchart showing a processing procedure in a gradient data read source address generation unit included in the image processing device of embodiments of the present invention.

Next, processes in the gradient data read source address generation unit 142 will be described. FIG. 11 is a flowchart showing a processing procedure in the gradient data read source address generation unit 142 included in the image processing device 1 of embodiments of the present invention. Meanwhile, with respect to processes in the gradient data read source address generation unit 142, a process for a true peak pixel can be considered to be the same as a process for a provisional peak pixel. Accordingly, in the following description, a case in which the gradient data read source address generation unit 142 performs a process for a peak pixel will be described.

When peak coordinates indicating the position of a peak pixel which is a target for which computation will be performed are input from the peak coordinates search unit 141, first, the gradient data read source address generation unit 142 generates a gradient data read source address for reading gradient data of the peak pixel corresponding to the input peak coordinates and gradient data read source addresses for reading gradient data of eight surrounding pixels located around the peak pixel. Then, the gradient data read source address generation unit 142 outputs the generated gradient data read source addresses to the gradient data storage unit 13 (step S31).

Accordingly, the gradient data storage unit 13 outputs the gradient data (peak label) of the peak pixel and the gradient data (gradient labels) of the eight surrounding pixels located around the peak pixel, which are stored in the storage regions designated by the gradient data read source addresses, to the outermost data gradient determination unit 143. In addition, the gradient data read source address generation unit 142 outputs the generated gradient data read source addresses to the outermost data gradient determination unit 143. Accordingly, the outermost data gradient determination unit 143 determines surrounding pixels which represent gradient directions toward the peak pixel according to a processing procedure which will be described below and outputs the gradient determination results to the gradient data read source address generation unit 142.

Subsequently, the gradient data read source address generation unit 142 acquires the gradient determination results output from the outermost data gradient determination unit 143, that is, coordinates indicating the positions of surrounding pixels determined to belong to the same peak pixel (step S32).

Thereafter, the gradient data read source address generation unit 142 stores the coordinates of each surrounding pixel included in the gradient determination results (step S33). In addition, the gradient data read source address generation unit 142 stores the number of coordinates of surrounding pixels included in the gradient determination results (step S34). For example, when the gradient determination results have a state in which gradient data of surrounding pixels other than the gradient data of the right bottom surrounding pixel of the peak pixel represents gradient directions toward the peak pixel in the gradient data of the eight surrounding pixels, as shown in FIG. 9B, the gradient data read source address generation unit 142 stores "7" as the number of coordinates of the surrounding pixels in the process of step S34.

Subsequently, the gradient data read source address generation unit 142 performs as many gradient data read source address generation processes having each surrounding pixel as a center as the stored number of coordinates of surrounding pixels (seven times in the example shown in FIG. 9B) in the loop of step S35. In the loop of step S35, first, the coordinates of any one surrounding pixel are read among the stored coordinates of surrounding pixels (step S36).

Thereafter, when the surrounding pixel of the read coordinates is set as a center, the gradient data read source address generation unit 142 generates gradient data read source addresses for reading gradient data of eight surrounding pixels located around the surrounding pixel and outputs the generated gradient data read source addresses to the gradient data storage unit 13 (step S37). For example, the gradient data read source address generation unit 142 generates gradient data read source addresses for reading gradient data of eight surrounding pixels located around any one surrounding pixel which is set as a center, as shown in FIG. 9D, and outputs the generated gradient data read source addresses to the gradient data storage unit 13. In addition, the gradient data read source address generation unit 142 outputs the generated gradient data read source addresses to the outermost data gradient determination unit 143.

Accordingly, the gradient data storage unit 13 outputs the gradient data (gradient labels) of the surrounding pixels stored in storage regions designated by the gradient data read source addresses to the outermost data gradient determination unit 143, as in the process of step S31. Then, the outermost data gradient determination unit 143 determines surrounding pixels which represent gradient directions toward the surrounding pixel which is a center as in a processing procedure which will be described below, and outputs the new gradient determination results to the gradient data read source address generation unit 142.

Subsequently, the gradient data read source address generation unit 142 acquires the new gradient determination results output from the outermost data gradient determination unit 143, that is, coordinates indicating the positions of outer surrounding pixels determined to belong to the same peak pixel (step S38).

Then, the gradient data read source address generation unit 142 stores the coordinates of each surrounding pixel included in the gradient determination results (step S39). Here, the coordinates of the surrounding pixel to be stored in the process of step S39 are stored by being added to the coordinates of the surrounding pixels which have been stored in the process of step S33. In this case, as a storage region in which the coordinates of the surrounding pixels are stored, for example, a storage region in the FIFO format may be used. Further, the storage region in which the coordinates of the surrounding pixels are stored in the process of step S39 may be different from the storage region in which the coordinates of the surrounding pixels are stored in the process of step S33.

In addition, the gradient data read source address generation unit 142 stores the number of coordinates of surrounding pixels included in the gradient determination results (step S310). For example, when the gradient determination results correspond to a state in which only gradient data of a left central surrounding pixel represents a gradient direction toward the surrounding pixel set to the center in gradient data of eight surrounding pixels, as shown in FIG. 9D, the gradient data read source address generation unit 142 stores "1" as the number of coordinates of surrounding pixels in the process of step S310.

The number of coordinates of surrounding pixels to be stored in the process of step S310 is stored by being cumulatively added to the number of coordinates of surrounding pixels stored in the process of step S34. Accordingly, the loop of step S35 is repeated by "the number of coordinates of surrounding pixels="7"" stored in the process of step S34, and when reading of the gradient data of the region of the surrounding pixels assigned with the region label, encircled by the circle in FIG. 9C, is completed, the number of coordinates of surrounding pixels stored in the process of step S310 which is the number of surrounding pixels encircled by the circle in FIG. 9F becomes "11."

As the storage region in which the number of coordinates of surrounding pixels is stored, for example, a storage region having a different counter format from the storage region in which the number of coordinates of surrounding pixels has been stored in the process of step S34 may be used. However, in a case in which the number of coordinates of surrounding pixels stored in the process of step S34 is transferred to the loop counter of step S35 and becomes a vacant state when the process of the present loop of step S35 is initiated, the storage region in which the number of coordinates of surrounding pixels will be stored in the process of step S310 and the storage region in which the number of coordinates of surrounding pixels has been stored in the process of step S34 may be shared. Further, the number of coordinates of surrounding pixels stored in the process of step S310 is used to determine whether the process of the loop of step S35 is repeated again after the process of the present loop of step S35 ends.

Thereafter, when the loop of step S35 which corresponds to the number of coordinates of surrounding pixels="7" stored in the process of step S34 ends, the gradient data read source address generation unit 142 determines whether the number of coordinates of surrounding pixels stored in the process of step S310 is "0" (step S311).

When it is determined that the stored number of coordinates of surrounding pixels is not "0," that is, reading of gradient data of surrounding pixels determined to belong to the same peak pixel has not been completed in step S311 ("NO" in step S311), the gradient data read source address generation unit 142 returns to step S35 and continues to generate gradient data read source addresses for reading gradient data of surrounding pixels. Here, the number of repetitions of the loop of step S35 corresponds to the number of coordinates of surrounding pixels stored in the process of step S310 (11 times in the example shown in FIG. 9F). Accordingly, for example, the gradient data of the region of the surrounding pixels assigned with the region label, which are encircled and indicated by the circle in FIG. 9F, is read.

On the other hand, when it is determined that the stored number of coordinates of surrounding pixels is "0," that is, reading of gradient data of surrounding pixels determined to belong to the same peak pixel has been completed in step S311 ("YES" in step S311), the gradient data read source address generation unit 142 ends the process of generating a gradient data read source address. Accordingly, for example, region label data which has been assigned with the region label as shown in FIG. 9G and corresponds to the currently processed gradient data region is generated.

Figure 12:
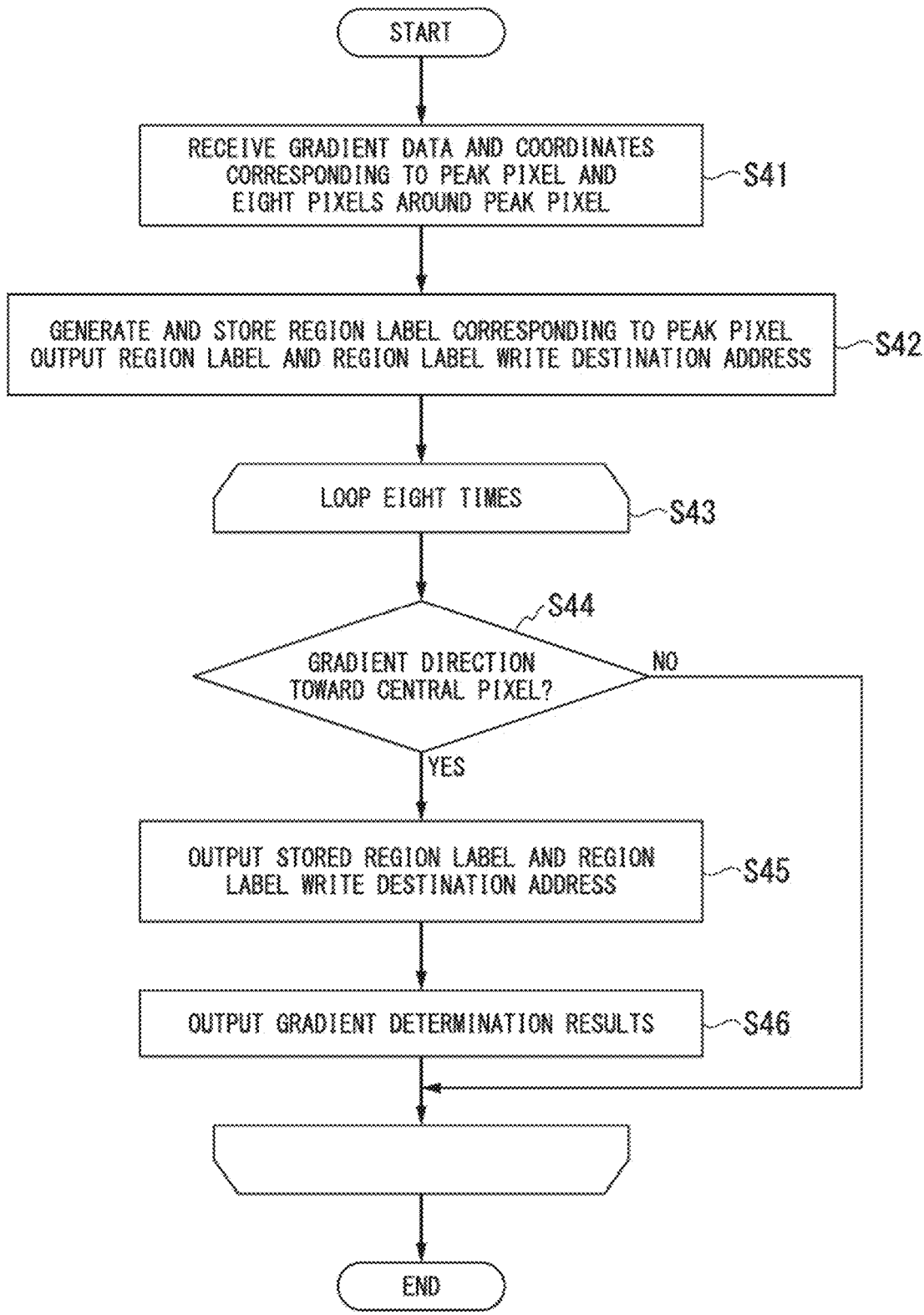
FIG. 12 is a flowchart showing a processing procedure in an outermost data gradient determination unit included in the image processing device of embodiments of the present invention.

Subsequently, processes in the outermost data gradient determination unit 143 will be described. FIG. 12 is a flowchart showing a processing procedure ii the outermost data gradient determination unit 143 included in the image processing device 1 of embodiments of the present invention. The outermost data gradient determination unit 143 performs the processing procedure shown in FIG. 12 in response to each of step S31 and step S37 in the processing procedure of the gradient data read source address generation unit 142 shown in FIG. 11. In the following description, the outermost data gradient determination unit 143 executes the processing procedure in response to step S31. Meanwhile, with respect to the processes in the outermost data gradient determination unit 143, a process for a true peak pixel may be considered to be the same as a process for a provisional peak pixel. Accordingly, in the following description, a case in which the outermost data gradient determination unit 143 performs a process for a peak pixel will be described.

The outermost data gradient determination unit 143 acquires the gradient data (peak label or gradient label) of the peak pixel corresponding to the gradient data read source address and the gradient data (gradient labels) of the eight surrounding pixels located around the peak pixel from the gradient data storage unit 13. In addition, the outermost data gradient determination unit 143 receives the gradient data read source addresses generated by the gradient data read source address generation unit 142 as coordinates indicating the positions of the peak pixel and the surrounding pixels (step S41).

Thereafter, the outermost data gradient determination unit 143 generates a region label corresponding to the received peak pixel and stores the generated region label. Here, in generation of the region label, the outermost data gradient determination unit 143 generates a region libel having a value corresponding to a true peak pixel when the received peak pixel is a true peak pixel and generates a region label having a value corresponding to a provisional peak pixel when the received peak pixel is a provisional peak pixel. In addition, the outermost data gradient determination unit 143 outputs the region label having a value corresponding to the received peak pixel to each of the region label storage unit 16, the corresponding label integration information generation unit 15 and the region label integration processing control unit 19 as the region label of the current peak pixel. Furthermore, the outermost data gradient determination unit 143 outputs coordinates indicating the position of the peak pixel having the region label to each of the region label storage unit 16, the corresponding label integration information generation unit 15 and the region label integration processing control unit 19 as a region label write destination address (step S42).

Subsequently, the outermost data gradient determination unit 143 performs a process of determining a gradient direction for each piece of the received gradient data of the eight surrounding pixels in the loop of step S43. In the loop of step S43, first, whether the gradient label assigned to gradient data of any one surrounding pixel represents a gradient direction toward the central pixel in the received gradient data of the eight surrounding pixels, that is, whether the surrounding pixel belongs to the same peak pixel is determined (step S44).

When it is determined that the gradient label assigned to the gradient data of the current surrounding pixel does not represent a gradient direction toward the central pixel, that is, the current surrounding pixel does not belong to the same peak pixel in step S44 ("NO" in step S44), the outermost data gradient determination unit 143 performs the process of the loop of step S43 for any one of the following surrounding pixels.

On the other hand, when it is determined that the gradient label assigned to the gradient data of the current surrounding pixel represents a gradient direction toward the central pixel, that is, the current surrounding pixel belongs to the same peak pixel in step S44 ("YES" in step S44), the outermost data gradient determination unit 143 outputs a region label having the same value as the region label generated corresponding to the received peak pixel to each of the region label storage unit 16, the corresponding label integration information generation unit 15 and the region label integration processing control unit 19 as the region label of the current surrounding pixel in step S45. That is, the region label generated and stored in step S42 is output to each of the region label storage unit 16, the corresponding label integration information generation unit 15 and the region label integration processing control unit 19 as the region label of the current surrounding pixel. In addition, the outermost data gradient determination unit 143 outputs coordinates indicating the position of the surrounding pixel having the region label which is output to the region label storage unit 16, the corresponding label integration information generation unit 15 and the region label integration processing control unit 19 as a region label write destination address.

Subsequently, the outermost data gradient determination unit 143 outputs the coordinates indicating the position of the surrounding pixel having the region label to the gradient data read source address generation unit 142 as a gradient determination result (step S46). In addition, the outermost data gradient determination unit 143 performs the process of the loop of step S43 for any one of the following surrounding pixels.

In this manner, the outermost data gradient determination unit 143 performs the gradient direction determination process for each piece of the received gradient data of the eight surrounding pixels. Accordingly, for example, the region in which the region label is assigned to the surrounding pixels belonging to the same true peak pixel is sequentially extended as shown in FIGS. 9C, 9E and 9F, and the region label data corresponding to one gradient data region which is currently processed is stored in the region label storage unit 16 as shown in FIG. 9G.

According to the aforementioned configuration and operation, each region label generation unit 14 performs the region division process for assigning the same region label to surrounding pixels belonging to the same true peak pixel or provisional peak pixel in the corresponding gradient data region. In this region division process, the region label generation unit 14 assigns a region label such that a region is extended from a true peak pixel or a provisional peak pixel to surrounding pixels.

In the above description, the case in which the processing procedure of the outermost data gradient determination unit 143 shown in FIG. 12 is executed in response to step S31 of the processing procedure of the gradient data read source address generation unit 142 shown in FIG. 11 has been described. However, the processing procedure shown in FIG. 12 may be executed in response to each of step S31 and step S37 of the processing procedure of the gradient data read source address generation unit 142 shown in FIG. 11 as described above. When the processing procedure shown in FIG. 12 is executed in response to step S37 of the processing procedure of the gradient data read source address generation unit 142 shown in FIG. 11, the outermost data gradient determination unit 143 receives gradient data and coordinates obtained when a surrounding pixel determined to belong to the same peak pixel through the previous processing procedure shown in FIG. 12 is set to a center as gradient data and coordinates of a peak pixel. Accordingly, the received region label having the value corresponding to the peak pixel has already been generated. Therefore, the outermost data gradient determination unit 143 generates a region label having the same value as the region label which was generated in the process of step S42 of the previous processing procedure shown in FIG. 12 and outputs the region label to each of the region label storage unit 16, the corresponding label integration information generation unit 15 and the region label integration processing control unit 19 in the present process of step S42. In addition, the outermost data gradient determination unit 143 outputs the region label having the same value as the region label which was output in the process of step S45 of the previous processing procedure shown in FIG. 12 to each of the region label storage unit 16, the corresponding label integration information generation unit 15 and the region label integration processing control unit 19 in the present process of step S45.

In this manner, each region label generation unit 14 included in the image processing device 1 performs the region label generation process for gradient data of one gradient data region stored in the corresponding gradient data storage unit 13 to generate region label data corresponding to one rectangular luminance image. Accordingly, a plurality of pieces of region label data corresponding to each rectangular luminance image are stored in the region label storage unit 16.

Figure 13A:
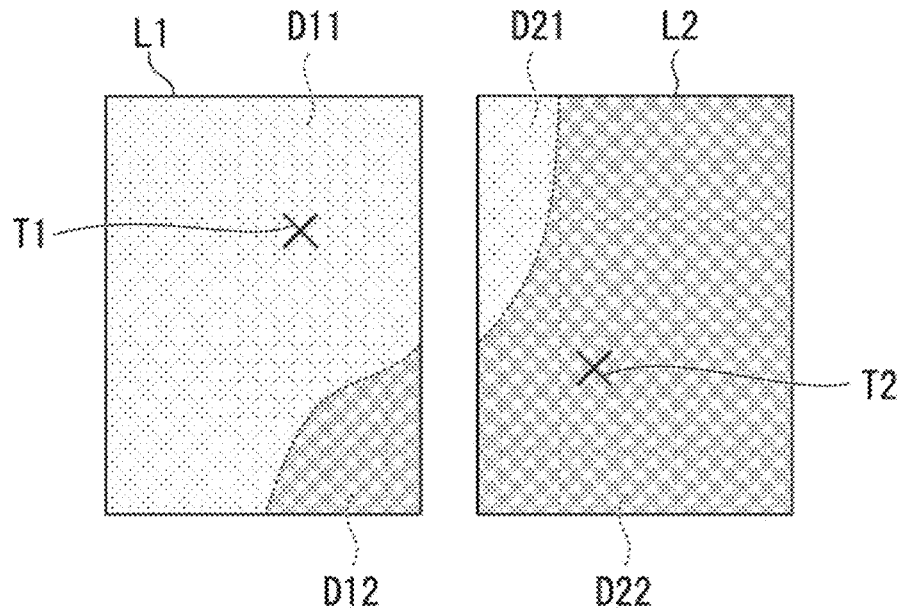
FIG. 13A is a diagram showing the concept of a label integration process in the image processing device of embodiments of the present invention.
Figure 13B:
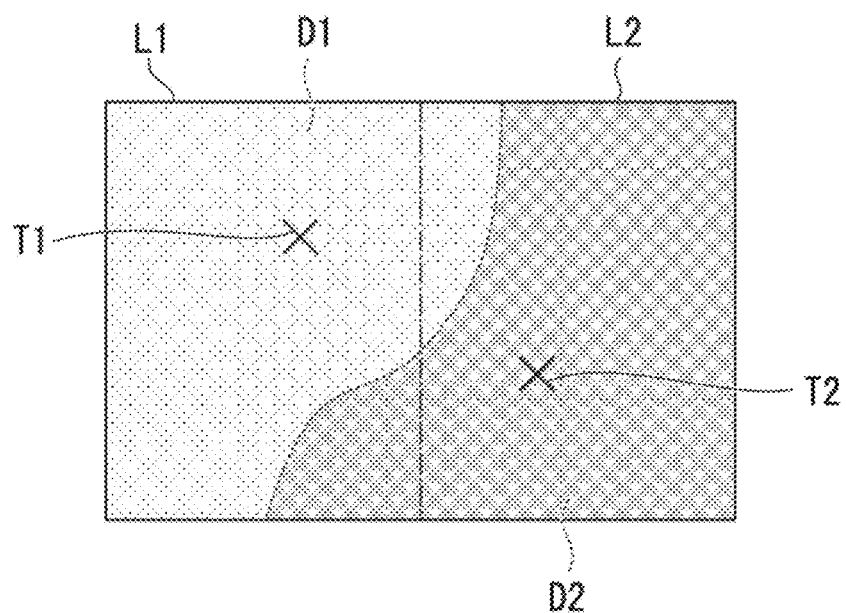
FIG. 13B is a diagram showing the concept of the label integration process in the image processing device of embodiments of the present invention.

Next, the operation of the label integration information generation unit 15 included in the image processing device 1 will be described. First, the concept of a label integration process performed by the image processing device 1 will be described. FIGS. 13A and 13B are diagrams showing the concept of the label integration process in the image processing device 1 of embodiments of the present invention. FIG. 13A schematically shows a state before integration of two neighboring label regions and FIG. 13B schematically shows a state after integration of the two neighboring label regions.

As shown in FIG. 13A, region label data of a label region L1 and a label region L2 in which region labels have been assigned by each region label generation unit 14 on the basis of gradient data of corresponding gradient data regions is in a state in which association with the neighboring label region has not been applied.

Accordingly, a region D11 included in the label region L1 and a region D21 included in the label region L2 are stored in the region label storage unit 16 as separate label regions in spite of the fact that the regions D11 and D21 are regions of surrounding pixels belonging to the same true peak pixel T1. More specifically, the region D11 is stored in the region label storage unit 16 as a region of surrounding pixels belonging to the true peak pixel T1, whereas the region D21 is stored in the region label storage unit 16 as a region of surrounding pixels belonging to a provisional peak pixel located on the outermost periphery of the label region L2.

In addition, similarly, a region D12 included in the label region L1 and a region D22 included in the label region L2 are stored in the region label storage unit 16 as separate label regions in spite of the fact that the regions D12 and D22 are regions of surrounding pixels belonging to the same true peak pixel T2. More specifically, the region D22 is stored in the region label storage unit 16 as a region of surrounding pixels belonging to the true peak pixel T2, whereas the region D12 is stored in the region label storage unit 16 as a region of surrounding pixels belonging to a provisional peak pixel located on the outermost periphery of the label region L1.

This is because respective pieces of region label data are generated by different region label generation units 14 in the image processing device 1 as described above. Accordingly, the image processing device 1 performs the label integration process for updating a region label assigned to each surrounding pixel such that the same region label is assigned to surrounding pixels belonging to the same true peak pixel. According to the label integration process, the region D11 included in the label region L1 and the region D21 included in the label region L2 are integrated and the same region label indicating that the region D11 and the region D21 belong to the same true peak pixel T1 is assigned thereto, as shown in FIG. 13B. In addition, similarly, the region D12 included in the label region L1 and the region D22 included in the label region L2 are integrated and the same region label indicating that the region D12 and the region D22 belong to the same true peak pixel T2 is assigned thereto.

In the image processing device 1, each label integration information generation unit 15 generates label integration information for integrating a label region to which the corresponding region label generation unit 14 has assigned a region label and a neighboring label region to which another region label generation unit 14 has assigned a region label. When a pixel assigned with a region label by the corresponding region label generation unit 14 is a pixel belonging to a true peak pixel located in a neighboring label region, the label integration information serves as information by which the region label assigned to the pixel finally becomes the same value as a peak label assigned to the true peak pixel located in the neighboring label region.

Next, the label integration information generated by the label integration information generation unit 15 included in the image processing device 1 will be described. FIG. 14 is a diagram showing an example of a configuration of the label integration information stored in the label integration information storage unit 17 included in the image processing device 1 of embodiments of the present invention. The example of the configuration of the label integration information shown in FIG. 14 is an example of label integration information corresponding to the example of label regions and region labels shown FIG. 8.

As described above, a plurality of pieces of region label data corresponding to each of divided rectangular luminance images are stored in the region label storage unit 16. In addition, each piece of region label data is in a state in which association with a neighboring label region has not been applied. However, since each gradient data generation unit 12 generates gradient data in a state in which an overlap region corresponding to one pixel has been secured at the boundary of neighboring gradient data regions in the image processing device 1, region label data which is generated by the region label generation unit 14 and corresponds to each piece of gradient data also includes an overlap region corresponding to one pixel at the boundary between neighboring label regions, as shown in FIG. 8.

The label integration information includes information indicating connection of label regions for each pixel present in the overlap region of each label region. More specifically, the position of each pixel present in the overlap region is regarded as an address and a value of a region label assigned to a pixel present in the overlap region is stored in a storage region indicated by the address in the label integration information. That is, in the label integration information corresponding to the example of label regions and region labels shown in FIG. 8, the same number of storage regions as the number of region labels, which are assigned when a pixel located in the overlap region was a true peak pixel or a provisional peak pixel, are provided as storage regions for storing the information indicating connection of label regions, as shown in FIG. 14.

More specifically, addresses "0" to "i+j−2" shown in FIG. 14 are addresses allocated to respective pixels present in the overlap region, and values of region labels assigned to the pixels present in the overlap region are stored as data in the storage regions indicated by the respective addresses. Further, the initial value of data corresponding to each address in the label integration information, that is, the initial value of each region label value is the same as a value of each address.

In this manner, in the label integration information, one address has been allocated to each pixel present in all overlap regions. Meanwhile, an overlap region may include a provisional peak pixel. Accordingly, the region label integration unit 18 may perform the label integration process for updating region labels of surrounding pixels belonging to the same true peak pixel to the same value by referring to data (region label values) stored in the storage region corresponding to each address. That is, it is possible to update region label values of surrounding pixels belonging to the provisional peak pixel included in the overlap region to the region label value of the true peak pixel.

In addition, a peak label value assigned to a true peak pixel is stored as data in addition to the storage region allocated to each pixel present in the overlap region in the label integration information. As described above, a minimum value of a peak label value assigned to a true peak pixel is predetermined as a value corresponding to a region label value allocated to a pixel in the overlap region plus 1. Accordingly, in the example of the configuration of the label integration information shown in FIG. 14, data corresponding to an address of "m," which corresponds to the address of "i+j−2" allocated to the last pixel present in the overlap region plus 1, is set as a minimum value of the peak label assigned to the true peak pixel.

Further, as described above, the initial value of data corresponding to each address in the label integration information is the value of each address, and thus the minimum value of the peak label assigned to the true peak pixel is "m." Accordingly, when the region label generation unit 14 generates a region label corresponding to the true peak pixel, the region label generation unit 14 generates a region label having a value equal to or greater than "m." That is, the region label of "m" is assigned to a true peak pixel initially detected by any one of the region label generation units 14 included in the image processing device 1 (refer to step S42 of FIG. 12). Subsequently, "m+1," "m+2," . . . are assigned to true peak pixels detected by any one of the region label generation units 14 as region labels.

When region label values are managed, for example, by a region label management unit which is not shown, the region label management unit which is not shown may manage the region label values by referring to the label integration information in the process of step S42 shown in FIG. 12 in which the outermost data gradient determination unit 143 included in the region label generation unit 14 generates a region label. In this case, first, data of storage regions indicated by addresses equal to or greater than the address of "m" is set to the initial value of "0" in the label integration information, and the region label management unit which is not shown sets the initial value of the current region label to "m." In addition, the region label management unit which is not shown repeats the following operation for each request for generation (issuance) of a region label from the outermost data gradient determination unit 143 included in the region label generation unit 14. The region label management unit which is not shown initially updates data of a storage region of the label integration information, which has the current region label value as an address, to the same value as the address. Accordingly, data "0" of the storage region having the current region label value as an address in the label integration information is updated to the same value (initially, "m") as the address. Subsequently, the region label management unit which is not shown outputs the value of the address of the label integration information in which the data has been updated to the outermost data gradient determination unit 143 as a generated region label value. Finally, the region label management unit which is not shown adds "1" to the current region label value to increment the region label value. According to this operation, a region label of "m" is assigned to a true peak pixel initially detected by any one of the region label generation units 14 included in the image processing device 1 and region labels of "m+1," "m+2," . . . are sequentially assigned to true peak pixels subsequently detected. In this case, the number of true peak pixels may be acquired by detecting storage regions in which address values are not identical to data values or storage regions in which addresses are equal to or greater than the address of "m" and data values correspond to an initial value of "0" in the label integration information.

Next, a process of generating the label integration information in the label integration information generation unit 15 included in the image processing device 1 will be described. FIG. 15 is a flowchart showing a processing procedure in the label integration information generation unit 15 included in the image processing device 1 of embodiments of the present invention.

The label integration information generation unit 15 initiates generation of the label integration information when a region label assigned to a pixel and a region label write destination address indicating the position of the pixel assigned with the region label are input from the corresponding region label generation unit 14 (step S51).

When generation of the label integration information is initiated, the label integration information generation unit 15 determines whether the region label write destination address input from the region label generation unit 14 is an address indicating an outermost pixel located on the outermost periphery in a label region (step S52). That is, the label integration information generation unit 15 determines whether the value of the region label input from the region label generation unit 14 is a region label value of a pixel present in an overlap region of the label region. In other words, the label integration information generation unit 15 determines whether the input region label is a region label of a provisional peak pixel or a true peak pixel treated as a provisional peak pixel.

The initial value of data (region label value) corresponding to each address in the label integration information is the value of each address, as described above. Accordingly, a determination of step S52 may be performed by comparing the value of the input region label with values of addresses in the label integration information shown in FIG. 14. More specifically, when the value of the region label is an address having a value equal to or greater than the address of "m," the corresponding pixel may be determined to be a pixel which is not located in the overlap region. When the value of the region label is an address having a value less than the address of "m," the corresponding pixel may be determined to be a pixel in the overlap region.

In step S52, when it is determined that the input region label write destination address is an address indicating an outermost pixel ("YES" in step S52), the label integration information generation unit 15 determines whether data (region label value) stored in a storage region corresponding to the region label write destination address in the label integration information is a region label value indicating a true peak pixel (step S53). That is, the label integration information generation unit 15 determines whether the data stored in the storage region corresponding to the region label write destination address in the label integration information is a value equal to or greater than "m."

In step S53, when it is determined that the region label value corresponding to the region label write destination address is a region label value indicating a true peak pixel ("YES" in step S53), the label integration information generation unit 15 proceeds to the process of step S55. That is, when the region label value corresponding to the region label write destination address is a region label value (a value equal to or greater than "m") which indicates a true peak pixel and has already been rewritten (updated) by another label integration information generation unit 15, the label integration information generation unit 15 proceeds to the process of step S55 without rewriting the data stored in the storage region corresponding to the region label write destination address. In other words, the label integration information generation unit 15 proceeds to the process of step S55 without updating the label integration information.

On the other hand, when it is determined that the region label value corresponding to the region label write destination address is not a region label value indicating a true peak pixel in step S53 ("NO" in step S53), the label integration information generation unit 15 rewrites (updates) the data of the storage region corresponding to the input region label write destination address in the label integration information with the input region label value in step S54. That is, when the region label value corresponding to the region label write destination address is a region label value indicating that the corresponding pixel belongs to a true peak pixel located in another neighboring label region or a region label value indicating that the corresponding pixel is a true peak pixel but is located in an overlap region because it is treated as a provisional peak pixel, the label integration information generation unit 15 updates the region label value stored in the label integration information. Accordingly, the region label value of the provisional peak pixel belonging to the true peak pixel located in the other label region is updated with the region label value of the true peak pixel. Then, the label integration information generation unit 15 proceeds to the process of step S55.

Further, when the input region label write destination address is an address of a true peak pixel treated as a provisional peak pixel, the determination result of step S53 also becomes "NO." However, as a region label assigned to a true peak pixel treated as a provisional peak pixel, any one of the label integration information generation units 15 assigns the same region label value indicating that the peak pixel is located in an overlap region. Accordingly, even when the label integration information is updated through the process of step S54, data (region label values) of the storage regions of the label integration information is not changed. That is, the data is the same as the data when the label integration information is not updated. Accordingly, for example, when the label integration information generation unit 15 can distinguish a true peak pixel treated as a provisional peak pixel, the label integration information generation unit 15 may proceed to the process of step S55 without updating the label integration information.

On the other hand, when it is determined that the input region label write destination address is not an address indicating an outermost pixel in step S52 ("NO" in step S52), the label integration information generation unit 15 proceeds to the process of step S55. That is, when the region label value input from the region label generation unit 14 is a region label value (a value equal to or greater than "m") indicating a true peak pixel present in a region other than the overlap region of the label region, the label integration information generation unit 15 proceeds to the process of step S55 without rewriting the data stored in the storage region corresponding to the region label write destination address (without updating the label integration information).

Subsequently, the label integration information generation unit 15 determines whether determination has been completed for all pixels included in the corresponding label region (step S55).

When it is determined that determination for all pixels has not been completed in step S55 ("NO" in step S55), the label integration information generation unit 15 returns to step S51 and waits for input of a region label and a region label write destination address from the corresponding region label generation unit 14, and when the next region label and region label write destination address are input, repeats the label integration information generation process of step S52 to S55.

On the other hand, when it is determined that determination for all pixels has been completed in step S55 ("YES" in step S55), the label integration information generation unit 15 ends the label integration information generation process.

In this manner, each label integration information generation unit 15 included in the image processing device 1 performs the label integration information generation process (update process) on the basis of region labels and region label write destination addresses input from the corresponding region label generation unit 14. In addition, in the image processing device 1, final label integration information is generated when the label integration information generation process has been completed by the label integration information generation unit 15 for all label regions. In data (region label values) of storage regions of the final label integration information, data of overlap regions in the label integration information before update, that is, initial values of region labels become region label values of surrounding pixels belonging to true peak pixels located in neighboring label regions or region label values of overlap regions, which indicate true peak pixels treated as provisional peak pixel.

Here, an example of the label integration information generation process in the label integration information generation unit 15 will be described. FIGS. 16A to 16C are diagrams schematically showing an example of the label integration information generation process in the label integration information generation unit 15 included in the image processing device 1 of embodiments of the present invention. FIG. 16A schematically shows an example of states of two neighboring label regions before the label integration process is performed, FIG. 16B shows an example of label integration information updated by the label integration information generation unit 15, and FIG. 16C schematically shows an example of states of the two neighboring label regions after the label integration process is performed.

As shown in FIG. 16A, each of a plurality of pixels included in each label region to which any one of the region label generation units 14 has assigned a region label on the basis of gradient data of the corresponding gradient data region is assigned with a region label having the same value as a region label value of a peak pixel to which the pixel belongs.

More specifically, each of surrounding pixels P11 to P13 included in a label region L1 is assigned with a region label having the same value as the value of a provisional peak pixel TP1. Here, the provisional peak pixel TP1 is a surrounding pixel processed as a provisional peak pixel by the region label generation unit 14 because the provisional peak pixel TP1 is located in an overlap region on the outer periphery of the label region L1 although the provisional peak pixel TP1 is not a true peak pixel and is a surrounding pixel belonging to a true peak pixel T2 included in a label L2. Accordingly, a region label assigned to the provisional peak pixel TP1 is not a region label having a value indicating a true peak pixel but is a region label having a value indicating that the provisional peak pixel TP1 is located in the overlap region. Meanwhile, a surrounding pixel P10 is a surrounding pixel belonging to a different true peak pixel included in the label region L1 and thus is assigned with a region label having a different value from the value of the provisional peak pixel TP1.

In addition, each of surrounding pixels P21 and P22 included in the label region L2 is assigned with a region label having the same value as a value of a true peak pixel T2. That is, the true peak pixel T2 is present in a region other than overlap regions and thus is assigned with a region label having a value equal to or greater than "m," and each of the surrounding pixels P21 and P22 is assigned with a region label having the same value as the value of the true peak pixel T2. Here, the surrounding pixel P21 is located in an overlap region on the outermost periphery of the label region L2 and is the same as the provisional peak pixel TP1.

Here, a case in which an address of label integration information corresponding to the provisional peak pixel TP1 is set to "10" and an address of label integration information corresponding to the true peak pixel T2 is set to "20" is used, as shown in FIG. 16B. Meanwhile, label integration information is composed of storage regions allocated to respective pixels present in an overlap region and storage regions allocated to respective true peak pixels, as described above. Accordingly, in the label integration information, a storage region allocated to a pixel present in an overlap region is distinguished from a storage region allocated to a true peak pixel between the address of "10" and the address of "20" as shown in FIG. 16B.

In addition, when any one of the label integration information generation units performs the above-described label integration information generation process on the basis of region labels of the label region L1 and the label region L2 and region label write destination addresses, the label integration information as shown in FIG. 16B is generated.

More specifically, when the region label and region label write destination address assigned to the provisional peak pixel TP1 are input to the label integration information generation unit 15 (referred to as a label integration information generation unit 15-1 hereinafter) corresponding to the label region L1 in step S51 shown in FIG. 15, the label integration information generation unit 15-1 determines that the provisional peak pixel TP1 is a pixel present in an overlap region in step S52 ("YES" in step S52). In addition, the label integration information generation unit 15-1 determines that a region label value stored in a storage region corresponding to the region label write destination address of the provisional peak pixel TP1 is not a region label value indicating a true peak pixel in step S53 ("NO" in step S53) and updates data of the label integration information to the value of the input region label in step S54. However, since the value of the region label input to the label integration information generation unit 15-1 corresponding to the label region L1 is the value corresponding to the provisional peak pixel TP1, the data of the label integration information is not changed before and after update.

On the other hand, when the region label and region label write destination address assigned to the surrounding pixel P21 are input to the label integration information generation unit 15 (referred to as a label integration information generation unit 15-2 hereinafter) corresponding to the label region L2 in step S51, the label integration information generation unit 15-2 determines that the surrounding pixel P21 is a pixel present in an overlap region in step S52 ("YES" in step S52). In addition, the label integration information generation unit 15-2 determines that a region label value stored in a storage region corresponding to the region label write destination address of the surrounding pixel P21, that is, the same address as the region label write destination address of the provisional peak pixel TP1 is not a region label value indicating a true peak pixel in step S53 ("NO" in step S53) and updates data of the label integration information to the value of the input region label in step S54. In this manner, in the label integration information, data of a storage region corresponding to the region label write destination address of the surrounding pixel P21 which is equal to the provisional peak pixel TP1 is updated to the region label value assigned to the surrounding pixel P21, that is, the same value as the region label assigned to the true peak pixel T2 according to the label integration information generation unit 15-2 corresponding to the label region L2.

More specifically, label integration information in which data of the address of "10" corresponding to the provisional peak pixel TP1 is rewritten with the address of "20" corresponding to the true peak pixel T2 is generated. This label integration information indicates that the provisional peak pixel TP1 and the surrounding pixel P21 located in the overlap region belong to the true peak pixel T2 together as shown in FIG. 16C, when the label region L1 and the label region L2 are integrated.

In this manner, each label integration information generation unit 15 included in the image processing device 1 performs the label integration information generation process on the basis of a region label and a region label write destination address input from the corresponding region label generation unit 14 to generate label integration information for changing a value of a different region label, which has been assigned to the same pixel by another label integration information generation unit 15, to a value of a region label of a true peak pixel. Accordingly, each region label integration unit 18 included in the image processing device 1 can integrate different label regions assigned with region labels by the region label generation units 14. That is, it is possible to integrate region labels obtained by dividing and processing a luminance image in the image processing device 1 with region labels of one luminance image.

Here, each region label integration unit 18 included in the image processing device 1 can perform the label integration process for any label region because label integration information indicating association of divided label regions has already been generated and stored in the label integration information storage unit 17. Accordingly, the plurality of region label integration units 18 included in the image processing device 1 can perform label integration processes for different label regions in parallel.

Figure 17:
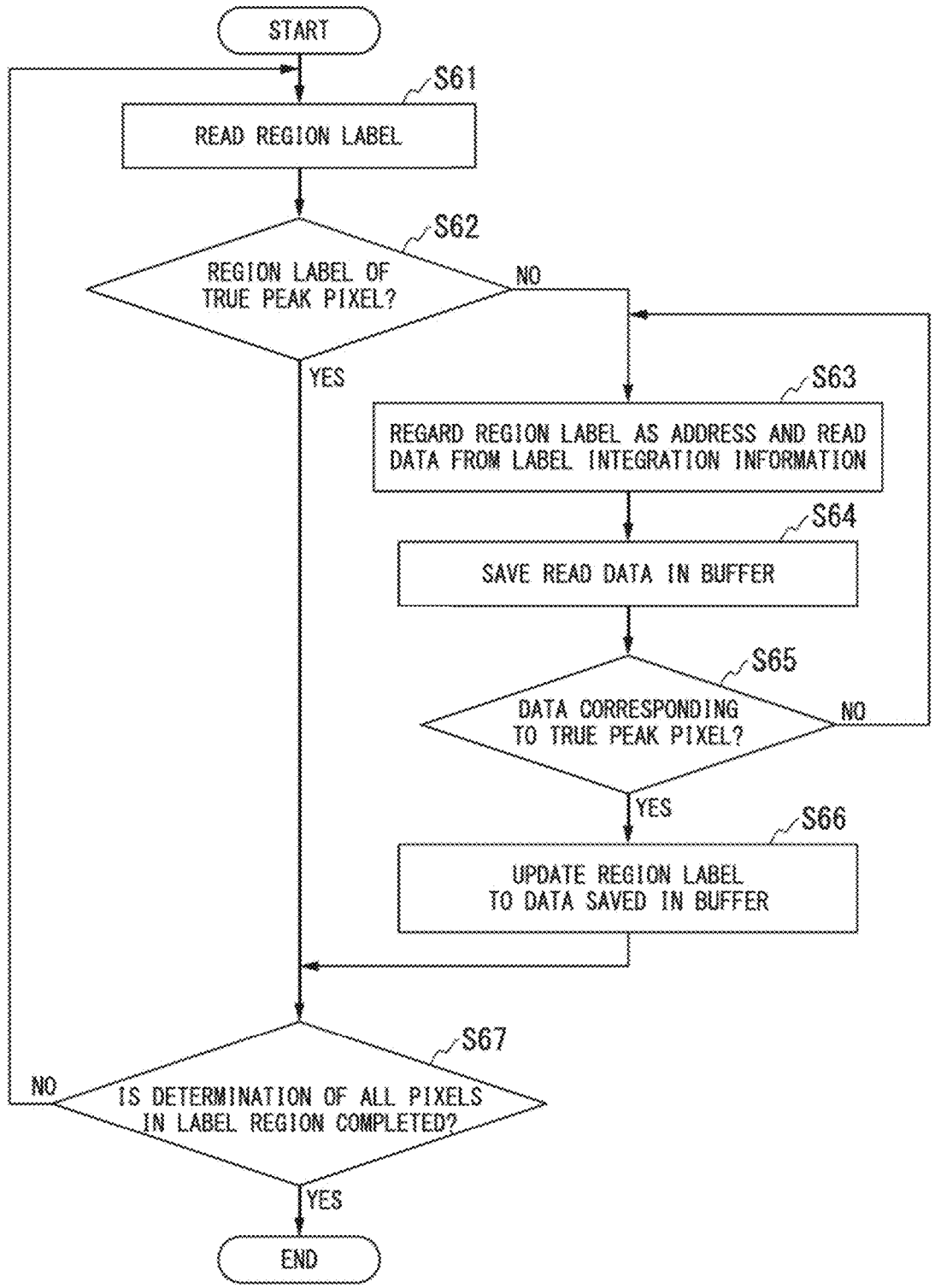
FIG. 17 is a flowchart showing a processing procedure in a region label integration unit included in the image processing device of embodiments of the present invention.

Next, the operation of the region label integration unit 18 included in the image processing device 1 will be described. FIG. 17 is a flowchart showing a processing procedure in the region label integration unit 18 included in the image processing device 1 of embodiments of the present invention. The region label integration unit 18 initiates the region label integration process when the region label integration processing control unit 19 allocates a label region which is a processing target.

When the region label integration process is initiated, first, the region label integration unit 18 reads region labels included in the allocated label region, for example, from the left top pixel in the raster order from the region label storage unit 16 (step S61).

Subsequently, the region label integration unit 18 determines whether the value of a read region label indicates a true peak pixel (step S62). Step S62 may be performed by determining whether the value of the read region label is equal to or greater than "m." More specifically, the region label integration unit 18 may determine that the value of the read region label is a value indicating a true peak pixel when the value of the read region label is equal to or greater than "m" and determine that the value of the read region label is not a value indicating a true peak pixel when the value of the read region label is an address having a value less than "m."

When it is determined that the value of the read region label is not a value indicating a true peak pixel, that is, the value of the current region label needs to be changed (updated) in step S62 ("NO" in step S62), the region label integration unit 18 regards the value of the read region label as an address of label integration information and reads data stored in a storage region corresponding to the address (step S63).

Subsequently, the region label integration unit 18 temporarily saves the read data, that is, the value of the region label stored in the label integration information in a buffer (step S64).

Thereafter, the region label integration unit 18 determines whether the read data is a value corresponding to a true peak pixel (step S65). Step 65 may be performed by determining whether the value of the region label regarded as the address is the same as the value of the read data, that is, whether the address is consistent with the data. More specifically, it is determined that the read data is a value corresponding to a true peak pixel when the value of the address is the same as the value of the read data and it is determined that the read data is not a value corresponding to a true peak pixel when the value of the address is different from the value of the read data.

When it is determined that the read data is not a value corresponding to a true peak pixel, that is, a value corresponding to a true peak pixel is stored in a storage region corresponding to another address of the label integration information in step S65 ("NO" in step S65), the region label integration unit 18 returns to step S63. In addition, the region label integration unit 18 regards the read data (the value of the region label temporarily stored in the buffer) as an address of the label integration information, reads data stored in a storage region corresponding to the address, and repeats the process of steps S63 to S65. That is, for data stored in storage regions corresponding to other addresses, the region label integration unit 18 repeats determination of whether the data is a value corresponding to a true peak pixel.

On the other hand, when it is determined that the read data is a value corresponding to a true peak pixel in step S65 ("YES" in step S65), the region label integration unit 18 changes (updates) the value of the current region label to the data (the value of the region label) temporarily stored in the buffer (step S66). Accordingly, the value of the region label read in step S61 is updated to the value of the region label of the true peak pixel. Then, the region label integration unit 18 proceeds to the process of step S67.

On the other hand, when it is determined that the value of the read region label is a value indicating a true peak pixel, that is, when the value of the current region label need not be changed (updated) in step S62 ("YES" in step S62), the region label integration unit 18 proceeds to the process of step S67 without changing (updating) the value of the current region label.

Subsequently, the region label integration unit 18 determines whether determination has been completed for all pixels included in the allocated label region (step S67).

When it is determined that determination has not been completed for all pixels in step S67 ("NO" in step S67), the region label integration unit 18 returns to step S61, reads the next region label included in the allocated label region from the region label storage unit 16 and repeats the region label integration process of steps S62 to S67.

On the other hand, when it is determined that determination has been completed for all pixels in step S67 ("YES" in step S67), the region label integration unit 18 ends the region label integration process.

In this manner, each of the plurality of region label integration units 18 included in the image processing device 1 performs the region label integration process on region labels of a label region allocated by the region label integration processing control unit 19 on the basis of the label integration information stored in the label integration information storage unit 17. In addition, in the image processing device 1, final region label data is stored in the region label storage unit 16 when the region label integration process performed by the region label integration unit 18 for all region labels is ended. The final region label data (values of region labels) is region label data obtained by integrating region labels for respective rectangular luminance images which are stored in the region label storage unit 16 by the region label generation unit 14, that is, region label data with respect to a luminance image input to the image processing device 1.

Figure 18:
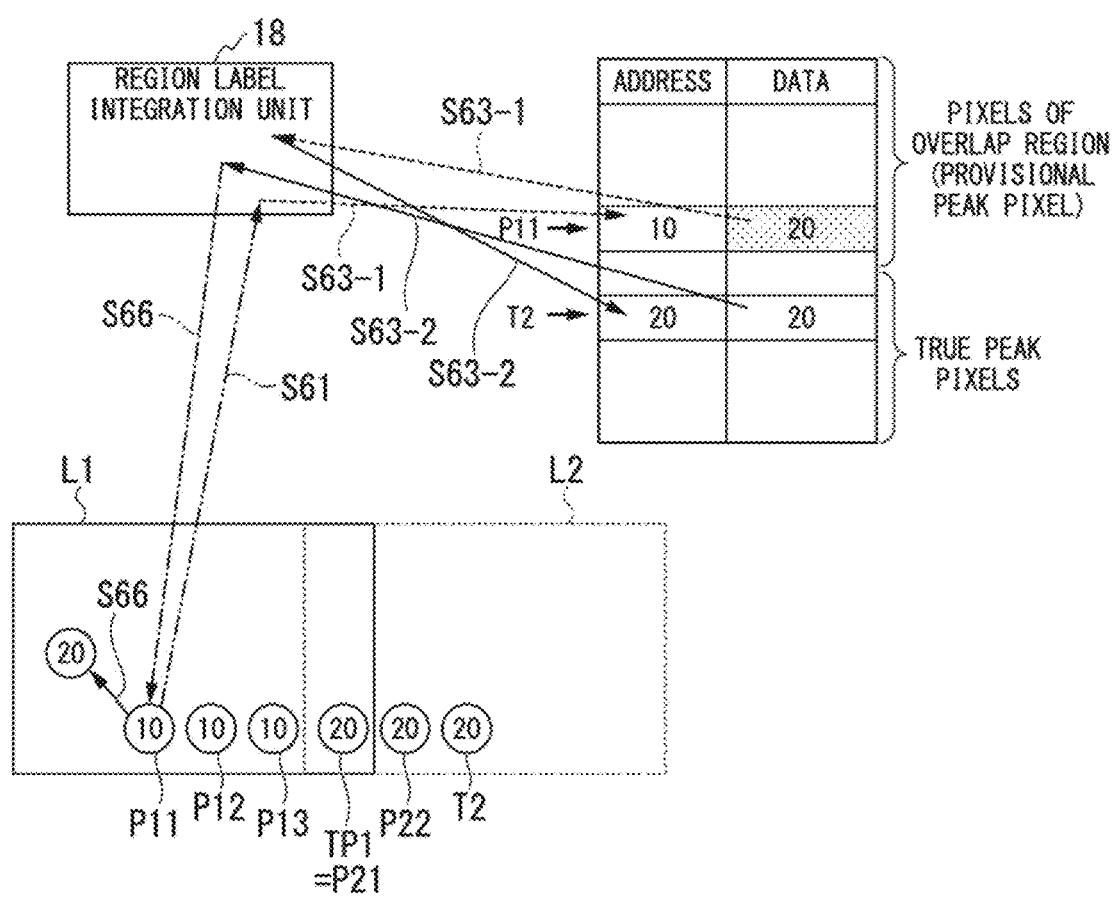
FIG. 18 is a diagram schematically showing an example of a region label integration process in the region label integration unit included in the image processing device of embodiments of the present invention.

Here, an example of the region label integration processing the region label integration unit 18 will be described. FIG. 18 is a diagram schematically showing an example of the region label integration process in the region label integration unit 18 included in the image processing device 1 of embodiments of the present invention. FIG. 18 schematically shows an example of the region label integration process when the two label regions shown in FIGS. 16A to 16C are integrated. In the following description, the operation of updating the value of the region label of the surrounding pixel P11 which is a surrounding pixel belonging to the true peak pixel T2 included in the label region L1 to the value of the region label assigned to the true peak pixel T2 will be described.

When the region label integration processing control unit 19 allocates the label region L1 to be processed to any one of the region label integration units 18 included in the image processing device 1, the region label integration unit 18 reads the value of the region label of the surrounding pixel P11 included in the allocated label region L1 from the region label storage unit 16 in step S61. Here, the region label value of "10" of the surrounding pixel P11 is read.

Then, the region label integration unit 18 determines whether the read region label value of "10" of the surrounding pixel P11 is a region label value indicating a true peak pixel in step S62. Here, the region label integration unit 18 determines that the read region label value of "0" of the surrounding pixel P11 is not a value indicating a true peak pixel ("NO" in step S62). Accordingly, the region label integration unit 18 regards the region label value of "10" of the surrounding pixel P11 as an address of label integration information and reads data of "20" stored in a storage region corresponding to the address in step S63-1.

Then, the region label integration unit 18 determines whether the read data of "20" is a value corresponding to a true peak pixel in step S65. Here, the address is "10" and the data is "20" which are different values. Accordingly, the region label integration unit 18 determines that the read data is not a value corresponding to a true peak pixel ("NO" in step S65). Accordingly, the region label integration unit 18 regards the read data value of "20" as an address of the label integration information and reads data of "20" stored in a storage region corresponding to the address in step S63-2.

Then, the region label integration unit 18 determines whether the read data of "20" is a value corresponding to a true peak pixel in step S65. Here, the address is "20" and the data is "20" which are identical values. Accordingly, the region label integration unit 18 determines that the read data is a value corresponding to a true peak pixel ("YES" in step S65). Accordingly, the region label integration unit 18 changes (updates) the region label value of "10" of the surrounding pixel P11 to the read data value of "20," that is, the value of the region label assigned to the true peak pixel T12 in step S66.

Thereafter, in the same manner, the region label integration unit 18 sequentially reads region label values of respective pixels included in the allocated label region L1 from the region label storage unit 16 and performs the region label integration process on all pixels included in the label region L.

In this manner, each of the region label integration units 18 included in the image processing device 1 perform a the region label integration process on region labels of a label region allocated by the region label integration processing control unit 19 and finally stores region labels obtained by dividing and processing a luminance image input to the image processing device 1 as one piece of region label data for the luminance image in the region label storage unit 16.

In the image processing device 1, the plurality of region label integration units 18 can perform the label integration process on different label regions in parallel. However, a computational load when each region label integration unit 18 performs the label integration process is different depending on allocated label regions.

Figure 19:
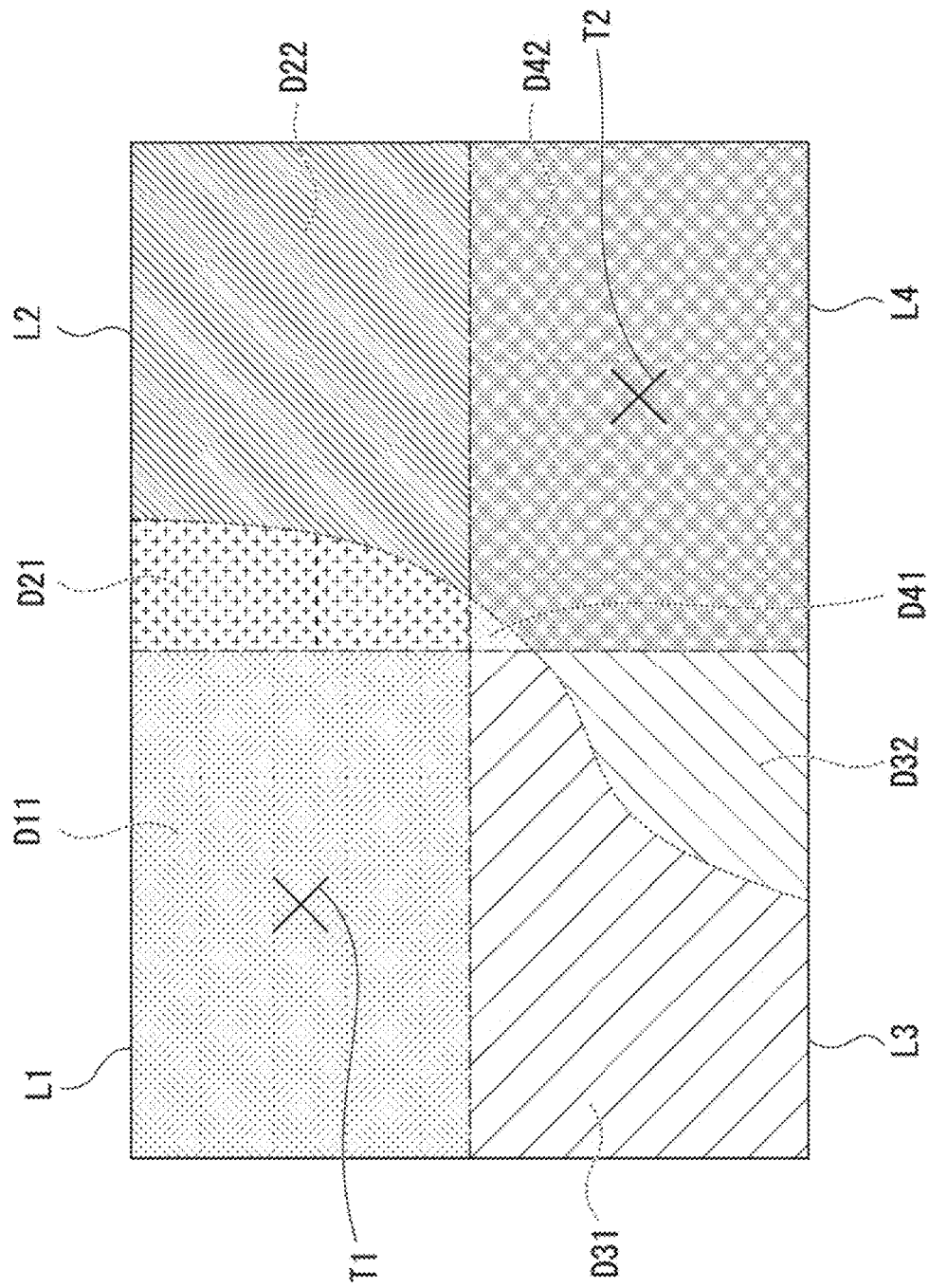
FIG. 19 is a diagram schematically showing an example of a label integration process in the image processing device of embodiments of the present invention.

FIG. 19 is a diagram schematically showing an example of the label integration process in the image processing device 1 of embodiments of the present invention. FIG. 19 schematically shows a state in which four neighboring label regions are integrated.

As shown in FIG. 19, regions of pixels on which the region label integration unit 18 performs the label integration process in order to integrate the respective label regions, that is, the number of pixels for which region label values are changed (updated) is not necessarily the same value in all label regions. For example, a case in which the region label integration processing control unit 19 allocates a label region L1 to a region label integration unit 18-1, allocates a label region L2 to a region label integration unit 18-2, allocates a label region L3 to a region label integration unit 18-3, and allocates a label region IA to a region label integration unit 18-4 may be used.

All pixels included in the label region L1 on which the region label integration unit 18-1 perform the label integration process are assigned with a region label indicating that the pixels belong to a true peak pixel T1. Accordingly, the region label integration unit 18-1 does not update the value of the region label of any pixel in the label integration process.

In addition, the label region L2 on which the region label integration unit 18-2 performs the label integration process includes a region D21 of pixels belonging to the true peak pixel T1 included in the label region L1 and a region D22 of pixels belonging to a true peak pixel T2 included in the label region L4. Accordingly, the region label integration unit 18-2 updates values of region labels of all pixels in the label integration process.

Further, the label region L3 on which the region label integration unit 18-3 performs the label integration process includes a region D31 of pixels belonging to the true peak pixel T1 included in the label region L1 and a region D32 of pixels belonging to the true peak pixel T2 included in the label region L4. Accordingly, the region label integration unit 18-3 also updates values of region labels of all pixels in the label integration process.

In addition, the label region IA on which the region label integration unit 18-4 performs the label integration process includes a region D41 of pixels belonging to the true peak pixel T1 included in the label region L1 and a region D42 of pixels belonging to the true peak pixel T2 included in the label region LA on which the label integration process is performed. Accordingly, the region label integration unit 18-4 also updates values of region labels of some pixels in the label integration process.

When regions of pixels for which values of region labels are updated in the label integration process are different for the respective region label integration units 18, as described above, a computational load of the label integration process becomes different depending on the size of a region of pixels (the number of pixels) for which label values are updated. Accordingly, in the image processing device 1, the region label integration processing control unit 19 allocates label regions which are label integration process targets such that computational loads of the respective region label integration units 18 are almost equalized, as described above.

Figure 20:
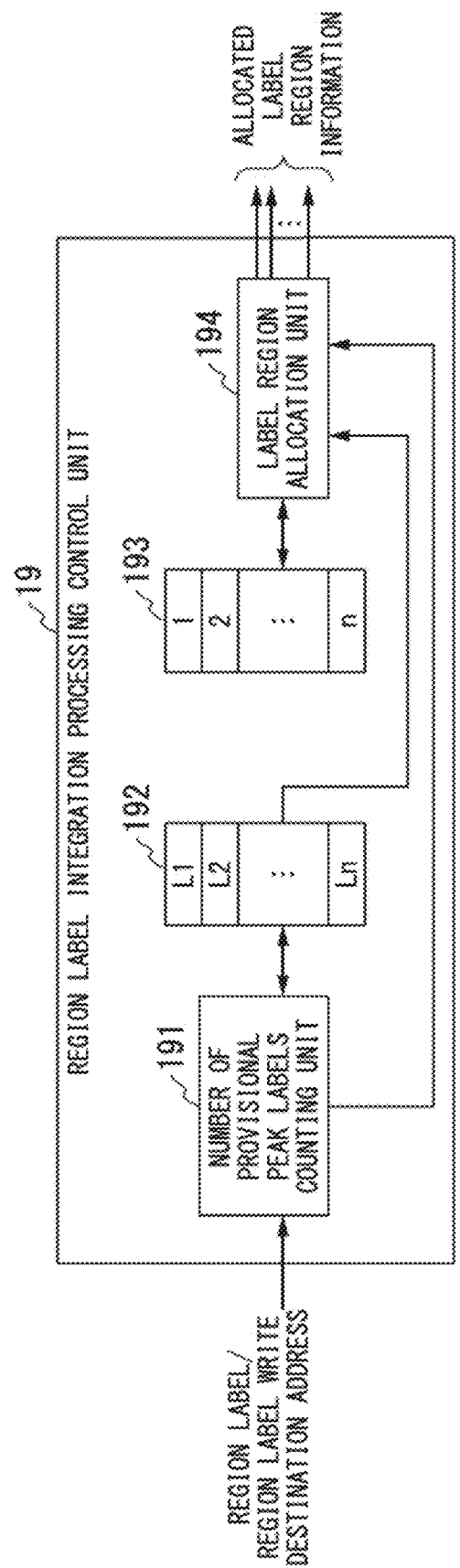
FIG. 20 is a block diagram showing a configuration of a region label integration processing control unit included in the image processing device of embodiments of the present invention.

Next, the configuration and the operation of the region label integration processing control unit 19 included in the image processing device 1 will be described. FIG. 20 is a block diagram showing a configuration of the region label integration processing control unit 19 included in the image processing device 1 of embodiments of the present invention. The region label integration processing control unit 19 shown in FIG. 20 includes a number of provisional peak labels counting unit 191, a number of provisional peak labels storage unit 192, a number of cumulative provisional peak labels storage unit 193, and a label region allocation unit 194.

The number of provisional peak labels counting unit 191 counts the number of pixels assigned with a region label having the same value as a region label assigned to a provisional peak pixel on the basis of a region label write destination address and a region label input from each region label generation unit 14 included in the image processing device 1 for each label region.

More specifically, the number of provisional peak labels counting unit 191 determines whether the input region label is a region label included in any one label region on the basis of the region label write destination address input from each region label generation unit 14. For example, the number of provisional peak labels counting unit 191 may determine the label region depending on the value of the region label write destination address.

In addition, the number of provisional peak labels counting unit 191 determines whether the input region label is a region label assigned to a true peak pixel or a region label assigned to a provisional peak pixel. In determination of the region label, the number of provisional peak labels counting unit 191 may determine whether the input region label is a value equal to or greater than "m." That is, the number of provisional peak labels counting unit 191 may determine that the input region label is a region label assigned to a true peak pixel when the value of the region label is a value equal to or greater than "m" and determine that the input region label is a region label assigned to a provisional peak pixel when the value of the region label is a value less than "m." Then, the number of provisional peak labels counting unit 191 counts the number of pixels assigned with the region label (referred to as "provisional peak label" hereinafter) determined to be a region label assigned to a provisional peak pixel.

The number of provisional peak labels counting unit 191 outputs the counted number of pixels assigned with the provisional peak label (referred to as "number of provisional peak labels" hereinafter) and information indicating the label region for which the number of provisional peak labels has been counted to the number of provisional peak labels storage unit 192. Accordingly, the number of provisional peak labels currently counted by the number of provisional peak labels counting unit 191 is stored in a storage region of the corresponding label region included in the number of provisional peak labels storage unit 192.

Region label write destination addresses and region labels are not necessarily continuously input to the number of provisional peak labels counting unit 191 from the same region label generation unit 14. Accordingly, as a configuration of the number of provisional peak labels counting unit 191, for example, a configuration in which a previous number of provisional peak labels corresponding to a label region determined on the basis of an input region label write destination address is read from the number of provisional peak labels storage unit 192, and a number of peak labels is updated and output to the number of provisional peak labels storage unit 192 again may be used. However, the configuration of the number of provisional peak labels counting unit 191 is not limited to the aforementioned configurations and may employ any configuration which can realize the same function.

When counting of provisional peak labels for all label regions is completed, the number of provisional peak labels counting unit 191 outputs a completion signal indicating the same to the label region allocation unit 194.

The number of provisional peak labels storage unit 192 includes as many storage regions as the number of divisions of a luminance image input to the image processing device 1 into rectangular luminance images, that is, as many storage regions as the number of label regions and stores a number of provisional peak labels input from the number of provisional peak labels counting unit 191 for each label region.

The number of cumulative provisional peak labels storage unit 193 includes as many storage regions as the number of region label integration units 18 included in the image processing device 1 and stores a cumulative number of the number of pixels for which each region label integration unit 18 updates region label values.

The label region allocation unit 194 allocates a label region on which each region label integration unit 18 performs the label integration process on the basis of the number of provisional peak labels in each label region, which is stored in the number of provisional peak labels storage unit 192, after the number of provisional peak labels counting unit 191 completes counting of provisional peak labels for all label regions. Then, the label region allocation unit 194 notifies each region label integration unit 18 of information indicating the allocated label region. FIG. 20 shows a configuration in which allocated label region information is output to each region label integration units 18. Accordingly, each region label integration unit 18 performs the label integration process on the allocated label region.

As a method through which the label region allocation unit 194 notifies each region label integration unit 18 of the allocated label region, for example, a method of notifying the region label integration unit 18 of the value of an address of the first pixel of the allocated label region and the value of a region label write destination address of the first pixel, or the like may be used. However, the method through which the label region allocation unit 194 notifies each region label integration unit 18 of the allocated label region is not limited to the above-described method and any method which can realize the same function may be employed.

In addition, the label region allocation unit 194 cumulatively increases the number of provisional peak labels included in an allocated label region for each region label integration unit 18. Then, the label region allocation unit 194 outputs the cumulatively increased number of provisional peak labels (referred to as "number of cumulative provisional peak labels" hereinafter) and information indicating the region label integration unit 18 for which the number of provisional peak labels has been cumulatively increased to the number of cumulative provisional peak labels storage unit 193. Accordingly, the number of cumulative provisional peak labels in each region label integration unit 18, that is, the number of pixels for which each region label integration unit 18 updates region label values in the label integration process is stored in a storage region of the corresponding region label integration unit 18 included in the number of cumulative provisional peak labels storage unit 193. The label region allocation unit 194 manages the number of cumulative provisional peak labels of each region label integration unit 18, stored in the number of cumulative provisional peak labels storage unit 193, as a computational load in each region label integration unit 18 for each region label integration unit 18.

Next, the operation of the region label integration processing control unit 19 will be described. FIGS. 21A to 21D are diagrams showing the concept of a label region distribution process performed by the region label integration processing control unit 19 included in the image processing device 1 of embodiments of the present invention. Further, in FIG. 21A, the horizontal axis represents the number of divisions of a luminance image in the image processing device 1, that is, the number of label regions on which the label integration process is performed, and the vertical axis represents the number of provisional peak labels in each label region. In addition, in FIGS. 21B to 21D, the horizontal axis represents respective region label integration units 18 included in the image processing device 1 and the vertical axis represents computational loads allocated to the respective region label integration units 18 as cumulatively increased numbers of provisional peak labels (numbers of cumulative provisional peak labels). FIGS. 21A to 21D show an example of the concept of the label region distribution process performed by the region label integration processing control unit 19 when the image processing device 1 includes three region label integration units 18 (region label integration units 18-1 to 18-3). In addition, in FIGS. 21B to 21D, numeral parts following "-" in the signs assigned to the region label integration units 18 are represented as information for identifying the respective region label integration units 18.

Figure 21A:
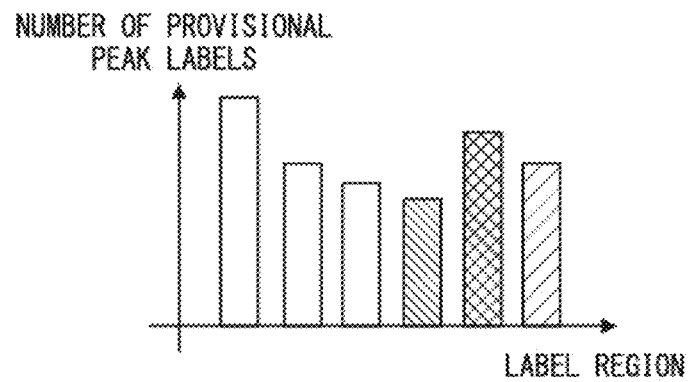
FIG. 21A is a diagram showing the concept of a label region distribution process performed by the region label integration processing control unit included in the image processing device of embodiments of the present invention.
Figure 21B:
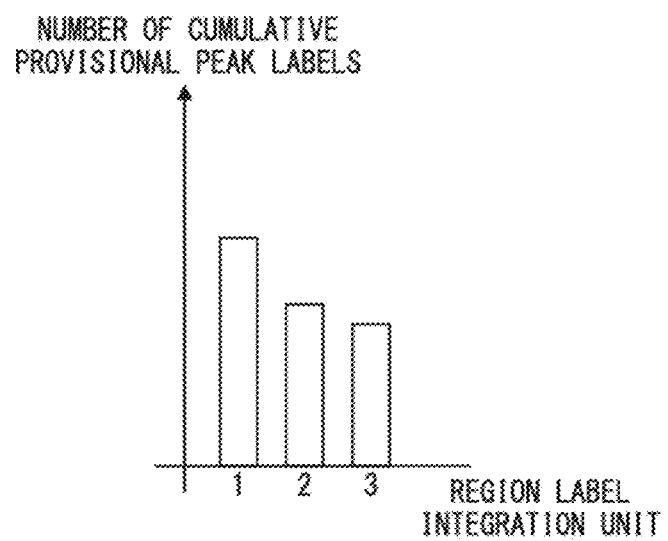
FIG. 21B is a diagram showing the concept of the label region distribution process performed by the region label integration processing control unit included in the image processing device of embodiments of the present invention.

As shown in FIG. 21A, as many numbers of provisional peak labels as the number of label regions are stored in the number of provisional peak labels storage unit 192. The label region allocation unit 194 allocates the label integration process for each label region having a number of provisional peak labels stored in the number of provisional peak labels storage unit 192 to each region label integration unit 18, FIG. 21B shows a state in which first to third label regions (e.g., label regions L1 to L3) having numbers of provisional peak labels stored in the number of provisional peak labels storage unit 192 have been allocated to the respective region label integration units 18-1 to 18-3. More specifically, a state in which the first label region L1 has been allocated to the region label integration unit 18-1, the second label region L2 has been allocated to the region label integration unit 18-2 and the third label region L3 has been allocated to the region label integration unit 18-3 is shown.

Figure 21C:
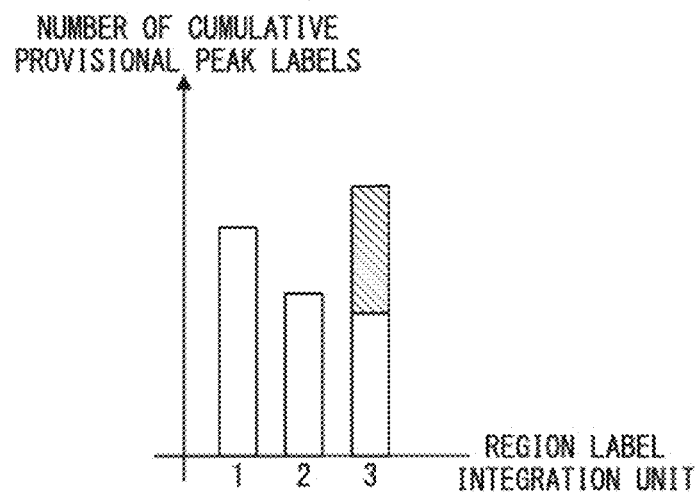
FIG. 21C is a diagram showing the concept of the label region distribution process performed by the region label integration processing control unit included in the image processing device of embodiments of the present invention.

Thereafter, when the label region allocation unit 194 allocates the fourth and following label regions (e.g., label regions L4 to L6) to any one of the region label integration units 18-1 to 18-3, the label region allocation unit 194 allocates the label regions to the region label integration unit 18 having a smallest number of cumulative provisional peak labels stored in the number of cumulative peak labels storage unit 193, that is, having a lowest computational load at that time. FIG. 21C shows a state in which the fourth label region L4 has been allocated to the region label integration unit 18-3 having a lowest computational load in the previous stage (refer to FIG. 21B).

Figure 21D:
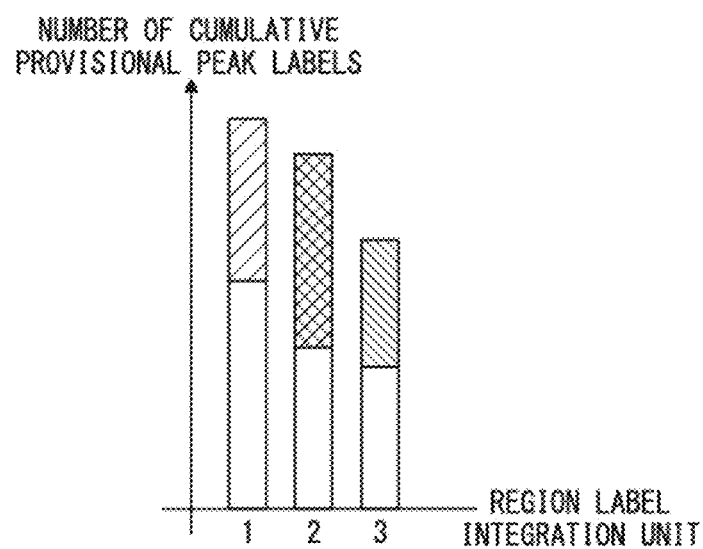
FIG. 21D is a diagram showing the concept of the label region distribution process performed by the region label integration processing control unit included in the image processing device of embodiments of the present invention.

In this manner, the label region allocation unit 194 sequentially allocates label regions on which the label integration process is performed to the region label integration unit 18 having a lowest computational load. Accordingly, total sums of computational loads (numbers of provisional peak labels), that is, numbers of cumulative provisional peak labels when the respective region label integration units 18 included in the image processing device 1 perform the label integration process are almost equalized, as shown in FIG. 21D.

Figure 22:
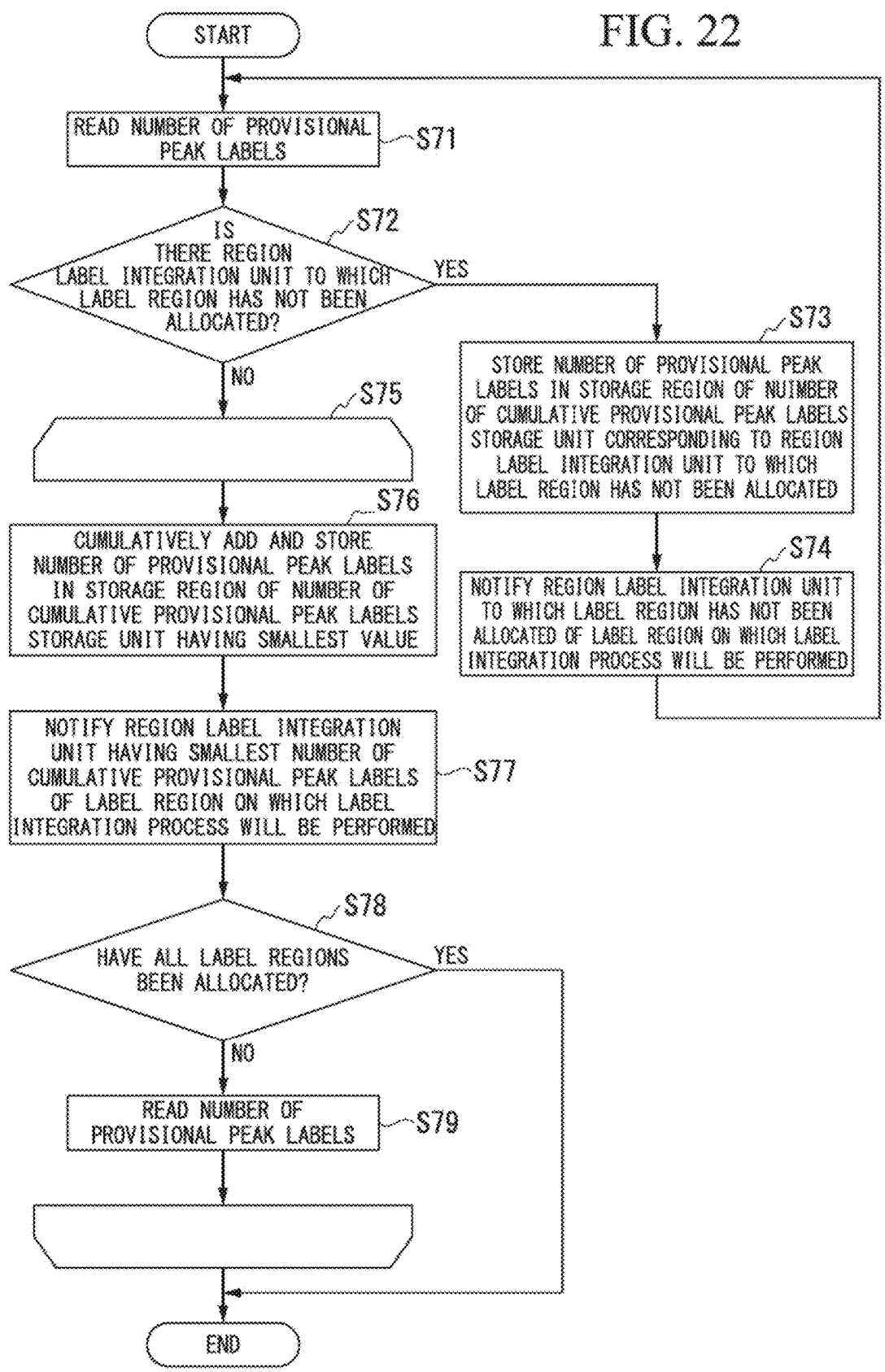
FIG. 22 is a flowchart showing a processing procedure in the region label integration processing control unit included in the image processing device of embodiments of the present invention.

Here, the label region distribution process in the region label integration processing control unit 19 will be described. FIG. 22 is a flowchart showing a processing procedure in the region label integration processing control unit 19 included in the image processing device 1 of embodiments of the present invention. In the following description, the label region distribution process performed by the label region allocation unit 194 included in the region label integration processing control unit 19 when the image processing device 1 includes three region label integration units 18-1 to 18-3 will be described with reference to FIGS. 21A to 21D.

The label region allocation unit 194 initiates the label region distribution process when a completion signal indicating that counting of provisional peak labels for all label regions has been completed is input from the number of provisional peak labels counting unit 191.

When the label region distribution process is initiated, first, the label region allocation unit 194 reads the number of provisional peak labels of the first label region from the number of provisional peak labels storage unit 192 (step S71).

The label region allocation unit 194' determines whether there is a region label integration unit 18 to which a label region has not been allocated (step S92).

The image processing device 1 includes the number of cumulative provisional peak labels storage unit 193 which corresponds to each region label integration unit 18 included in the image processing device 1 and stores a computational load allocated to the region label integration unit 18, that is, the number of cumulative provisional peak labels. Accordingly, determination of step S72 is performed on the basis of the number of cumulative provisional peak labels stored in the number of cumulative provisional peak labels storage unit 193 corresponding to each region label integration unit 18.

More specifically, the label region allocation unit 194 determines that there is a region label integration unit 18 to which a label region has not been allocated when the number of cumulative provisional peak labels stored in a storage region of the number of cumulative provisional peak labels storage unit 193 corresponding to any one of the region label integration units 18 is "0." In addition, the label region allocation unit 194 determines that there is no region label integration unit 18 to which a label region has not been allocated when the number of cumulative provisional peak labels stored in the storage region of the number of cumulative provisional peak labels storage unit 193 corresponding to any one of the region label integration units 18 is not "0."

When it is determined that there is a region label integration unit 18 to which a label region has not been allocated in step S72 ("YES" in step S71), the label region allocation unit 194 stores the read number of provisional peak labels of the label region in a storage region of the number of cumulative provisional peak labels storage unit 193 corresponding to the region label integration unit 18 to which a label region has not been allocated (step S73). In the example shown in FIG. 21B, first, the number of provisional peak labels corresponding to the first label region L1 is stored in a storage region [1] of the number of cumulative provisional peak labels storage unit 193 corresponding to the region label integration unit 18-1. Meanwhile, in FIGS. 21B to 21D, the number of cumulative provisional peak labels indicating a computational load size, which is represented by the vertical axis, corresponds to a number of cumulative provisional peak labels stored in a storage region in the number of cumulative provisional peak labels storage unit 193, which corresponds to each region label integration unit 18.

Subsequently, the label region allocation unit 194 notifies the region label integration unit 18 to which a label region has not been allocated of a label region which is a label integration process target, that is, an allocated label region (step S74).

Thereafter, the label region allocation unit 194 returns to step S71 and repeals the process of steps S71 to S74. Accordingly the first to third label regions L1 to L3 are sequentially allocated to the respective region label integration units 18-1 to 18-3 included in the image processing device 1, as shown in FIG. 21B. Here, for example, the number of provisional peak labels corresponding to the second label region L2 is stored in a storage region [2] of the number of cumulative provisional peak labels storage unit 193 corresponding to the region label integration unit 18-2. In addition, for example, the number of provisional peak labels corresponding to the third label region L3 is stored in a storage region [3] of the number of cumulative provisional peak labels storage unit 193 corresponding to the region label integration unit 18-3.

On the other hand, the number of provisional peak labels of the first label region is read from the number of provisional peak labels storage unit 192 in step S71, and when it is determined that there is no region label integration unit 18 to which a label region has not been allocated in step S72 ("NO" in step S71), the label region allocation unit 194 performs the label region distribution process represented through the loop of step S75.

In the process of the loop of step S75, a storage region of the number of cumulative provisional peak labels storage unit 193 corresponding to each region label integration unit 18 included in the image processing device 1 is checked and the region label integration unit 18 having a smallest total sum for numbers of provisional peak labels (number of cumulative provisional peak labels), that is, having a lowest computational load is detected. Then, the label region allocation unit 194 stores the read number of provisional peak labels of the label region in the storage region of the number of cumulative provisional peak labels storage unit 193 corresponding to the region label integration unit 18 having the smallest number of cumulative provisional peak labels by adding the read number of provisional peak labels thereto (step S76). Here, for example, the number of provisional peak labels of the fourth label region is read from the number of provisional peak labels storage unit 192 and the process of the loop of step S75 is performed to store the number of provisional peak labels corresponding to the fourth label region IA in a storage region [3] of the number of cumulative provisional peak labels storage unit 193 corresponding to the region label integration unit 18-3 by adding the number of provisional peak labels thereto, as shown in FIG. 21C.

Subsequently, the label region allocation unit 194 notifies the region label integration unit 18 corresponding to the storage region of the number of cumulative provisional peak labels storage unit 193 in which the read number of provisional peak labels of the label region has been stored by being added, that is, the region label integration unit 18 (here, the region label integration unit 18-3) having the smallest number of cumulative provisional peak labels of the allocated label region (step S77).

Then, the label region allocation unit 194 determines whether numbers of provisional peak labels of all label regions have been read from the number of provisional peak labels storage unit 192 (step S78).

When it is determined that numbers of provisional peak labels of all label regions have not been read from the number of provisional peak labels storage unit 192 in step S78 ("NO" in step S78), the label region allocation unit 194 reads the number of provisional peak labels of the next label region from the number of provisional peak labels storage unit 192 in step S79 and repeats the process of the loop of step S75.

Here, the label region allocation unit 194 performs the process of the loop of step S75 when the label region allocation unit 194 has read the number of provisional peak labels corresponding to the fifth label region L5 and the process of the loop of step S75 when the label region allocation unit 194 has read the number of provisional peak labels corresponding to the sixth label region L6, for example, in step S79. In this case, in the process of the loop of step S75 for the fifth label region L5, the label region allocation unit 194 stores the number of provisional peak labels corresponding to the fifth label region L5 in the storage region [2] of the number of cumulative provisional peak labels storage unit 193 corresponding to the region label integration unit 18-2 by adding the number of provisional peak labels thereto in step S76, as shown in FIG. 21D. Then, the label region allocation unit 194 notifies the region label integration unit 18-2 of allocation of the fifth label region L5 in step S77. In addition, in the process of the loop of step S75 for the sixth label region L6, the label region allocation unit 194 stores the number of provisional peak labels corresponding to the sixth label region L6 in the storage region [1] of the number of cumulative provisional peak labels storage unit 193 corresponding to the region label integration unit 18-1 by adding the number of provisional peak labels thereto in step S76, as shown in FIG. 21D. Then, the label region allocation unit 194 notifies the region label integration unit 18-1 of allocation of the sixth label region L6 in step S77.

On the other hand, when it is determined that numbers of provisional peak labels of all label regions have been read from the number of provisional peak labels storage unit 192 in step S78 ("YES" in step S78), the label region allocation unit 194 terminates the process of the loop of step S75 and ends the label region distribution process.

According to the aforementioned configuration and operation, the region label integration processing control unit 19 allocates the label integration process for each label region to the region label integration unit 18 having a lowest computational load at that time when a luminance image input to the image processing device 1 is divided into a larger number of rectangular luminance images than the number of region label integration units 18 included in the image processing device 1. Accordingly, when the region label integration processing control unit 19 allocates each label region to each region label integration unit 18, the region label integration processing control unit 19 can distribute label regions such that total sums of computational loads of the region label integration units 18 are nearly equalized.

Accordingly, the image processing device 1 can operate each of the region label integration units 18 included therein such that it does not remain idle to reduce the processing time of the label integration process, to thereby decrease the total processing time in the image processing device 1.

According to embodiments of the present invention, an image processing device (image processing device 1) includes: a plurality of label data generation units (gradient data generation units 12-1 to 12-$n$, gradient data storage units 13-1 to 13-$n$, and region label generation units 14-1 to 14-$n$) which generate label data (region label data) in which a predetermined label (region label) is assigned to each of a plurality of pixels in each of a plurality of divided images (rectangular luminance images) obtained by dividing the region of an input image (luminance image) into a plurality of regions (rectangular regions), a plurality of label integration information generation units (label integration information generation units 15-1 to 15-$n$) which correspond to the respective label data generation units (one label data generation unit includes a gradient data generation unit 12, a gradient data storage unit 13 and a region label generation unit 14) and generate label integration information representing association of region labels included in respective pieces of region label data in order to integrate label data generated by the corresponding label data generation units and region label data generated by other label data generation units; a plurality of label integration units (region label integration units 18-1 to 18-$n$) which generate integrated label data (final region label data) in which respective pieces of region label data corresponding to neighboring rectangular luminance images are integrated on the basis of the label integration information; and a label integration processing control unit (region label integration processing control unit 19) which distributes region label data of label regions to the respective region label integration units 18 such that computational loads to integrate the region label data are equalized, wherein the label integration information generation unit 15 generates label integration information for region label data of all label regions before the region label integration unit 18 performs computation for integrating region label data of respective label regions.

Further, according to embodiments of the present invention, in the image processing device 1, each label data generation unit generates, for an overlap pixel which is a pixel overlapping with an overlap region of another rectangular luminance image, which is positioned in a peripheral portion (overlap region) of the corresponding rectangular luminance image, region label data of a label region assigned with a first label (region label assigned to a true peak pixel or a provisional peak pixel located in the overlap region which is a region label having a value uniquely determined depending on the position of the overlap pixel or a second label (region label assigned to a true peak pixel) which is determined to be an exclusive value for a pixel located at a position other than the overlap region included in the rectangular luminance image and is different from the first label, the label integration information is information in which the value of the first label (region label value assigned to a true peak pixel or a provisional peak pixel) has been stored as an initial value in a first storage region (storage region in which a region label value assigned to a pixel present in an overlap region is stored) corresponding to each overlap pixel included in each rectangular luminance image, and the value of the second label (peak label value assigned to a true peak pixel) assigned to any one true peak pixel located at a position other than an overlap region included in each rectangular luminance image has been stored in a second storage region (storage region in which a peak label value assigned to a true peak pixel is stored) other than the first storage region, each of the label integration information generation units 15 updates, when the corresponding label data generation unit assigns the second label to any one overlap pixel, the value of the first label stored in the first storage region corresponding to the overlap pixel assigned with the second label in the label integration information to the value of the assigned second label, and each of the region label integration units 18 changes the value of the first label assigned to a pixel assigned with the first label having the same value as a value updated to a value different from the initial value and uniquely determined for the overlap pixel corresponding to the first storage region to the updated value stored in the first storage region.

In addition, according to embodiments of the present invention, in the image processing device 1, each label data generation unit includes: a plurality of gradient data generation units (gradient data generation units 12) each of which sequentially targets each pixel included in the corresponding rectangular luminance image and generates gradient data in which each pixel included in the rectangular luminance image is represented using a third label (gradient label) having a value indicating a direction toward a pixel having a higher luminance value or a fourth label (peak label) having a value indicating a higher luminance value than all pixels located on the periphery (surrounding pixels) on the basis of the luminance value of a targeted pixel (target pixel) and luminance values of other pixels (surrounding pixels) located around the target pixel; and a plurality of region label generation units (region label generation units 14) each of which sets each target pixel indicated using the peak label as a peak pixel, divides a region in a rectangular luminance image into regions including pixels (surrounding pixels) belonging to the same peak pixel on the basis of peak coordinates indicating the position of the peak pixel, and generates region label data in which each surrounding pixel included in the divided regions is indicated using a fifth label (region label) having a value which is uniquely determined and indicates that the surrounding pixel is a pixel belonging to the same peak pixel as region label data of a label region, wherein each region label generation unit 14 sets a region label assigned to a true peak pixel or a provisional peak pixel to a region label when the peak pixel is an overlap pixel and sets a peak label assigned to the true peak pixel to a region label when the peak pixel is a pixel located at a position other than an overlap region.

Further, according to embodiments of the present invention, in the image processing device 1, the region label integration processing control unit 19 includes: a label counting unit (number of provisional peak labels counting unit 191) which counts the number of pixels assigned with the first label included in region label data of a label region (pixels assigned with a provisional peak label) for each piece of region label data of each label region, and outputs the counted number of pixels as a number of labels (number of provisional peak labels) of region label data of each label region; and a label region allocation unit (label region allocation unit 194) which allocates region label data of a label region which is a target for which computation for integration will be performed to each region label integration unit 18 on the basis of each number of provisional peak labels, and notifies each region label integration unit 18 of the allocated region label data of the label region.

Further, according to embodiments of the present invention, in the image processing device 1, the label region allocation unit 194 sequentially allocates region label data of label regions to a region label integration unit 18 to which region label data of a label region has not been allocated, and when there is no region label integration unit 18 to which region label data of a label region has not been allocated, sequentially allocates region label data of label regions to a region label integration unit 18 having a smallest accumulation (number of cumulative provisional peak labels) of numbers of provisional peak labels of allocated region label data of label regions.

Further, according to embodiments of the present invention, in the image processing device 1, each region label generation unit 14 includes: a peak coordinates search unit (peak coordinates search unit 141) which detects a peak pixel assigned with a peak label included in gradient data and outputs peak coordinates indicating the position of the detected peak pixel; a gradient data acquisition unit (gradient data read source address generation unit 142) which acquires gradient data indicating a peak pixel corresponding to peak coordinates and each piece of gradient data indicating each pixel (surrounding pixel) located around the peak pixel; and a gradient determination unit (outermost data gradient determination unit 143) which indicates a peak pixel included in the acquired gradient data using a region label and, simultaneously, determines whether the value of a gradient label indicating each surrounding pixel located around the peak pixel included in the acquired gradient data is a value indicating a direction toward the peak pixel and generates region label data (region label data of a label region) in which surrounding pixels indicated using a gradient label having a value indicating a direction toward the peak pixel are represented using a region label having the same value as that of the peak pixel.

Further, according to embodiments of the present invention, in the image processing device 1, the gradient data read source address generation unit 142 sequentially sets each surrounding pixel, which has been determined to correspond to a gradient label having a value indicating a direction toward the peak pixel by the outermost data gradient determination unit 143, to a center, and further acquires each piece of gradient data indicating each pixel (surrounding pixel) located around a surrounding pixel set to a center, and the outermost data gradient acquisition unit 143 sequentially determines whether the value of a gradient label indicating each pixel included in the further acquired gradient data is a value indicating a direction toward the pixel set to a center, and sequentially generates region label data in which a surrounding pixel indicated using a gradient label having a value indicating a direction toward a surrounding pixel set to a center is represented using a region label having the same value as that of the surrounding pixel set to a center.

Further, according to embodiments of the present invention, in the image processing device 1, the gradient data read source address generation unit 142 acquires each piece of gradient data indicating each surrounding pixel such that regions of respective surrounding pixels sequentially set to a center are sequentially extended from the position of peak coordinates corresponding to a peak pixel to surrounding pixels on the periphery, and the outermost data gradient determination unit 143 generates region label data in which a region indicated using a region label having the same value of that of a peak pixel is sequentially extended from the position of peak coordinates corresponding to the peak pixel to surrounding pixels on the periphery.

Further, according to embodiments of the present invention, in the image processing device 1, a rectangular luminance image is an image obtained by dividing the region of an input luminance image into rectangular regions (rectangular regions) having a predetermined identical size, wherein each of the rectangular regions is a region in which pixels positioned in an overlap region overlap, by three pixels, with pixels positioned in an overlap region of a rectangular region of a neighboring rectangular luminance image.

Further, according to embodiments of the present invention, in the image processing device 1, each label data generation unit generates region label data of a region which overlaps, by one pixel, with pixels positioned in an overlap region of region label data corresponding to a neighboring rectangular luminance image, except a pixel positioned on the periphery of an overlap region of the corresponding rectangular luminance image.

Further, according to embodiments of the present invention, in the image processing device 1, each label data generation unit sequentially initiates generation of region label data of label regions for other rectangular luminance images when generation of region label data of label regions for the corresponding rectangular luminance image is completed.

In this manner, in the image processing device 1 of embodiments of the present invention, an input luminance image is divided into a plurality of predetermined rectangular luminance images, and the plurality of gradient data generation units 12 generate gradient data corresponding to the divided rectangular luminance images in parallel. In addition, in the image processing device 1 of embodiments of the present invention, the region division process based on the gradient data generated by the respective gradient data generation units 12 is performed by the plurality of region label generation units 14 in parallel. Here, the region label integration units 18 included in the image processing device 1 generate label integration information for integrating region label data generated by the respective region label generation units 14 in advance of the label integration process in the image processing device 1 of embodiments of the present invention. Accordingly, in the image processing device 1 of embodiments of the present invention, the plurality of region label integration units 18 included in the image processing device 1 can perform the label integration process on region label data of any one label region by referring to the label integration information generated in advance.

Furthermore, in the image processing device 1 of embodiments of the present invention, the region label integration processing control unit 19 distributes (allocates) label regions which are computation targets such that total sums of computational loads of label integration processes performed by the respective region label integration units 18, that is, total sums of numbers of pixels (numbers of provisional peak labels) for which the respective region label integration units 18 update region label values are nearly equalized. Accordingly, in the image processing device 1 of embodiments of the present invention, it is possible to operate each of the respective region label integration units 18 such that it does not remain idle to reduce a total processing time in the image processing device 1.

(First Modified Example of Label Region Distribution Process)

A case in which the label region allocation unit 194 allocates each label region to the region label integration unit 18 having a smallest number of cumulative provisional peak labels, as shown in FIGS. 21A to 21D, in the image processing device 1 has been described. However, the method through which the label region allocation unit 194 allocates each label region is not limited to the method shown in FIGS. 21A to 21D, that is, the processing procedure shown in FIG. 22. For example, a method through which the label region allocation unit 194 allocates respective label regions to the respective region label integration units 18 in a predetermined order may be employed.

Figure 23C:
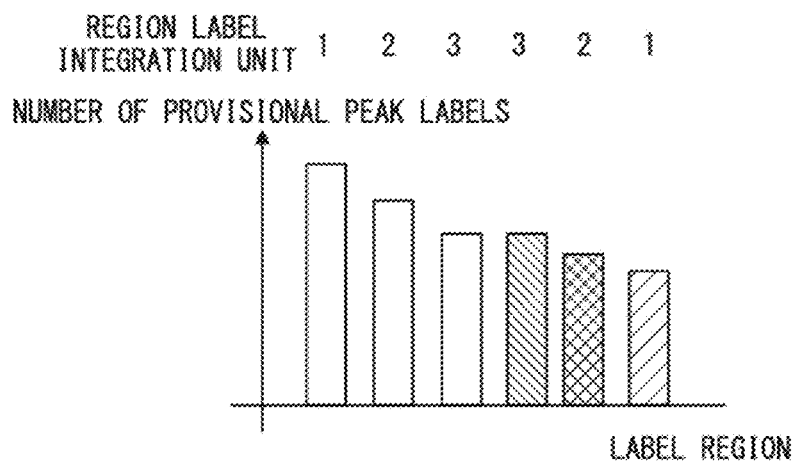
FIG. 23C is a diagram showing another method of the label region distribution process performed by the region label integrating processing control unit included in the image processing device of embodiments of the present invention.

Here, the operation of the label region allocation unit 194 in this case will be described. FIGS. 23A to 23D are diagrams showing another method of the label region distribution process performed by the region label integration processing control unit 19 included in the image processing device 1 of embodiments of the present invention. In FIGS. 23A to 23C, the horizontal axis represents label regions on which the label integration process is performed and the vertical axis represents the number of provisional peak labels in each label region. In addition, in FIG. 23D, the horizontal axis represent region label integration units 18 included in the image processing device 1 and the vertical axis represents a computational load (number of cumulative provisional peak labels) allocated to each region label integration unit 18. FIGS. 23A to 23D show an example of the concept of the label region distribution process performed by the region label integration processing control unit 19 when the image processing device 1 includes three region label integration units 18-1 to 18-3.

The label region allocation unit 194 reads numbers of provisional peak labels from the number of provisional peak labels storage unit 192. Here, when the numbers of provisional peak labels read by the label region allocation unit 194 are arranged in the reading order, the numbers of provisional peak labels are not a fixed number in the respective label regions, as shown in FIG. 23A. Accordingly, the label region allocation unit 194 sorts the respective label regions in order of increasing number of provisional peak labels. As a result, the respective label regions are sorted in order of increasing number of provisional peak labels, as shown in FIG. 23B.

Then, the label region allocation unit 194 allocates the label integration process for each region label to each region label integration unit 18 in the sorted order. In the example shown in FIG. 23C, numeral parts following "–" of signs assigned to the region label integration units 18 are represented by being mapped to the allocated label regions. The example shown in FIG. 23C shows a case in which the sorted label regions are allocated in an order such that ascending order and descending order are alternately repeated as the order of the region label integration units 18.

More specifically, in the example shown in FIG. 23C, the sorted first to third label regions are allocated to the region label integration units 18-1 to 18-3 in ascending order and the sorted fourth to sixth label regions are allocated to the region label integration units 18-3 to 18-1 in descending order. Accordingly, in the example shown in FIG. 23C, the sorted first and sixth label regions are allocated to the region label integration unit 18-1, the sorted second and fifth label regions are allocated to the region label integration unit 18-2, and the sorted third and fourth label regions are allocated to the region label integration unit 18-3.

Figure 23D:
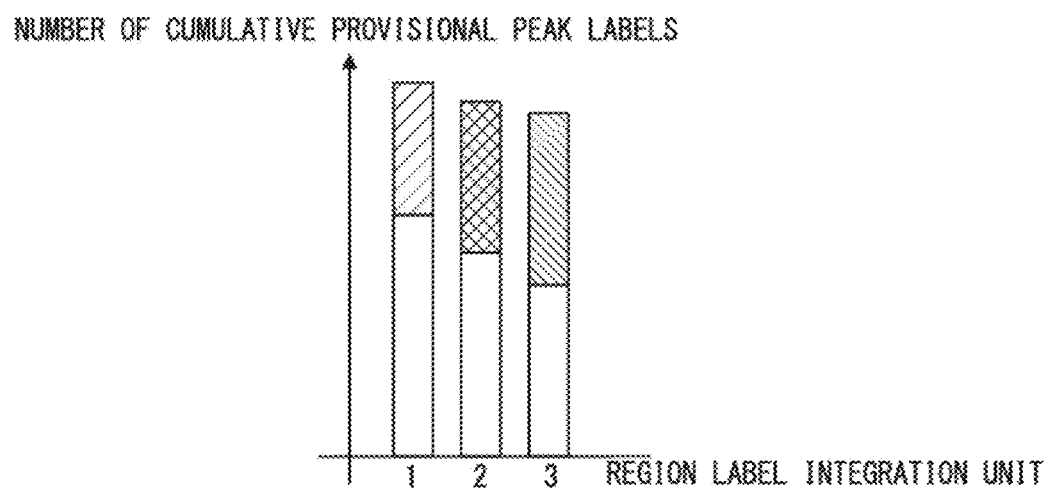
FIG. 23D is a diagram showing another method of the label region distribution process performed by the region label integration processing control unit included in the image processing device of embodiments of the present invention.

As shown in FIG. 23C, total sums of computational loads (numbers of cumulative provisional peak labels) of the respective region label integration units 18 become nearly equalized by sorting the respective label regions in order of increasing number of provisional peak labels and then allocating them. FIG. 23D shows computational loads of the region label integration units 18-1 to 18-3 as numbers of cumulative provisional peak labels when the respective label regions are allocated as in the example shown in FIG. 23C. A label region having the largest number of provisional peak labels and a label region having a smallest number of provisional peak labels are combined and allocated to each region label integration unit 18 as in the example shown in FIG. 23C, and thus the total sums of computational loads of the respective region label integration units 18 are nearly equalized, as shown in FIG. 23D.

Here, the label region distribution process in the region label integration processing control unit 19 in this case will be described. FIG. 24 is a flowchart showing another processing procedure in the region label integration processing control unit 19 included in the image processing device 1 of embodiments of the present invention. In the following description, the image processing device 1 includes n region label integration units 18 region label integration units 18-1 to 18-n).

The label region allocation unit 194 initiates the label region distribution process when a completion signal indicating that counting of provisional peak labels for all label regions has been completed is input from the number of provisional peak labels counting unit 191.

When the label region distribution process is initiated, first, the label region allocation unit 194 reads numbers of provisional peak labels for all label regions from the number of provisional peak labels storage unit 192. Then, the label region allocation unit 194 sorts the read numbers of provisional peak labels in order of increasing number of provisional peak labels (step S81). Meanwhile, the number of provisional peak labels sorting result may be temporarily saved in a buffer included in the label region allocation unit 194 or may be temporarily written back to the number of provisional peak labels storage unit 192.

Subsequently, the label region allocation unit 194 initializes a value of a distribution signal indicating a region label integration unit 18 to which a label region is distributed (step S82). Here, the label region allocation unit 194 sets the initial value of the distribution signal to "0."

Subsequently, the label region allocation unit. 194 clears a loop counter i of label regions, which indicates the order of sorted label regions to "0" in the loop of step S83.

Thereafter, the label region allocation unit 194 allocates a label region "i" corresponding to the loop counter i to the region label integration unit 18 (the region label integration unit 18-1 in the example shown in FIGS. 23A to 23D) corresponding to the value (here, initial value="0") of the distribution signal. Then, the label region allocation unit 194 notifies the target region label integration unit 18 of allocation of the label region "i" (step S84).

Subsequently, the label region allocation unit 194 determines whether the integer part obtained by dividing the value of the loop counter i by the number of region label integration units 18, n, (i+n), is an even number (step S85).

When the integer part of (i+n) is an even number in step S85 ("YES" in step S851 the label region allocation unit 194 adds "1" to the current value of the distribution signal to increment the value of the distribution signal (step S86).

Subsequently, when the incremented value of the distribution signal is equal to or greater than the number of region label integration units 18, n, the label region allocation unit 194 subtracts "1" from the incremented value of the distribution signal to fix (clip) the value of the distribution signal to a number n–1 (step S87). Further, when the incremented value of the distribution signal is not equal to or greater than the number of region label integration units 18, n, the process of step S87 is not performed. Then, the label region allocation unit 194 returns to step S83 and performs the label region distribution process on the next label region.

On the other hand, when the integer part of (i+n) is not an even number, that is, is an odd number in step S85 ("NO" in step S85), the label region allocation unit 194 subtracts "1" from the current value of the distribution signal to decrement the value of the distribution signal (step S88).

Subsequently when the decremented value of the distribution signal is equal to or less than "0," the label region allocation unit 194 adds "1" to the decremented value of the distribution signal to fix (clip) the value of the distribution signal to "0" (step S89). Further, when the decremented value of the distribution signal is not equal to or less than "0," the process of step S89 is not performed. Then, the label region allocation unit 194 returns to step S83 and performs the label region distribution process on the next label region.

The label region allocation unit 194 performs the label region distribution process represented through the loop of step S83 on all the sorted label regions and notifies each region label integration unit 18 of a label region which is a label integration process target.

According to this operation, the region label integration processing control unit 19 can distribute label regions such that computational loads of label integration processes for respective label regions are nearly equalized in the respective region label integration units 18, as shown in FIG. 23D. Accordingly, in the image processing device 1, it is possible to efficiently operate each of the region label integration units 18 to reduce a total processing time in the image processing device 1.

According to the first modified example of the label region distribution process in embodiments of the present invention, an image processing device (image processing device 1) includes a label region allocation unit (label region allocation unit 194) which allocates region label data of label regions to label integration units (region label integration units 18) in a predetermined order.

In addition, according to the first modified example of the label region distribution process in embodiments of the present invention, in the image processing device 1, the label region allocation unit 194 sorts region label data of respective label regions into a predetermined order on the basis of numbers of labels (numbers of provisional peak labels) and sequentially allocates the sorted region label data of the label regions to the respective region label integration units 18.

Further, according to the first modified example of the label region distribution process in embodiments of the present invention, in the image processing device 1, the label region allocation unit 194 allocates region label data of label regions to the respective region label integration units 18 such that ascending order and descending order are alternately repeated as the order of the region label integration units 18 to which the region label data of the label regions are allocated.

(Second Modified Example of Label Region Distribution Process)

In the first modified example of the label region distribution process in the image processing device 1 of embodiments of the present invention, a case in which the label region allocation unit 194 allocates label regions of respective label regions such that ascending order and descending order are alternately repeated as the order of the region label integration units 18, as shown in FIG. 23C, has been described. However, the order in which the label region allocation unit 194 allocates respective label regions to the region label integration units 18 is not limited to the order shown in FIG. 23C, that is, the processing procedure shown in FIG. 24. For example, the label region allocation unit 194 may allocate respective label regions such that any one of ascending order and descending order is repeated as the order of the region label integration units 18.

Figure 25A:
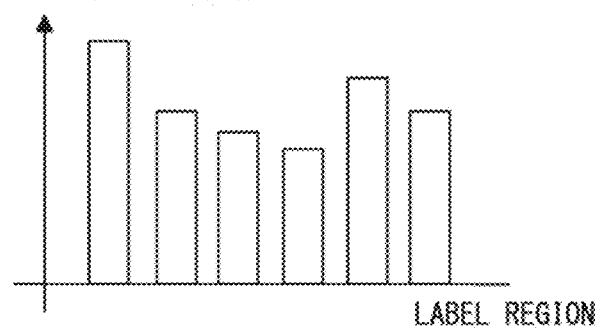
FIG. 25A is a diagram showing another method of the label region distribution process performed by the region label integration processing control unit included in the image processing device of embodiments of the present invention.
Figure 25B:
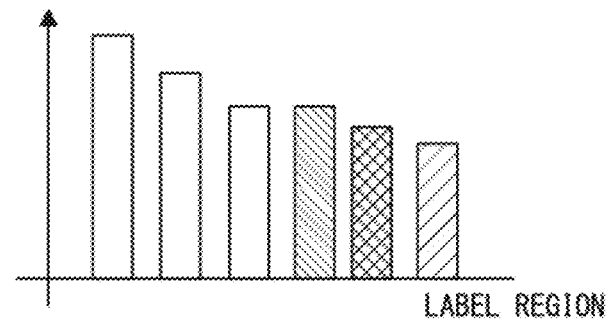
FIG. 25B is a diagram showing another method of the label region distribution process performed by the region label integration processing control unit included in the image processing device of embodiments of the present invention.
Figure 25C:
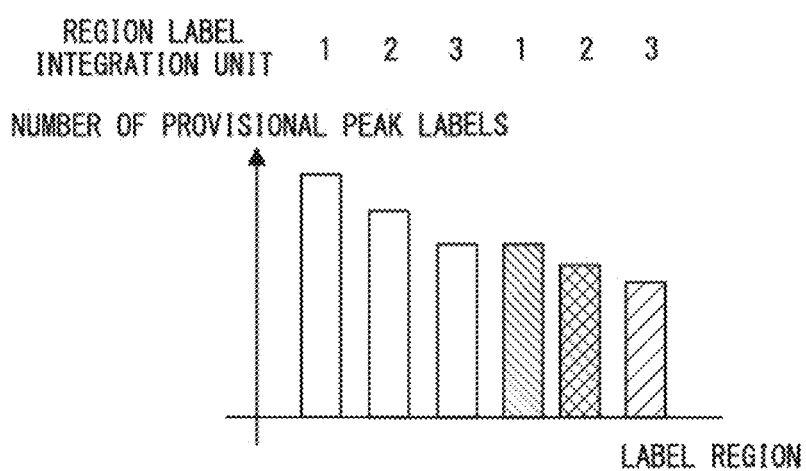
FIG. 25C is a diagram showing another method of the label region distribution process performed by the region label integration processing control unit included in the image processing device of embodiments of the present invention.

Here, the operation of the label region allocation unit 194 in this case will be described. FIGS. 25A to 25D are diagrams showing another method of the label region distribution process performed by the region label integration processing control unit 19 included in the image processing device 1 of embodiments of the present invention. In FIGS. 25A to 25C, the horizontal axis represents label regions on which the label integration process is performed and the vertical axis represents a number of provisional peak labels in each label region as in FIGS. 23A to 23C. In addition, in FIG. 25D, the horizontal axis represents region label integration units 18 included in the image processing device 1 and the vertical axis represents a computational load (number of cumulative provisional peak labels) allocated to each region label integration unit 18 as in FIG. 23D. Further, FIGS. 25A and 25B are identical to FIGS. 23A and 23B and thus a detailed description thereof is omitted.

The example shown in FIG. 25C shows a case in which the label region allocation unit 194 allocates sorted label regions in an order such that ascending order is repeated as the order of the region label integration units 18. More specifically, in the example shown in FIG. 25C, sorted first to third label regions are allocated to the region label integration units 18-1 to 18-3 in ascending order and sorted fourth to sixth label regions are allocated to the region label integration units 18-1 to 18-3 in ascending order. Accordingly, in the example shown in FIG. 25C, the sorted first and fourth label regions are allocated to the region label integration unit 18-1, the sorted second and fifth label regions are allocated to the region label integration unit 18-2, and the sorted third and sixth label regions are allocated to the region label integration unit 18-3.

Figure 25D:
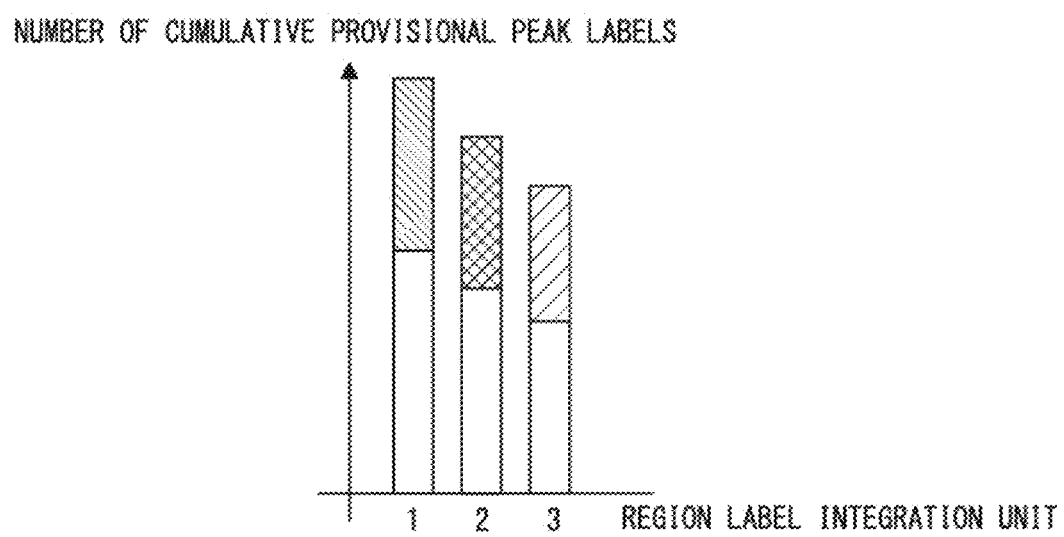
FIG. 25D is a diagram showing another method of the label region distribution process performed by the region label integration processing control unit included in the image processing device of embodiments of the present invention.

The total sums of computational loads (numbers of cumulative provisional peak labels) of the respective region label integration units 18 are nearly equalized by allocating respective label regions as shown in FIG. 25C. FIG. 25D shows computational loads of the region label integration units 18-1 to 18-3 as numbers of cumulative provisional peak labels in a case in which respective label regions are allocated as in the example shown in FIG. 25C. Here, as can be ascertained from comparison between the example shown in FIG. 23D and the example shown in FIG. 25D, the total sums of computational loads (numbers of cumulative provisional peak labels) are closer to being equalized in the example shown in FIG. 23D. However, the processing procedure for distribution as shown in FIG. 25C is easier than the processing procedure (refer to FIG. 24) for distribution as shown in FIG. 23C.

(Third Modified Example of Label Region Distribution Process)

The method through which the label region allocation unit 194 allocates the region label integration units 18 which perform the label integration process on label regions on the basis of numbers of provisional peak labels counted by the number of provisional peak labels counting unit 191 and stored in the number of provisional peak labels storage unit 192 in the image processing device 1 of embodiments of the present invention has been described. That is, the method through which the label region allocation unit 194 allocates label regions on which the label integration process is performed by estimating computational loads of the region label integration units 18 on the basis of numbers of provisional peak labels has been described. However, the method through which the label region allocation unit 194 allocates label regions to the region label integration units 18 is not limited to the methods and the processing procedures shown in FIGS. 21A to 25D. For example, the label region allocation unit 194 may perform simple estimation of computational loads of the region label integration units 18 in a discrete manner by comparing numbers of provisional peak labels with a predetermined threshold value. That is, the label region allocation unit 194 may segment computational loads of the region label integration units 18 into predetermined ranges and estimate the computational loads.

A processing procedure in this case will be described. FIG. 26 is a flowchart showing another processing procedure in the region label integration processing control unit 19 included in the image processing device 1 of embodiments of the present invention. In a computational load estimation process in the label region allocation unit 194 shown in FIG. 26, a plurality of computational loads O (referred to as "estimated computational load O" hereinafter) are discretely set as predetermined threshold values of computational loads. Further, the estimated computational loads O are values which increase in proportion to the number of pixels for which a region label value is updated. Accordingly, the label region allocation unit 194 estimates a computational load when the label integration process is performed on each label region as any one of the estimated computational loads O by comparing a number of provisional peak labels in each label region with the number of pixels, for which a region label value is updated and which is indicated by an estimated computational load O. In the following description, a case in which n estimated computational loads O (estimated computational loads $O_0$ to $O_n$, $O_0 < O_n$) are set, and a computational load when a region label value in each label region is updated is estimated as any one of the estimated computational loads O after the number of provisional peak labels counting unit 191 completes provisional peak label counting will be described.

When the number of provisional peak labels counting unit 191 completes counting of a number of provisional peak labels each label region, and a completion signal indicating completion of provisional peak label counting is input, the label region allocation unit 194 initiates the computational load estimation process.

When the computational load estimation process is initiated, first, the label region allocation unit 194 determines whether the number of provisional peak labels of the first label region is equal to or less than the number of pixels represented by the estimated computational load $O_0$ (step S91). When it is determined that the number of provisional peak labels is equal to or less than the number of pixels represented by the estimated computational load $O_0$ in step S91 ("YES" in step S91), the label region allocation unit 194 estimates that the computational load of the first label region is equal to the estimated computational load $O_0$ in step S92. That is, the label region allocation unit 194 estimates a computational load equal to or less than the estimated computational load $O_0$ is equal to the estimated computational load O in steps S91 and S92. Then the label region allocation unit 194 correlates information of the estimated computational load (estimated computational load $O_0$) with the first label region and saves the correlated information in a buffer included in the label region allocation unit 194 or writes back the estimated computational load to the number of provisional peak labels storage unit 912, and ends the computational load estimation process.

On the other hand when it is determined that the number of provisional peak labels is greater than the number of pixels represented by the estimated computational load $O_0$, that is, the computational load of the first label region is greater than the estimated computational load $O_0$ in step S91 ("NO" in step S91), the label region allocation unit 194 proceeds to step S93.

Subsequently, the label region allocation unit 194 determines whether the number of provisional peak labels of the first label region is equal to or less than the number of pixels represented by the estimated computational load $O_1$ (step S93). When it is determined that the number of provisional peak labels is equal to or less than the number of pixels represented by the estimated computational load $O_1$ in step S93 ("YES" in step S93), the label region allocation unit 194 estimates that the computational load of the first label region is equal to the estimated computational load $O_1$ in step S94. That is, the label region allocation unit 194 estimates that a computational load in a range which is greater than the estimated computational load $O_0$ and equal to or less than the estimated computational load $O_1$ is equal to the estimated computational load $O_1$ in steps S93 and S94. Then, the label region allocation unit 194 correlates information of the estimated computational load (estimated computational load $O_1$) with the first label region and saves the correlated information, and then ends the computational load estimation process.

On the other hand, when it is determined that the number of provisional peak labels is greater than the number of pixels represented by the estimated computational load $O_1$, that is, the computational load of the first label region is greater than the estimated computational load $O_1$ in step S93 ("NO" in step S93), the label region allocation unit 194 proceeds to step S95.

In the same manner, the label region allocation unit 194 compares the number of provisional peak labels with numbers of pixels represented by the estimated computational loads $O_2$ to $O_{n-2}$.

Subsequently, the label region allocation unit 194 determines whether the number of provisional peak labels of the first label region is equal to or less than the number of pixels represented by the estimated computational load $O_{n-1}$ (step S95). When it is determined that the number of provisional peak labels is equal to or less than the number of pixels represented by the estimated computational load $O_{n-1}$ in step S95. ("YES" in step S95), the label region allocation unit 194 estimates that the computational load of the first label region is equal to the estimated computational load $O_{n-1}$ in step S96. That is, the label region allocation unit 194 estimates that a computational load in a range which is greater than the estimated computational load $O_{n-2}$ and equal to or less than the estimated computational load $O_{n-1}$ is equal to the estimated computational load $O_{n-1}$ in steps S95 and S96. Then, the label region allocation unit 194 correlates information of the estimated computational load (estimated computational load $O_{n-1}$) with the first label region and saves the correlated information, and then ends the computational load estimation process.

On the other hand, when it is determined that the number of provisional peak labels is greater than the number of pixels represented by the estimated computational load $O_{n-1}$, that is, the computational load of the first label region is greater than the estimated computational load $O_{n-1}$ in step S95 ("NO" in step S95), the label region allocation unit 194 estimates that the computational load of the first label region is equal to the estimated computational load $O_n$ in step S97. That is, the label region allocation unit 194 estimates that a computational load greater than the estimated computational load $O_{n-1}$ is equal to the estimated computational load $O_n$ in steps S95 and S97. Then, the label region allocation unit 194 correlates information of the estimated computational load (estimated computational load $O_n$) with the first label region and saves the correlated information, and then ends the computational load estimation process.

In this manner, the label region allocation unit 194 may segment computational loads in the label integration process of the region label integration units 18 into predetermined ranges and easily estimate the computational loads by regarding numbers of pixels represented by the predetermined estimated computational loads O as threshold values and comparing the number of provisional peak labels in each label region with the threshold values. Accordingly, the label region allocation unit 194 may allocate each label region to a region label integration unit 18 having a low computational load on the basis of estimated computational loads.

More specifically, the label region allocation unit 194 may allocate each label region to each region label integration unit 18 on the basis of information of computational loads (estimated computational loads O) saved in the buffer or the number of provisional peak labels storage unit 192 by correlation with label regions such that total sums of computational loads of label integration processes performed by the respective region label integration units 18 are nearly equalized.

According to the third modified example of the label region distribution process in embodiments of the present invention, an image processing device (image processing device 1) includes a libel region allocation unit (label region allocation unit 194) which estimates a load of computation of each label integration unit (region label integration unit 18) on the basis of the number of labels (number of provisional peak labels) of region label data of a label region and a plurality of predetermined threshold values of numbers of labels, and allocates region label data of a label region to each region label integration unit 18 on the basis of the estimation results.

According to this operation, the region label integration processing control unit 19 can distribute label regions such that computational loads of label integration processes in the respective region label integration units 18 are nearly equalized. Accordingly, it is possible to minimize generation of an idle region label integration unit 18 and efficiently operate each region label integration unit 18 to reduce a total processing time required for the label integration process in the image processing device 1.

As described above, according to each embodiment of the present invention, a region of an input luminance image is divided into a plurality of predetermined rectangular regions, and a plurality of computation resources perform generation of gradient data for luminance images of the divided rectangular regions in parallel. In addition, in each embodiment of the present invention, the plurality of computation sources perform a region division process on the luminance images of the divided rectangular regions in parallel on the basis of the respective pieces of gradient data. Furthermore, in each embodiment of the present invention, integration information for integrating respective rectangular regions is generated prior to an integration process for integrating the respective divided rectangular regions on which the region division process has been performed. In addition, in each embodiment of the present invention, the integration process for integrating the respective rectangular regions on which the region division process has been performed is performed by the plurality of computation resources in parallel on the basis of the integration information generated in advance to obtain a result of the region division process for the input luminance image.

Here, in each embodiment of the present invention, the respective computation resources may perform the integration process on any one of the rectangular regions because the integration information is generated in advance. That is, in each embodiment of the present invention, corresponding rectangular regions are not limited and any one of the computation resources can perform the integration process. Accordingly, in each embodiment of the present invention, it is possible to distribute corresponding rectangular regions depending on computational loads of integration processes in the respective computation resources such that total sums of computational loads of the respective computation resources are nearly equalized. Therefore, in each embodiment of the present invention, it is possible to suppress generation of an idle computation resource when the integration process is performed, efficiently operate the computation resources and decrease computational load differences in the respective computation resources, to thereby reduce a total processing time required for the region division process.

In order to perform the region division process for an input luminance image, a configuration of the image processing device in which a region label is assigned to each pixel included in the luminance image has been shown in each embodiment of the present invention. However, image processing for assigning labels to an input image is not limited to the region division process shown in each embodiment. That is, the idea of the present invention can be equally applied to any image processing device which performs image processing for assigning labels to an input image by dividing a region of the input image into a plurality of regions, assigning labels to images of the divided regions and then integrating the images.

Further, in each embodiment of the present invention, although some methods (label region distribution processes) through which the label region allocation unit 194 included in the region label integration processing control unit 19 allocates label regions to the respective region label integration units 18 have been described in each embodiment of the present invention, a method of allocating label regions to the respective region label integration units 18 is not limited to the method shown in each embodiment.

Further, in each embodiment of the present invention, for example, although a case in which the position of a pixel is indicated using coordinates such as peak coordinates has been described, information indicating the position of a pixel is not limited to coordinates shown in each embodiment.

Although preferred embodiments of the preset invention have been described above, the present invention is not limited to such embodiments and modified examples thereof. Additions, omissions, substitutions, and other modifications can be made without departing from the spirit or scope of the present invention. Furthermore, the present invention is not to be considered as being limited by the foregoing description, and is only limited by the scope of the appended claims.

What is claimed is:

1. An image processing device comprising:
   a plurality of label data generation units of the device which generate label data in which a predetermined label is assigned to each of a plurality of pixels in each of a plurality of divided images into which an input image is divided as a plurality of regions;
   a plurality of label integration information generation units of the device which correspond to the respective label data generation units and generate label integration information representing association of labels included in the label data in order to integrate label data generated by a corresponding label data generation unit and label data generated by another label data generation unit;
   a plurality of label integration units of the device which generate integrated label data in which respective pieces of label data corresponding to neighboring divided images are integrated on the basis of the label integration information; and
   a label integration processing controller which distributes the label data to the respective label integration units such that computational loads to integrate the label data are equalized,
   wherein the label integration information generation units generate the label integration information for all the label data before the label integration units perform computations for integrating the respective pieces of label data; and
   wherein each of the label data generation units generates label data in which overlap pixels which are pixels overlapping with a peripheral portion of another one of the divided images which are positioned in a peripheral portion of the corresponding divided image are assigned with a first label having a value uniquely determined depending on the positions of the overlap pixels or a second label which is determined to be an exclusive value for pixels located at positions other than the peripheral portion included in the divided image and is different from the first label, the label integration information is information in which the value of the first label is stored as an initial value in a first storage region corresponding to each of the overlap pixels included in each of the divided images, and the value of the second label assigned to any one pixel located at a position other than the peripheral portion included in each of the divided images is stored in a second storage region other than the first storage region, each of the label integration information generation units updates, when the corresponding label data generation unit assigns the second label to any one of the overlap pixels, the value of the first label stored in the first storage region corresponding to the overlap pixel assigned with the second label to the value of the assigned second label in the label integration information, and each of the label integration units changes the value of the first label assigned to pixels assigned with the first label having the same value as a value which has been uniquely determined for the overlap pixel corresponding to the first storage region whose value is updated from the initial value to the updated value stored in the first storage region.

2. The image processing device according to claim 1, wherein each of the label data generation units includes:

a plurality of gradient data generation units which each sequentially target pixels included in the corresponding divided image and generate gradient data in which each of the pixels included in the divided image is represented using a third label having a value indicating a direction toward a pixel having a higher luminance value or a fourth label having a value indicating a higher luminance value than all pixels located on the periphery on the basis of the luminance value of a targeted pixel and luminance values of other pixels located around the targeted pixel; and a plurality of region label generation units which each set each of a plurality of pixels represented using the fourth label as a peak pixel, divide a region within the divided image into regions including pixels belonging to the same peak pixel on the basis of peak coordinates indicating the position of the peak pixel, and generate, as label data, region label data in which each of the pixels included in the divided regions is represented using a fifth label having a value which is uniquely determined and indicates a pixel belonging to the same peak pixel, wherein each of the region label generation units sets the first label to the fifth label when the peak pixel is the overlap pixel, and sets the second label to the fifth label when the peak pixel is a pixel located at a position other than the peripheral portion.

3. The image processing device according to claim 2, wherein the label integration processing controller includes:

a label counting unit which counts the number of pixels assigned with the first label included in the label data for each piece of the label data and outputs each of the counted numbers of pixels as a number of labels of each piece of the label data; and a label region allocation unit which allocates the label data which is a target of computation for integration to each of the label integration units on the basis of the numbers of labels, and notifies each of the label integration units of the allocated label data.

4. The image processing device according to claim 3, wherein the label region allocation unit sequentially allocates the label data to a label integration unit to which the label data has not been allocated, and when there is no label integration unit to which the label data has not been allocated, sequentially allocates the label data to the label integration unit having a smallest accumulation of the numbers of labels of the allocated label data.

5. The image processing device according to claim 3, wherein the label region allocation unit allocates the label data to the respective label integration units in a predetermined order.

6. The image processing device according to claim 5, wherein the label region allocation unit sorts the respective pieces of label data into a predetermined order on the basis of the numbers of labels and sequentially allocates the sorted label data to the respective label integration units.

7. The image processing device according to claim 5, wherein the label region allocation unit allocates the label data to the respective label integration units such that ascending order and descending order are alternately repeated as the order of the label integration units to which the respective pieces of label data are allocated.

8. The image processing device according to claim 3, wherein the label region allocation unit estimates a computational load of each of the label integration units on the basis of the numbers of labels of the label data and a plurality of predetermined threshold values of numbers of labels and allocates the label data to the respective label integration units on the basis of the estimation results.

9. The image processing device according to claim 2, wherein each of the region label generation units includes:

a peak coordinates search unit which detects a peak pixel assigned with the fourth label included in the gradient data and outputs peak coordinates indicating the position of the detected peak pixel;

a gradient data acquisition unit which acquires gradient data indicating the peak pixel corresponding to the peak coordinates and gradient data indicating each of a plurality of pixels located around the peak pixel set as a center; and a gradient determination unit which represents the peak pixel included in the acquired gradient data using the fifth label and, simultaneously, determines whether the value of the third label indicating each of the pixels located around the peak pixel included in the acquired gradient data is a value indicating a direction toward the peak pixel, and generates region label data in which a pixel indicated using the third label having a value indicating a direction toward the peak pixel is represented using the fifth label having the same value as that of the peak pixel.

10. The image processing device according to claim 9, wherein the gradient data acquisition unit sequentially sets each of a plurality of pixels, which are determined to correspond to the third label having a value indicating a direction toward the peak pixel by the gradient determination unit, as a center, and further acquires gradient data indicating each of a plurality of pixels located around the pixel set as a center, and the gradient determination unit sequentially determines whether the value of the third label indicating each of the pixels included in the further acquired gradient data is a value indicating a direction toward the pixel set as a center, and sequentially generates region label data in which a pixel indicated using the third label having a value indicating a direction toward the pixel set as a center is represented using the fifth label having the same value as that of the pixel set as a center.

11. The image processing device according to claim 10, wherein the gradient data acquisition unit acquires the gradient data indicating each of the pixels such that regions of the pixels sequentially set as a center are sequentially extended from the position of the peak coordinates corresponding to the peak pixel to the pixels on the periphery, and the gradient determination unit generates region label data in which a region indicated using the fifth label having the same value of that of the peak pixel is sequentially extended from the position of the peak coordinates corresponding to the peak pixel to the pixels on the periphery.

12. The image processing device according to claim 1, wherein the divided images are images in which the region of the input image is divided into predetermined rectangular regions having the same size, and each of the rectangular regions is a region in which pixels positioned in a peripheral portion overlap, by three pixels, with pixels positioned in a peripheral portion of a rectangular region of a neighboring divided image.

13. The image processing device according to claim 12, wherein each of the label data generation units generates label data of a region which overlaps, by one pixel, with pixels positioned in a peripheral portion of label data corresponding to the neighboring divided image, except pixels positioned on the outermost periphery of the peripheral portion of the corresponding divided image.

14. The image processing device according to claim 1, wherein the respective label data generation units sequentially initiate generation of label data for other divided images when generation of the label data for the corresponding divided image is completed.

\* \* \* \* \*